US012535256B2

(12) United States Patent
Subrahmanya et al.

(10) Patent No.: US 12,535,256 B2
(45) Date of Patent: Jan. 27, 2026

(54) METHOD AND SYSTEM FOR CONTROLLING AIRFLOW VOLUME AND FLOW DIRECTION FROM A REMOTE HEAT EXCHANGER UNIT OF A TRANSPORT CLIMATE CONTROL SYSTEM

(71) Applicant: THERMO KING LLC, Minneapolis, MN (US)

(72) Inventors: Praveena Alangar Subrahmanya, Karnataka (IN); Grant Mies Niehaus, Melrose, MN (US); Yirong Jiang, Edina, MN (US); Thomas W. Kampf, Minnetonka, MN (US); Eamonn T Mee, Saint Paul, MN (US)

(73) Assignee: THERMO KING LLC, Minneapolis, MN (US)

( * ) Notice: Subject to any disclaimer, the term of this patent is extended or adjusted under 35 U.S.C. 154(b) by 69 days.

(21) Appl. No.: 18/303,768

(22) Filed: Apr. 20, 2023

(65) Prior Publication Data
US 2023/0364967 A1  Nov. 16, 2023

(30) Foreign Application Priority Data

Apr. 20, 2022  (IN) .............................. 202241023336
Oct. 19, 2022  (IN) .............................. 202241059843

(51) Int. Cl.
*B60H 1/00* (2006.01)
*F25D 11/00* (2006.01)
*F25D 17/08* (2006.01)

(52) U.S. Cl.
CPC ....... *F25D 11/003* (2013.01); *B60H 1/00014* (2013.01); *B60H 1/00735* (2013.01); *F25D 17/08* (2013.01); *B60H 2001/00721* (2013.01)

(58) Field of Classification Search
CPC ... F25D 11/003; F25D 17/08; B60H 1/00014; B60H 1/007035; B60H 1/00542; B60H 1/00564; B60H 1/00792; B60H 1/00842; B60H 1/3232; B60H 1/00378; B60H 2001/00721; B60P 3/205
See application file for complete search history.

(56) References Cited

U.S. PATENT DOCUMENTS 6,342,005 B1  1/2002  Daniels et al.
6,662,590 B2  12/2003  Kamuf
6,745,586 B1  6/2004  Reimann et al.
(Continued)

FOREIGN PATENT DOCUMENTS

DE      4338099     5/1995
DE    102016006179  10/2017
(Continued)

OTHER PUBLICATIONS

Extended European Search Report, issued in the corresponding European patent application No. 23169038.9, dated Sep. 20, 2023, 8 pages.
(Continued)

*Primary Examiner* — Emmanuel E Duke
(74) *Attorney, Agent, or Firm* — HSML P.C.

(57) ABSTRACT

Airflow volume and/or direction from configurable remote heat exchanger unit of a transport climate control system providing climate control within a climate controlled space of a transport unit may be variably controlled based on sensor data.

20 Claims, 48 Drawing Sheets

(56) References Cited

U.S. PATENT DOCUMENTS

| | | | |
|---|---|---|---|
| 10,710,427 B2 | 7/2020 | Bullock et al. | |
| 2006/0248904 A1* | 11/2006 | Ludwig | B60H 1/00014 |
| | | | 62/208 |
| 2016/0082808 A1* | 3/2016 | Perkins | B60H 1/00742 |
| | | | 165/203 |
| 2018/0178626 A1 | 6/2018 | Srnec et al. | |
| 2019/0315197 A1 | 10/2019 | Williamson et al. | |

FOREIGN PATENT DOCUMENTS

| | | | | |
|---|---|---|---|---|
| DE | 102019205194 | 10/2019 | | |
| EP | 0282051 | 9/1988 | | |
| EP | 3241724 | 12/2018 | | |
| EP | 3241724 B1 * | 12/2018 | | B62D 33/048 |
| EP | 3695999 | 8/2020 | | |
| FR | 2766427 | 1/1999 | | |
| JP | 1059057 | 3/1998 | | |
| WO | 2011/055163 | 5/2011 | | |
| WO | 2020166014 | 8/2020 | | |
| WO | WO-2020166014 A1 * | 8/2020 | | F25D 17/06 |

OTHER PUBLICATIONS

US Non-Final Office Action, issued in U.S. Appl. No. 18/303,761, dated Jul. 15, 2025, 27 pages.

* cited by examiner

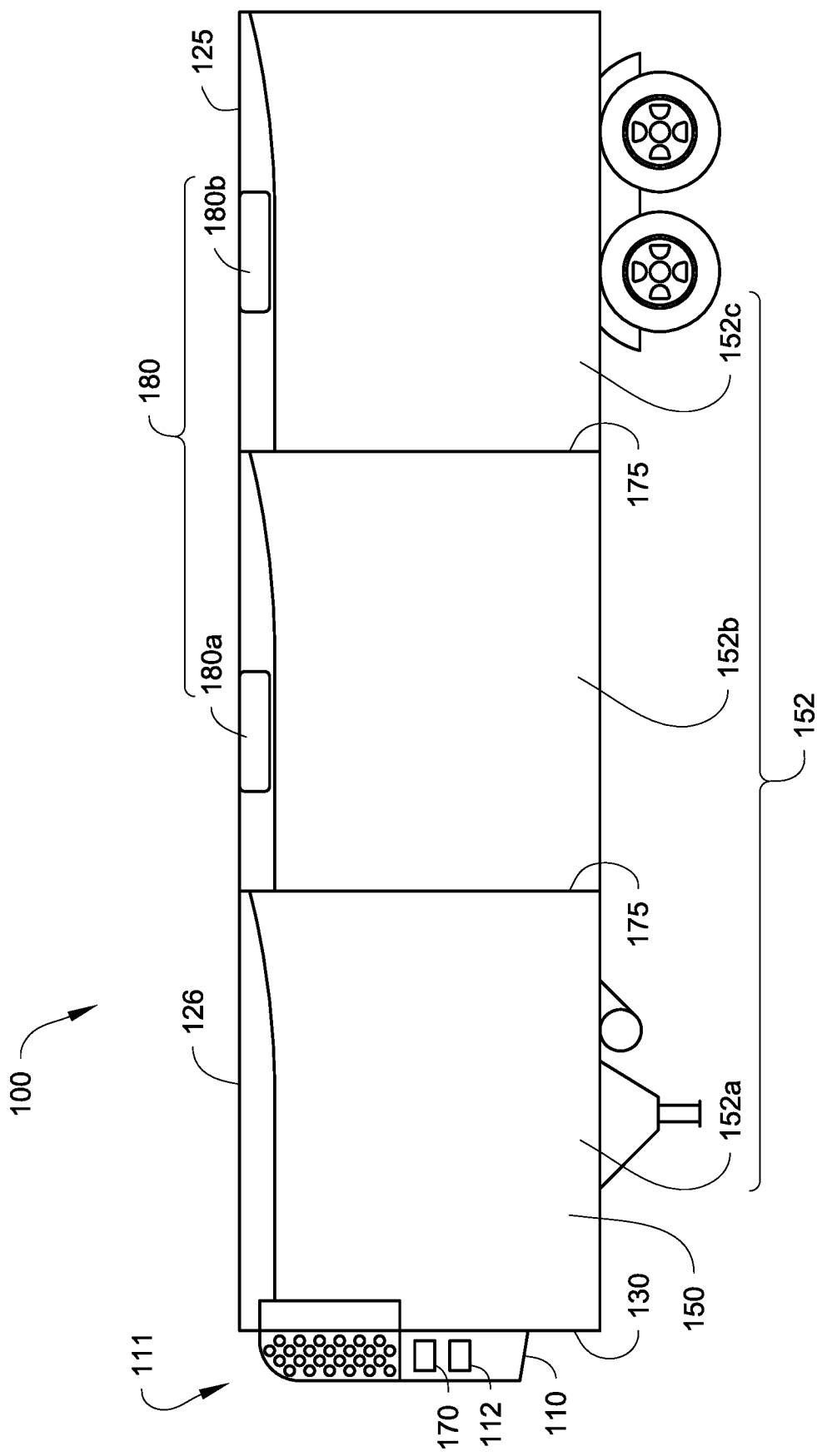

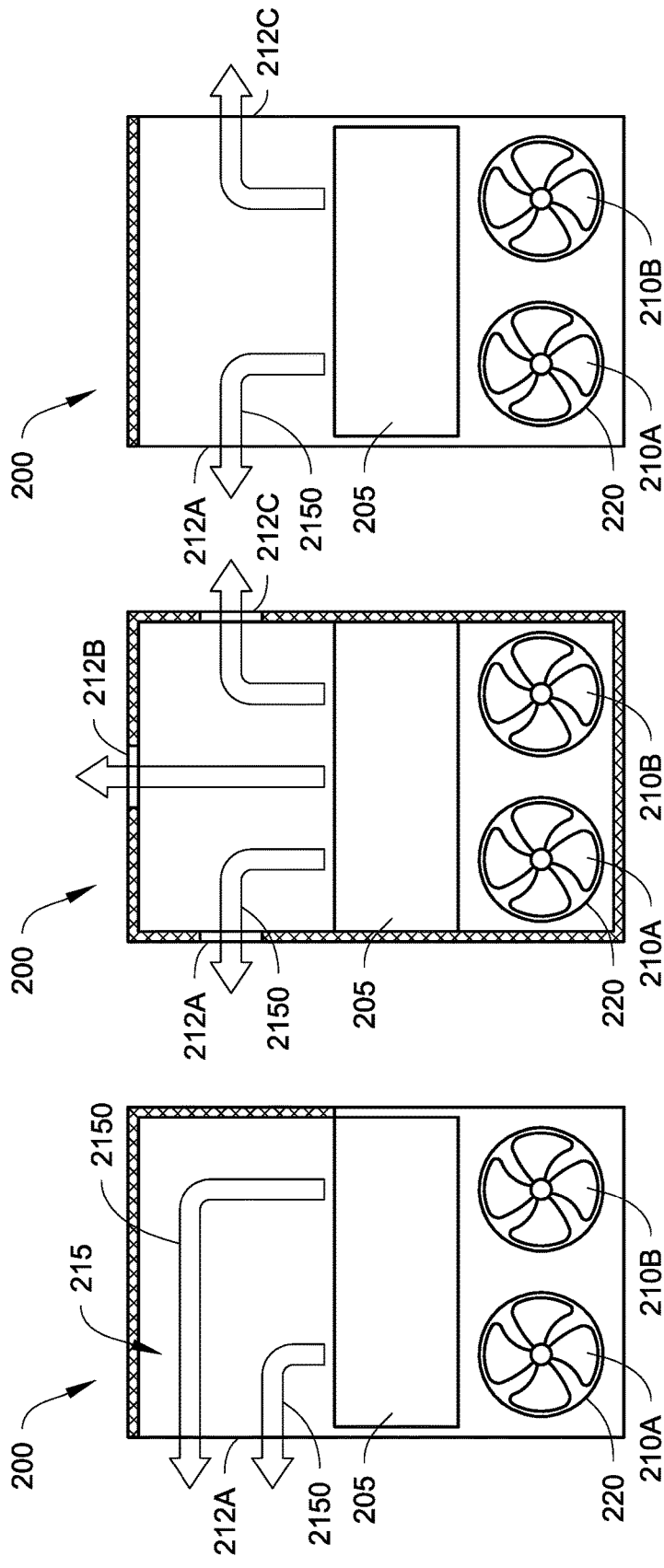
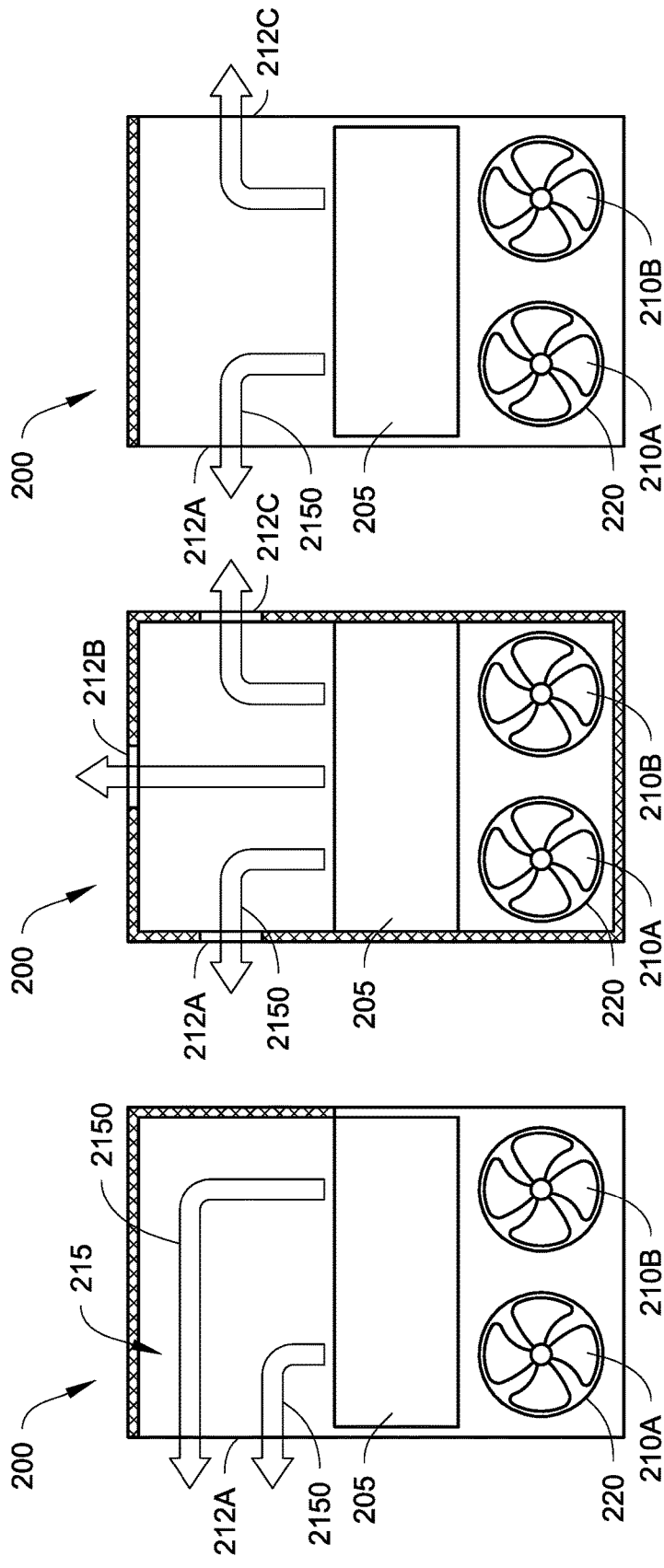
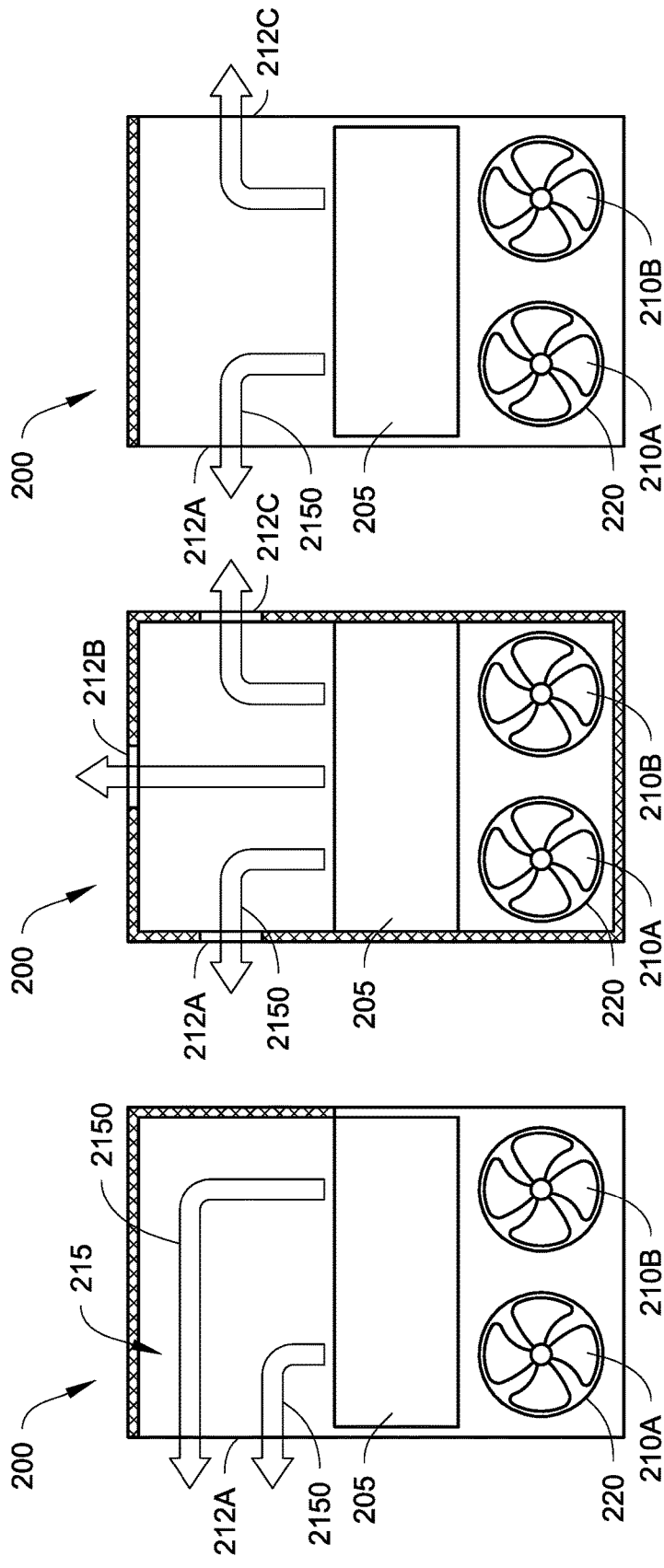
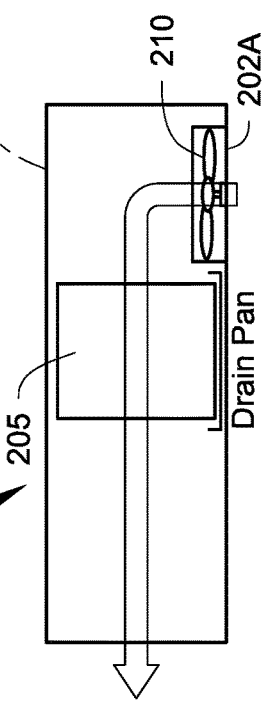
Fig. 2A-i  Fig. 2A-ii  Fig. 2A-iii  Fig. 2A-iv

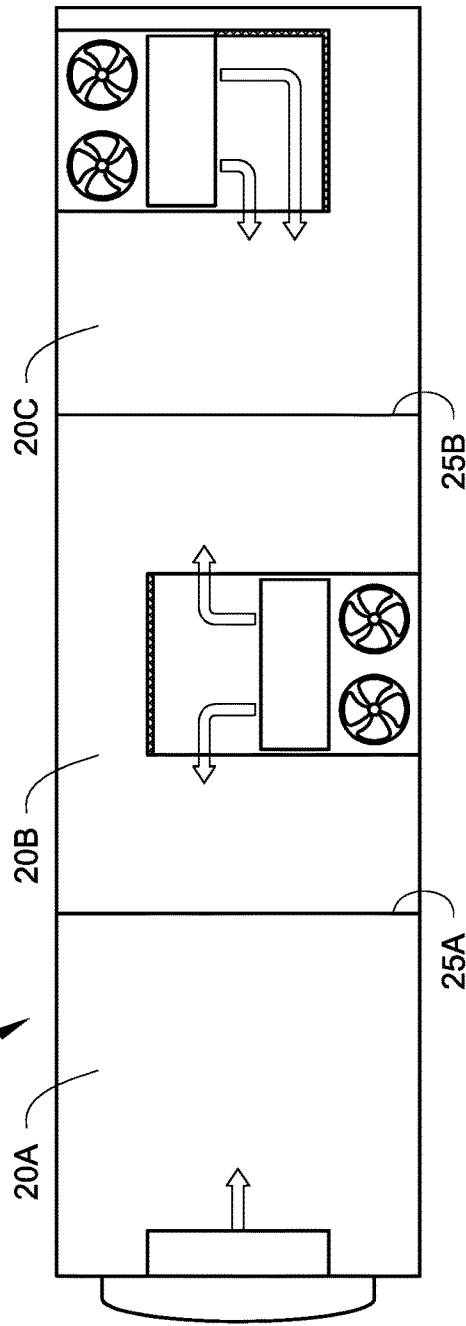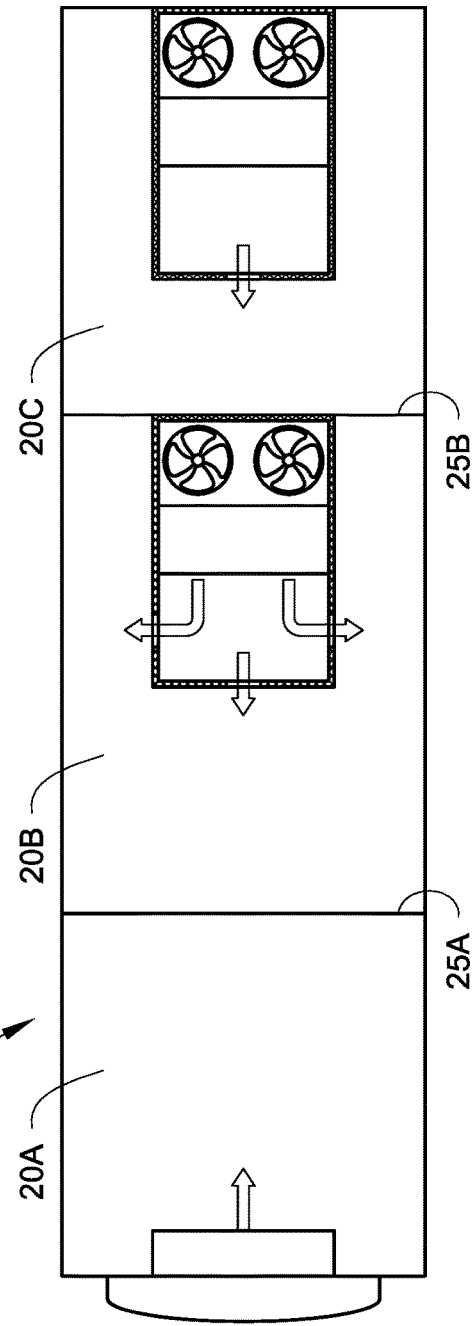
Fig. 2C-i
Fig. 2C-ii

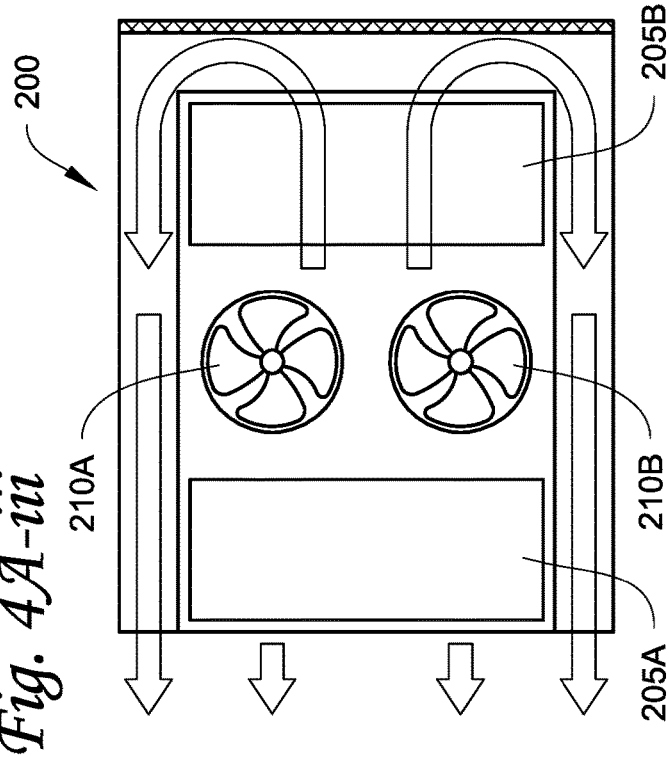
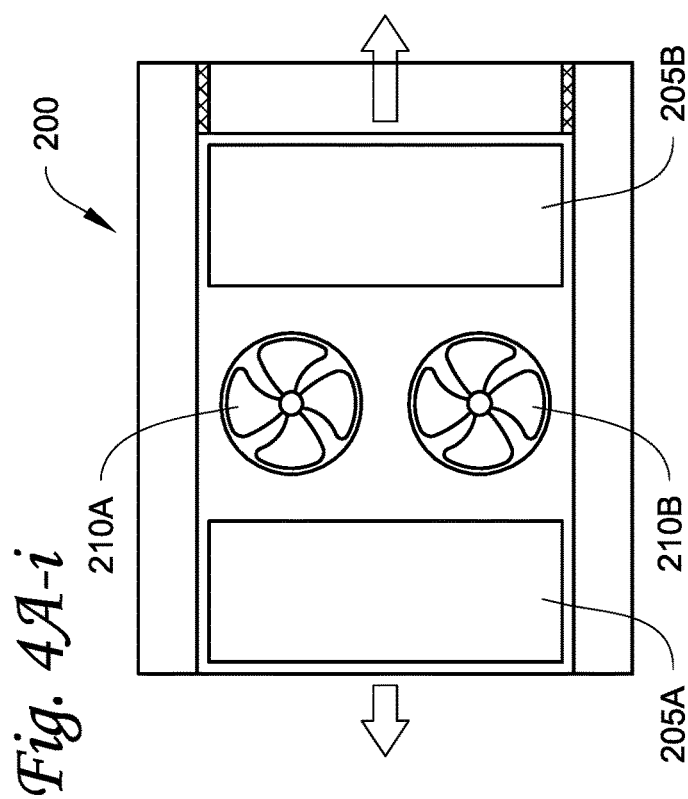
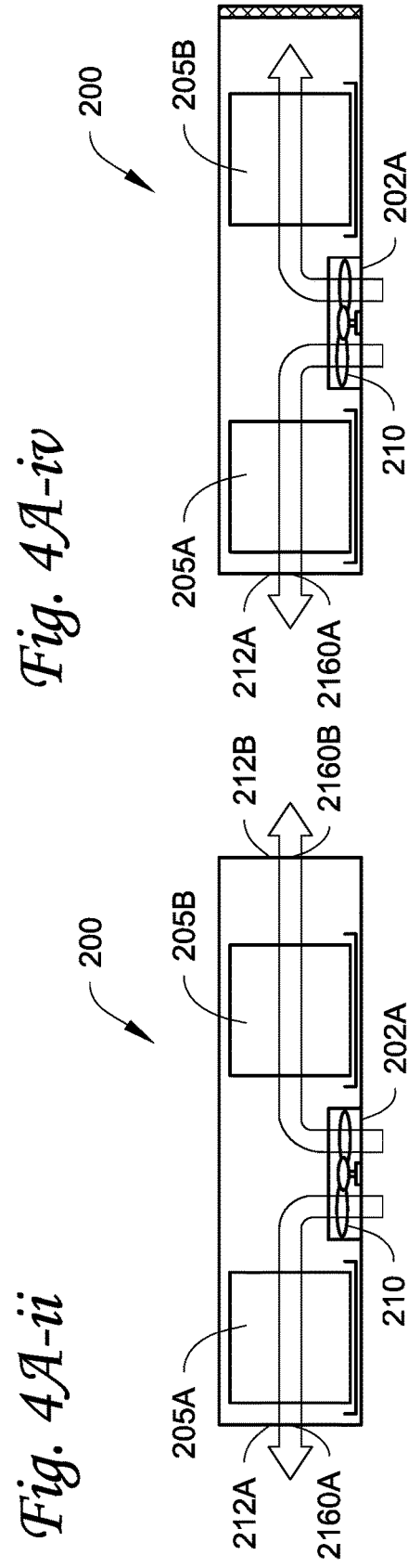

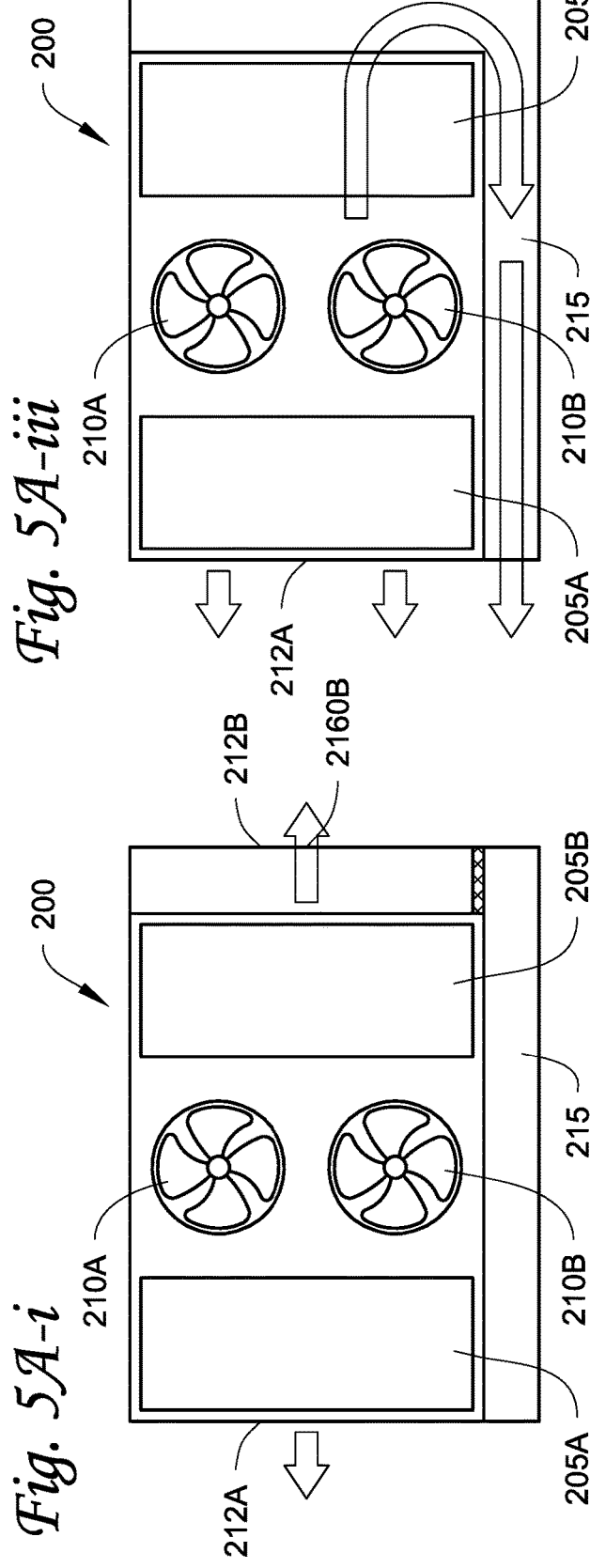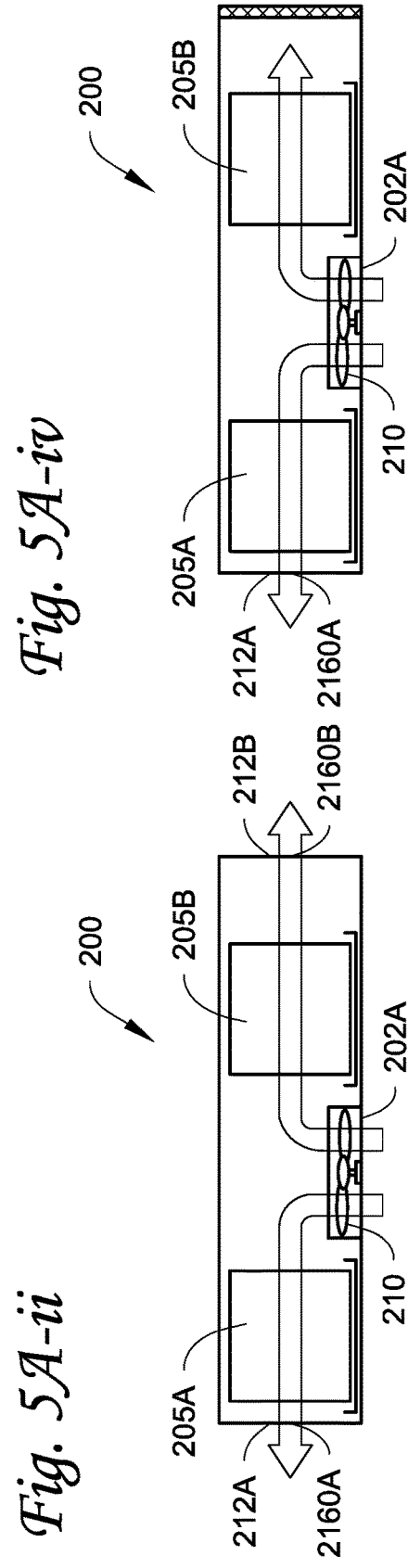
Fig. 5A-i  Fig. 5A-ii  Fig. 5A-iii  Fig. 5A-iv

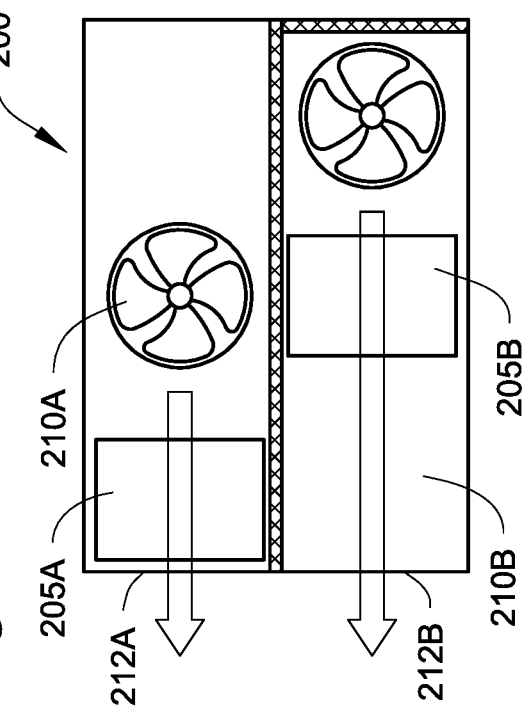
Fig. 6A-iii
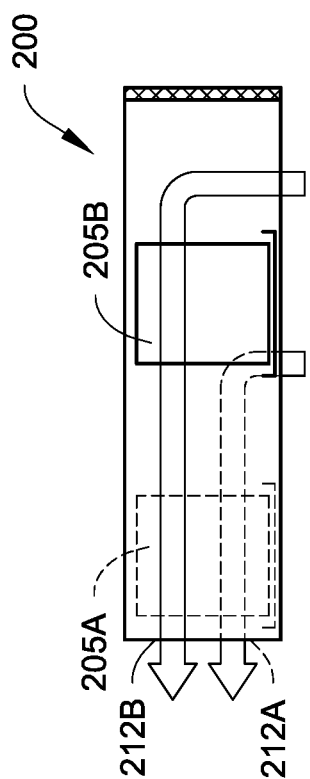
Fig. 6A-iv
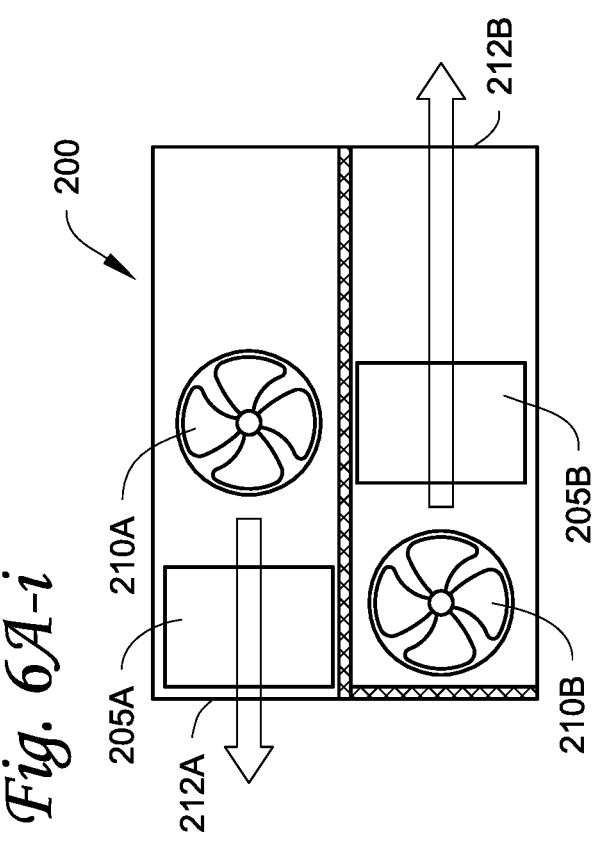
Fig. 6A-i
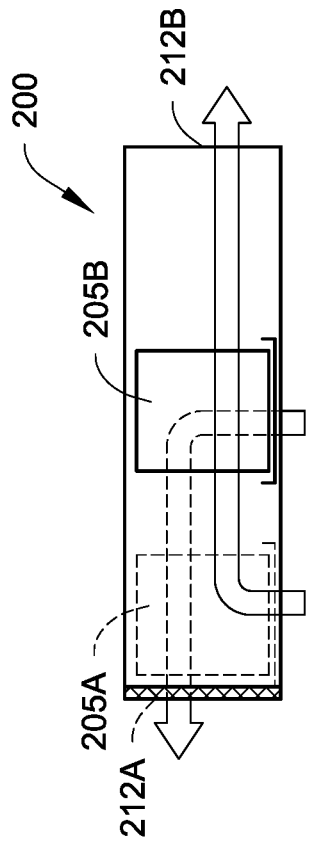
Fig. 6A-ii

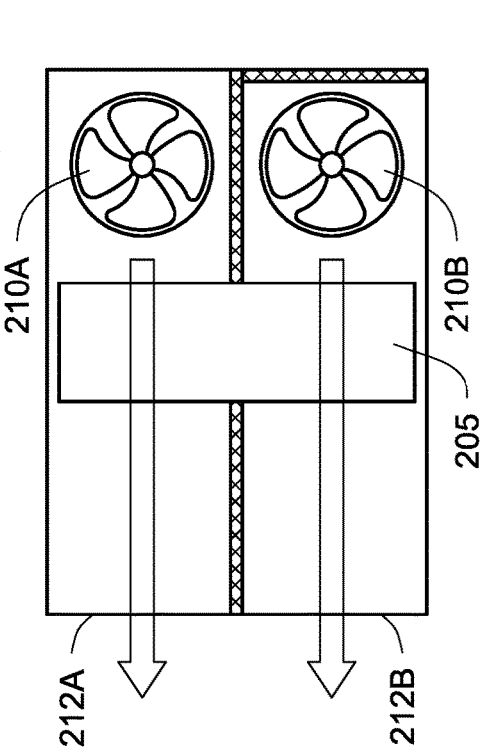
Fig. 7A-i
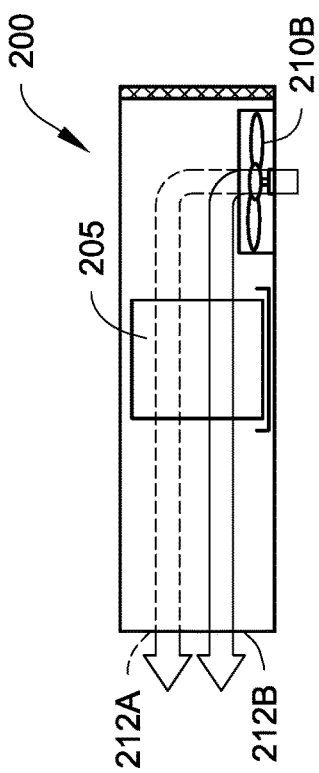
Fig. 7A-ii
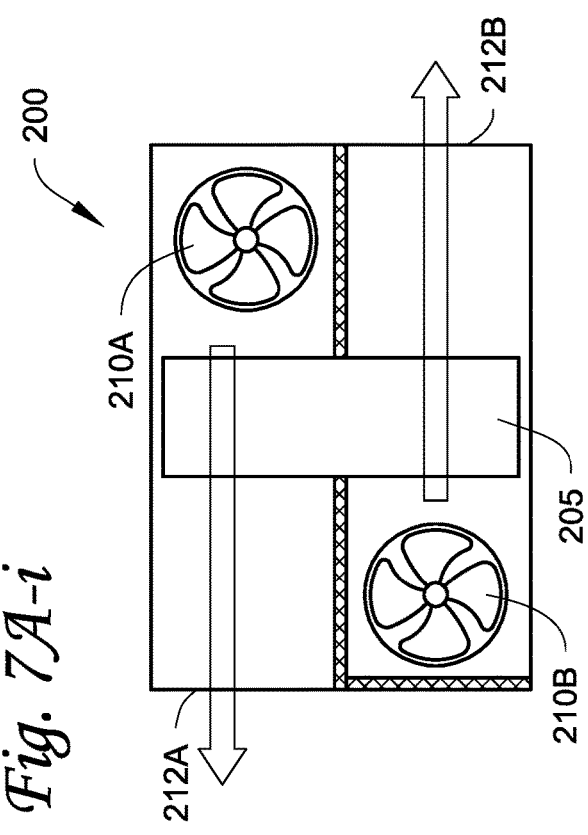
Fig. 7A-iii
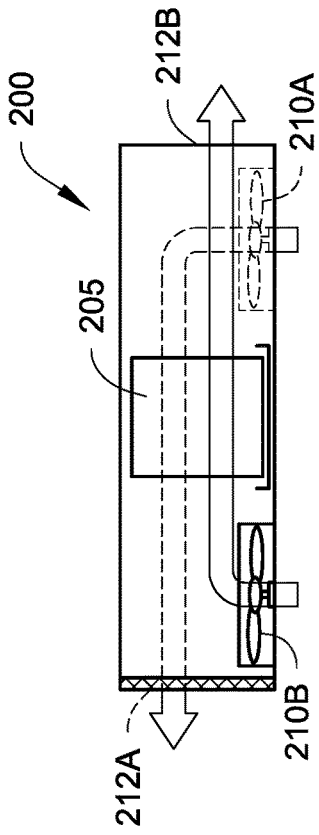
Fig. 7A-iv

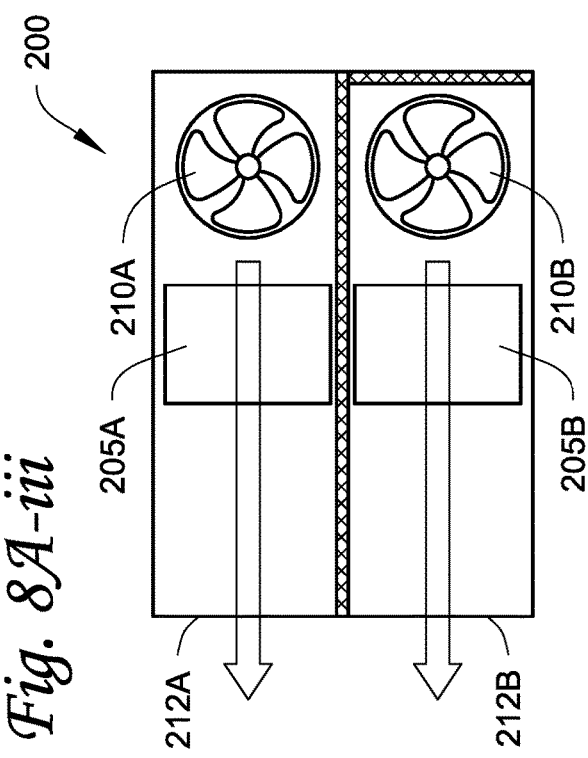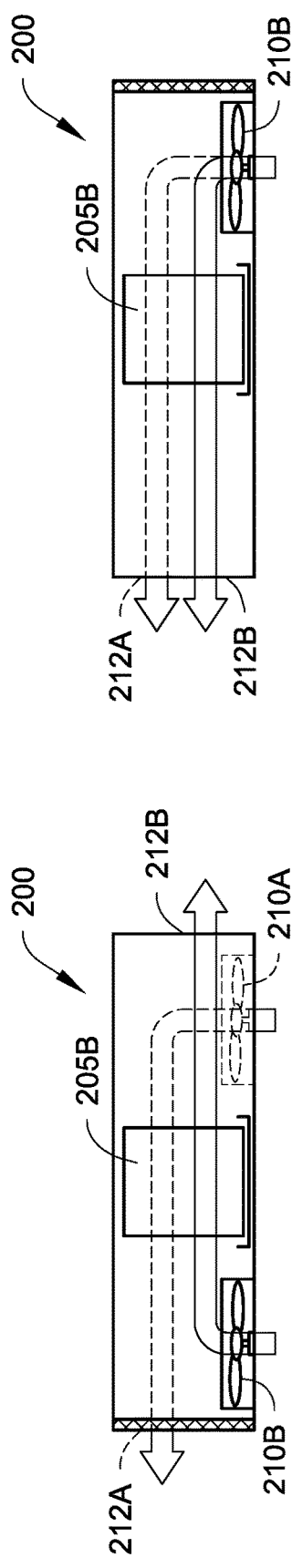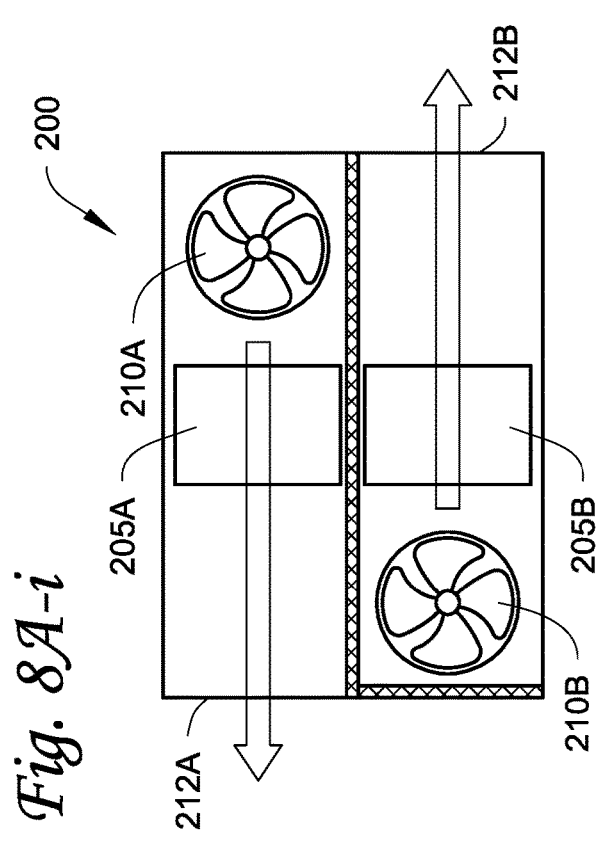

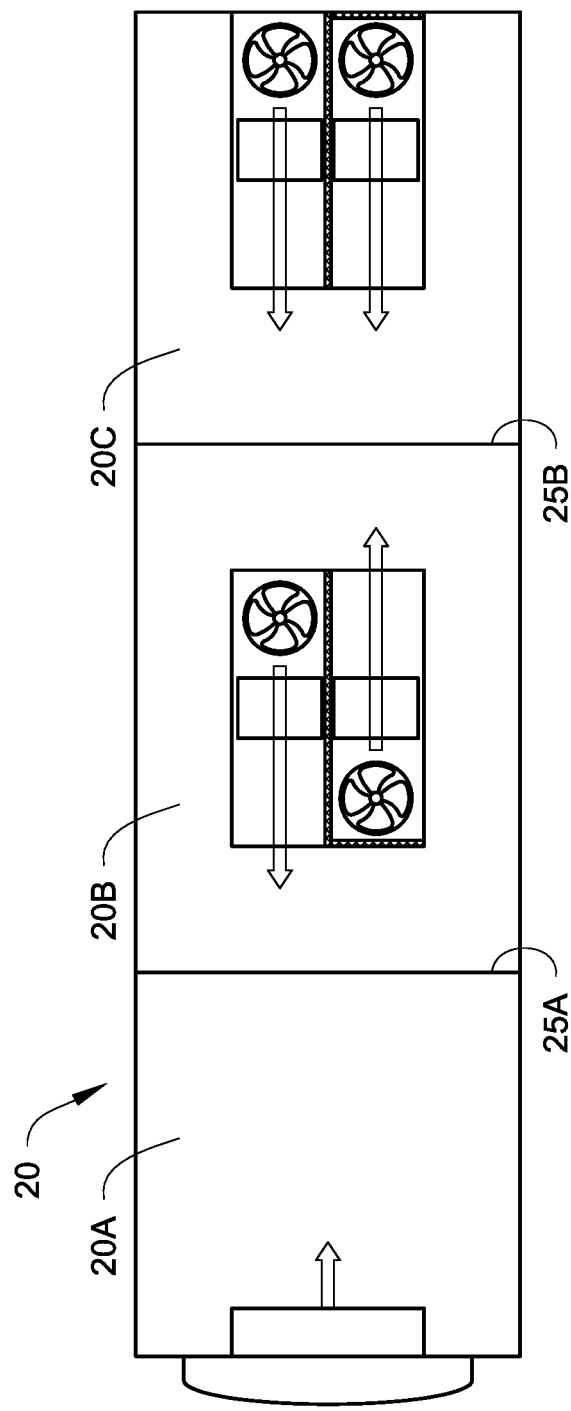

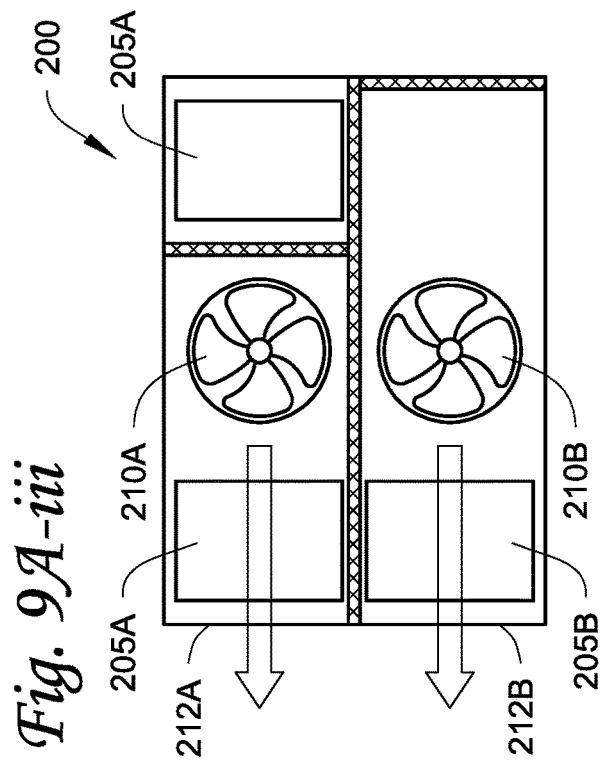
Fig. 9A-i
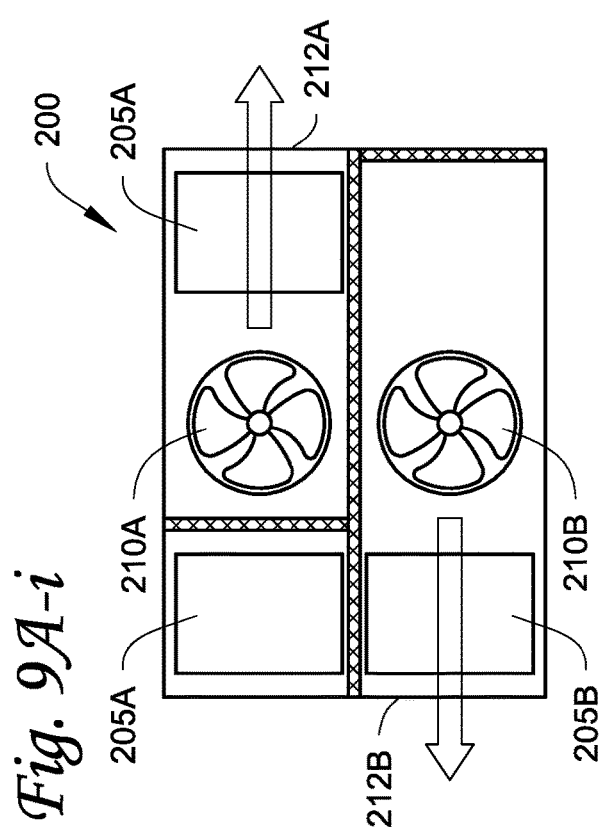
Fig. 9A-iii
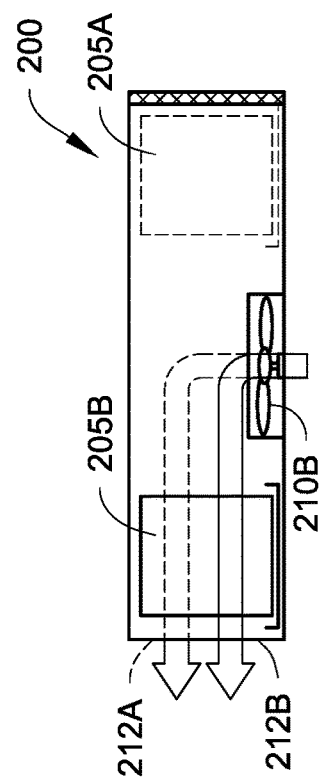
Fig. 9A-ii
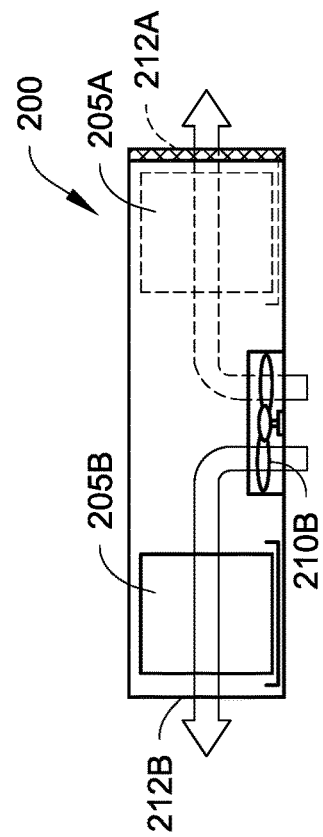
Fig. 9A-iv

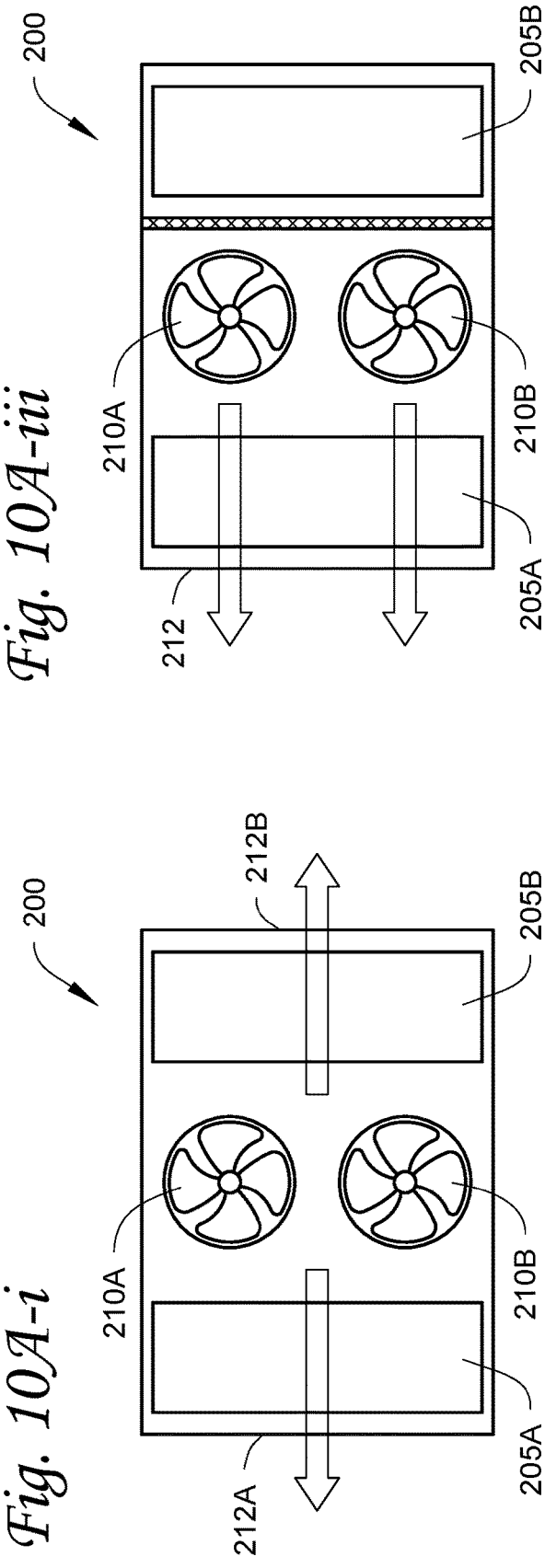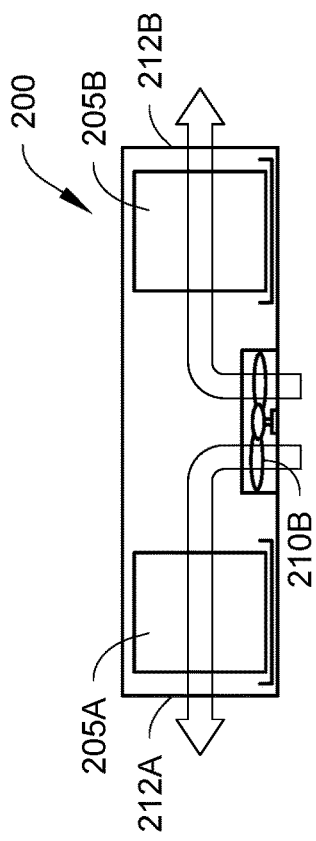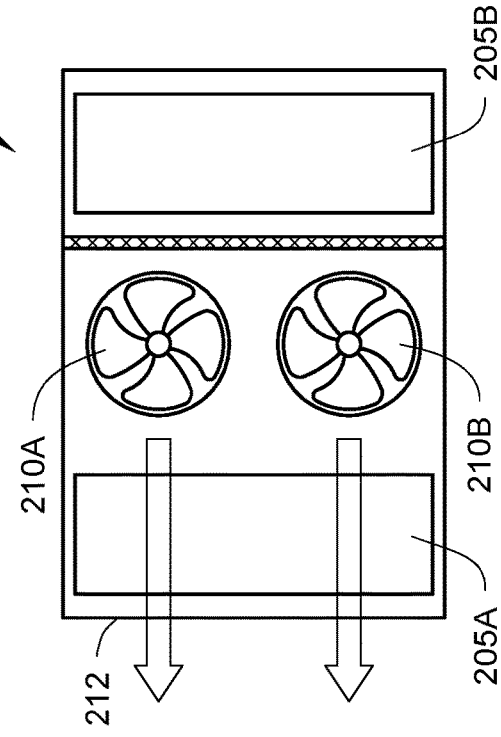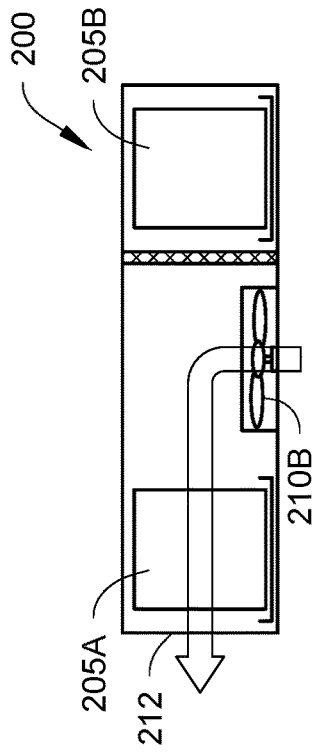

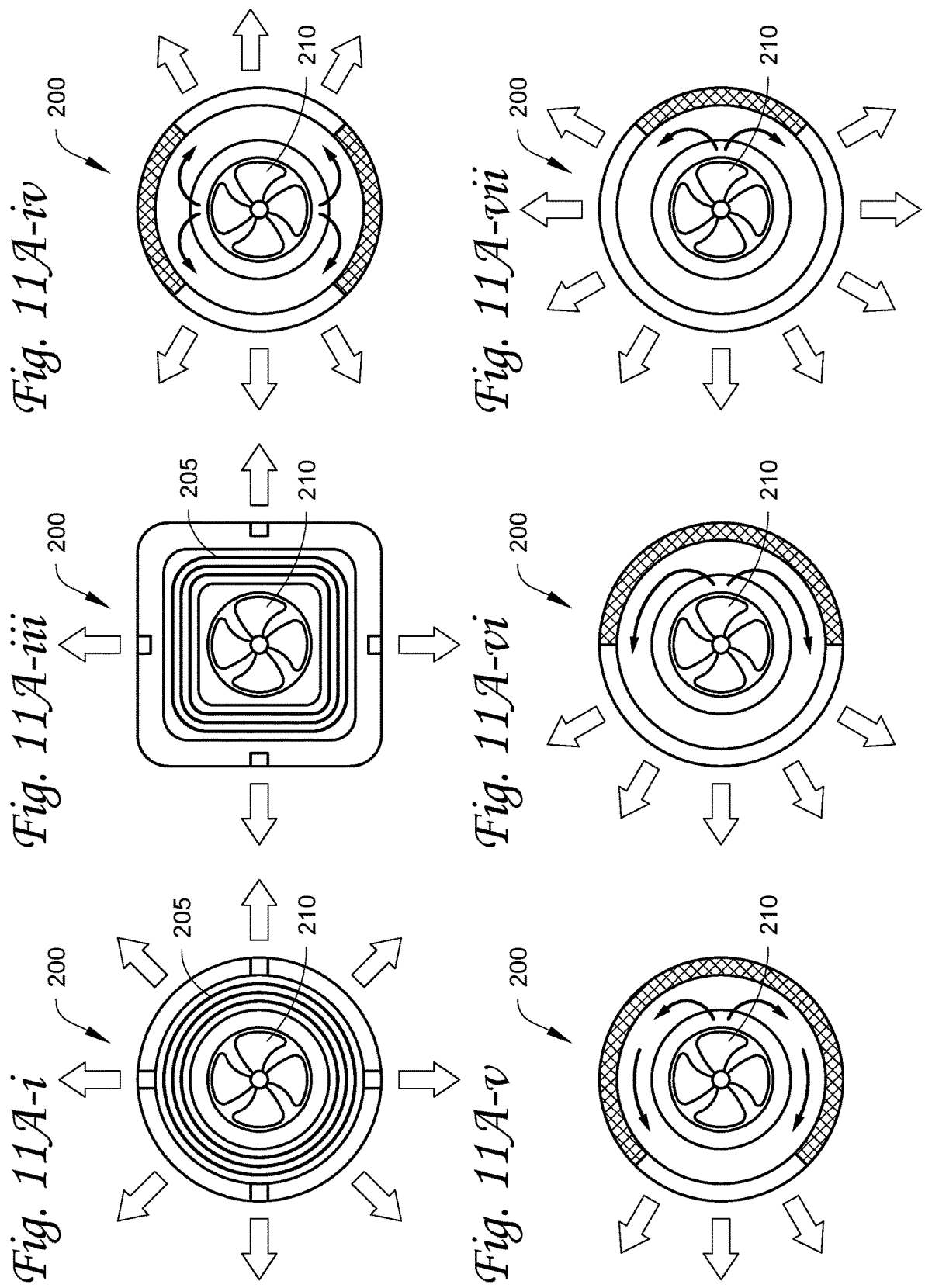

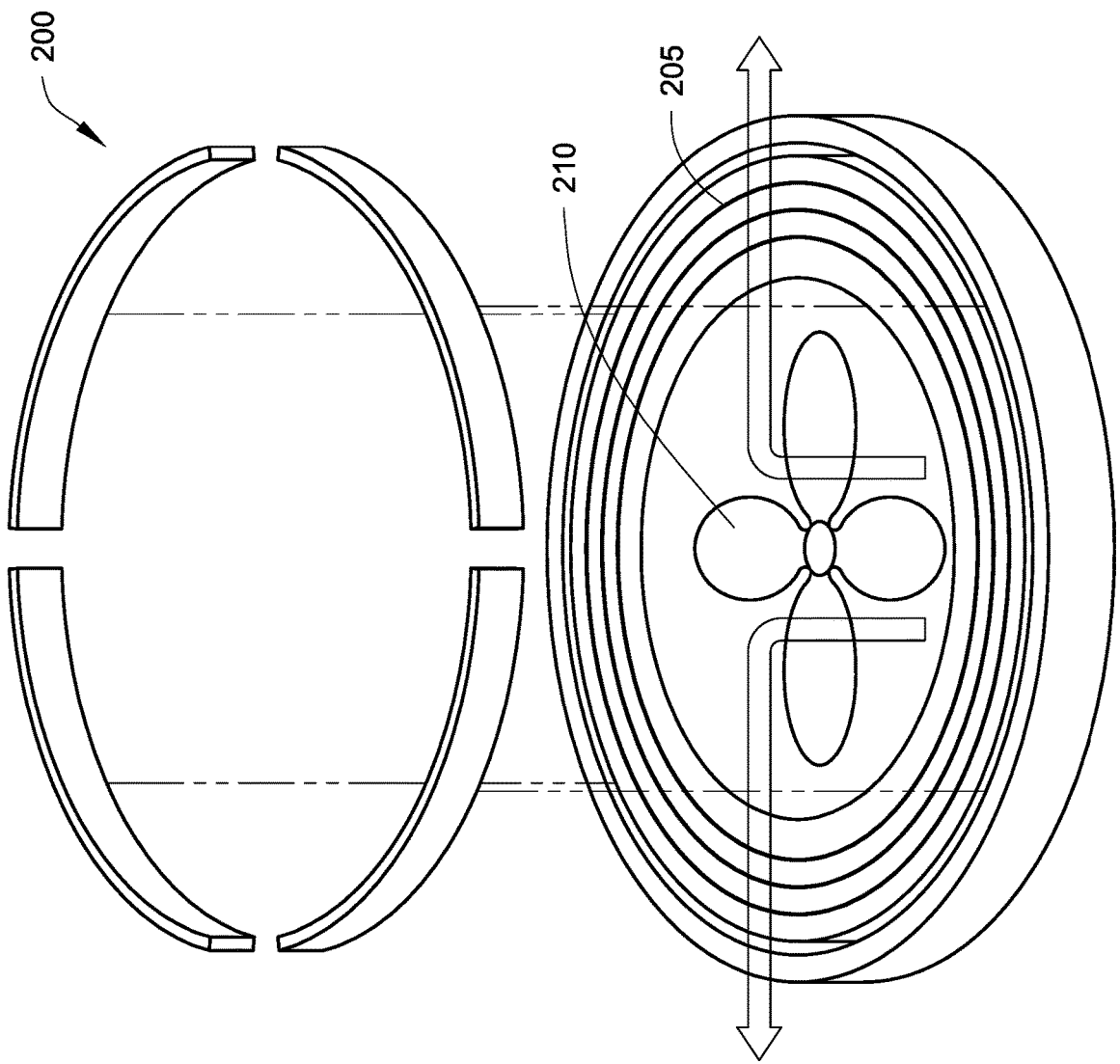
Fig. 11A-ii

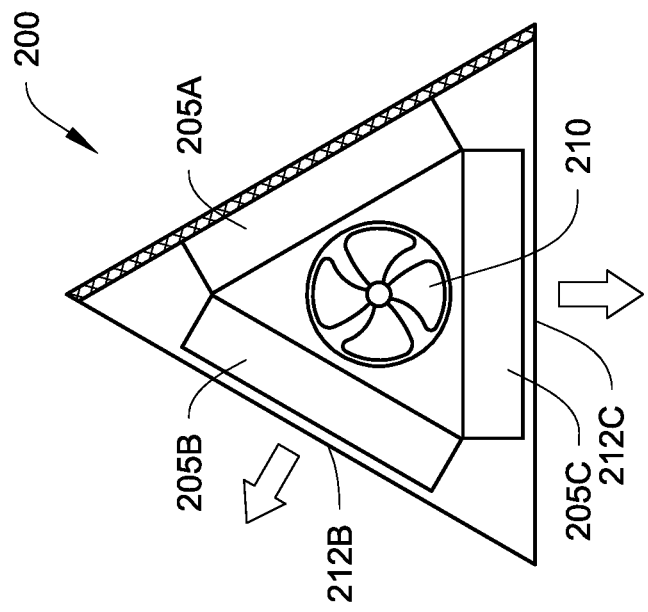
Fig. 12A-i
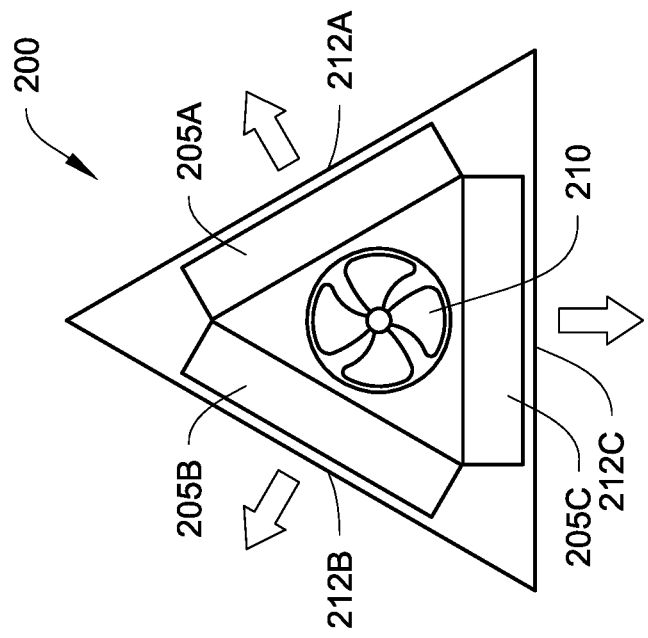
Fig. 12A-ii

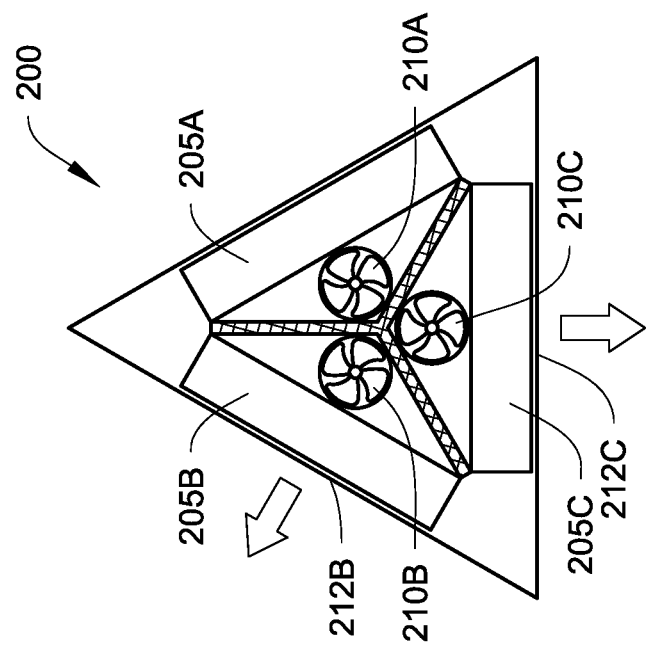
Fig. 13A-i
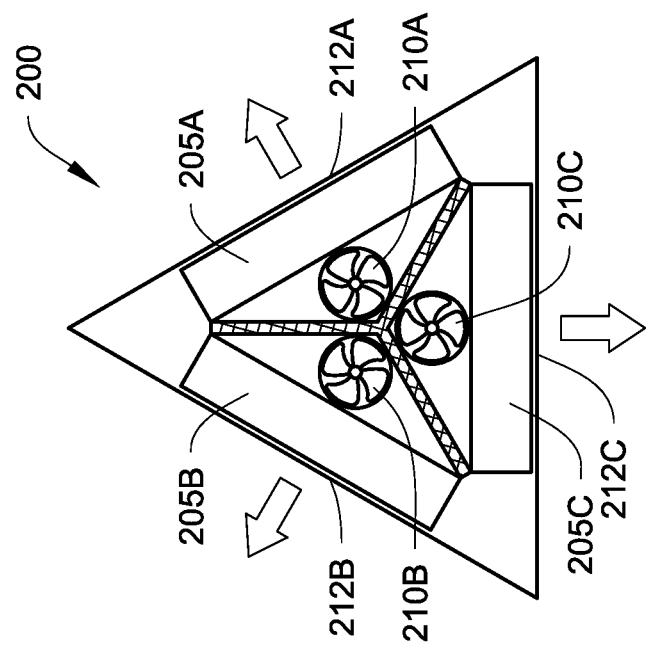
Fig. 13A-ii

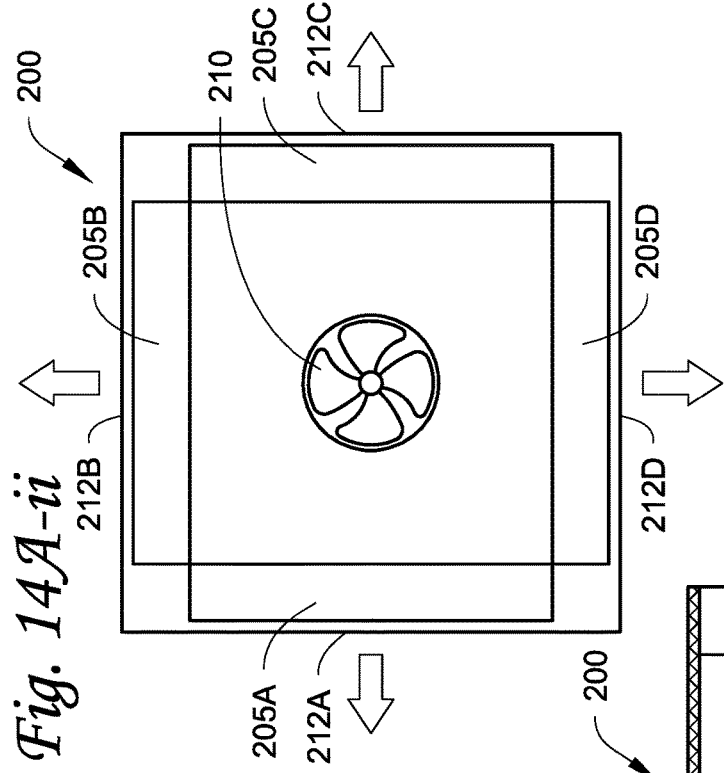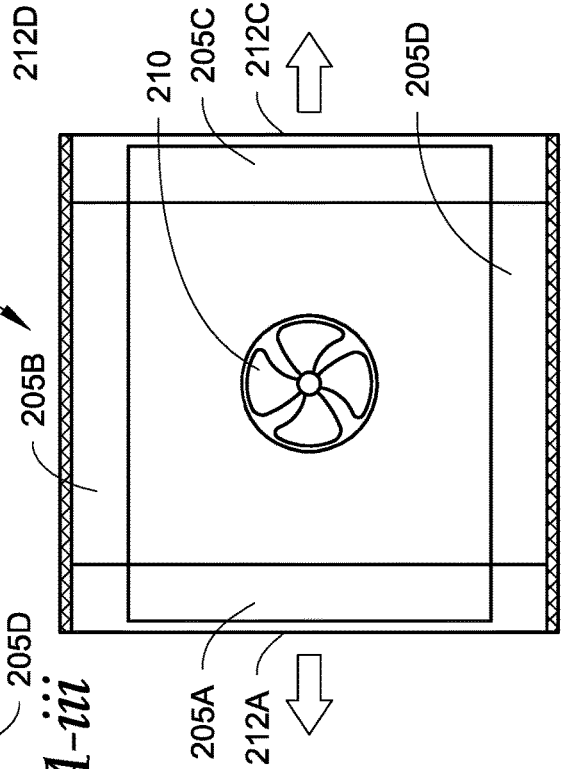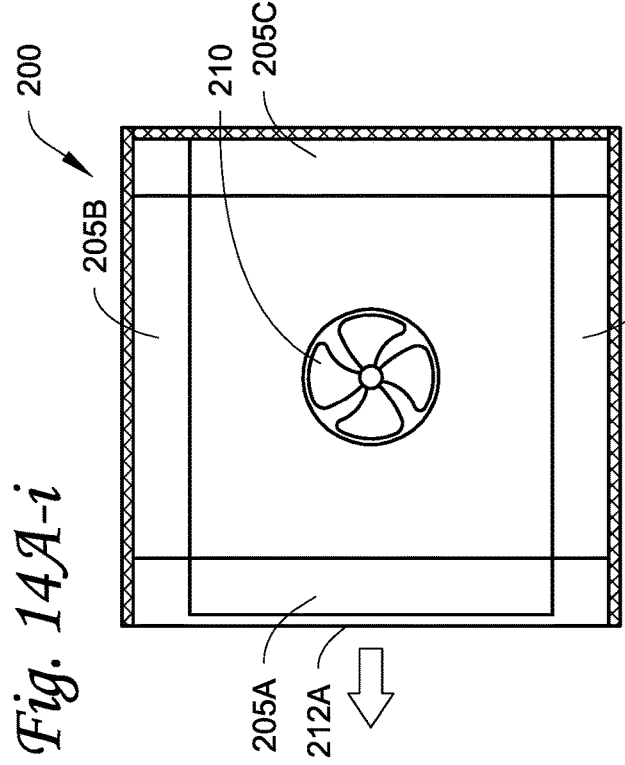

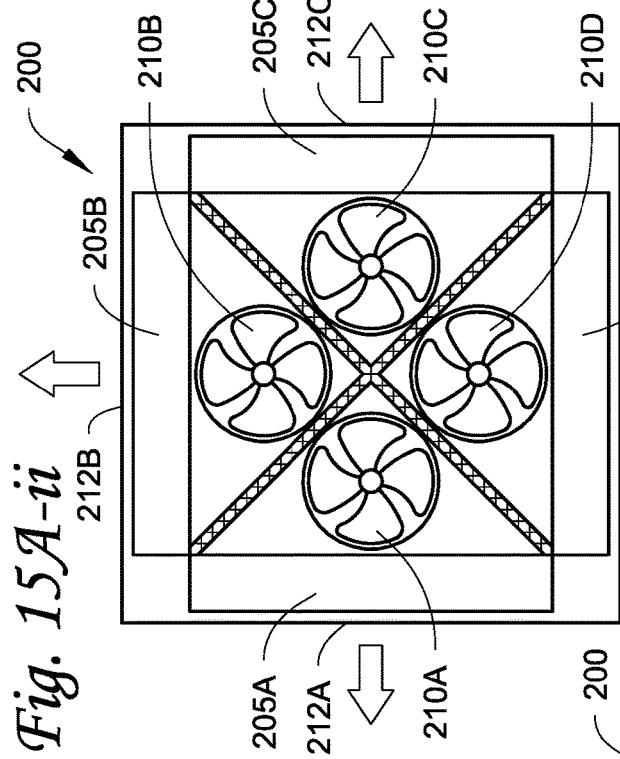
Fig. 15A-i
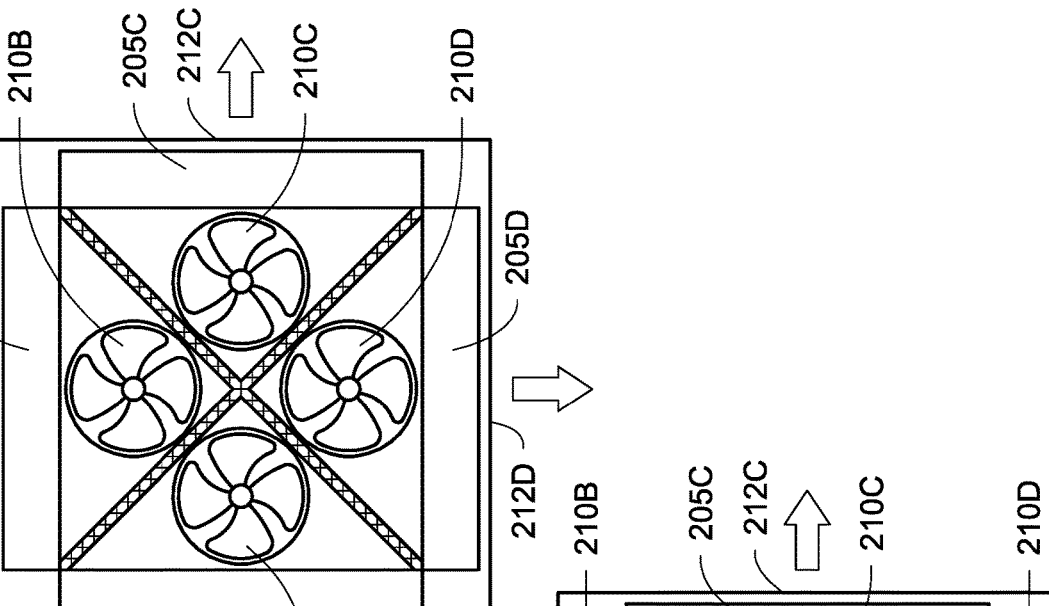
Fig. 15A-ii
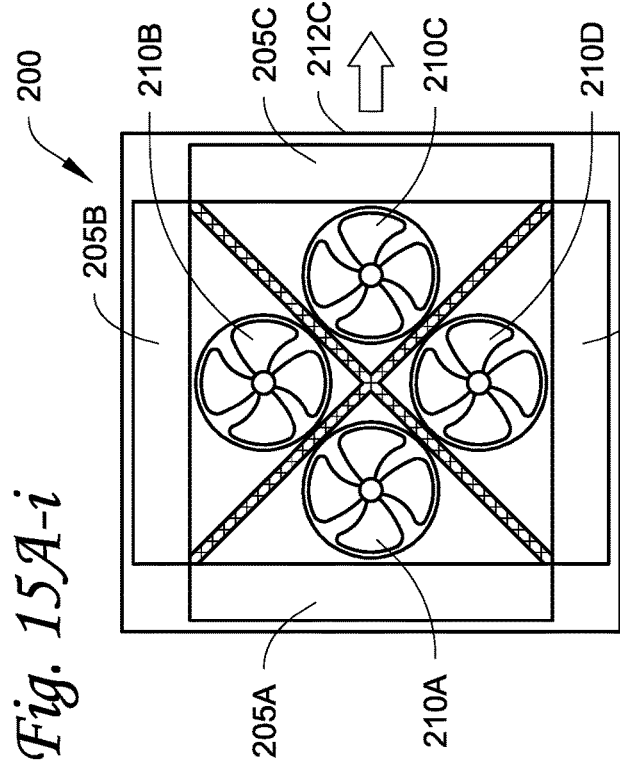
Fig. 15A-iii
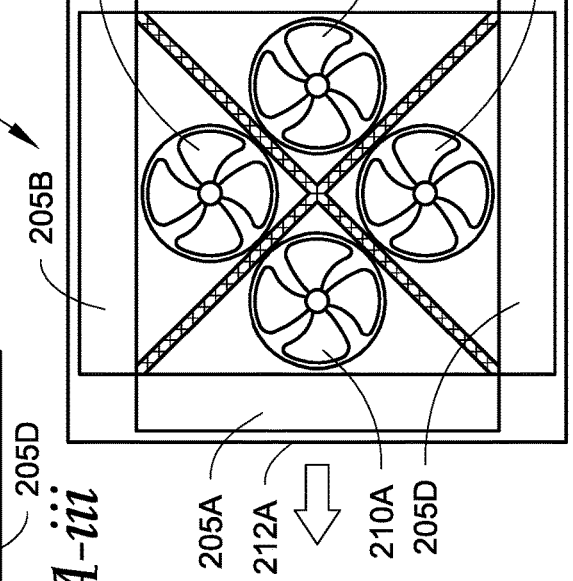

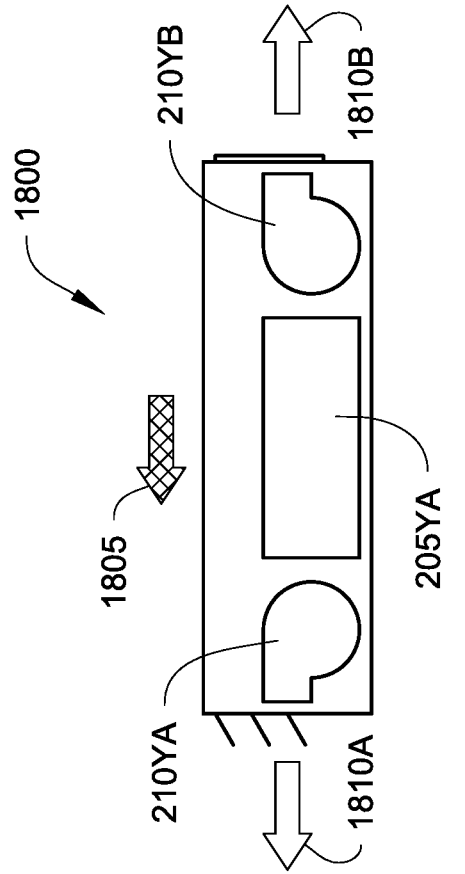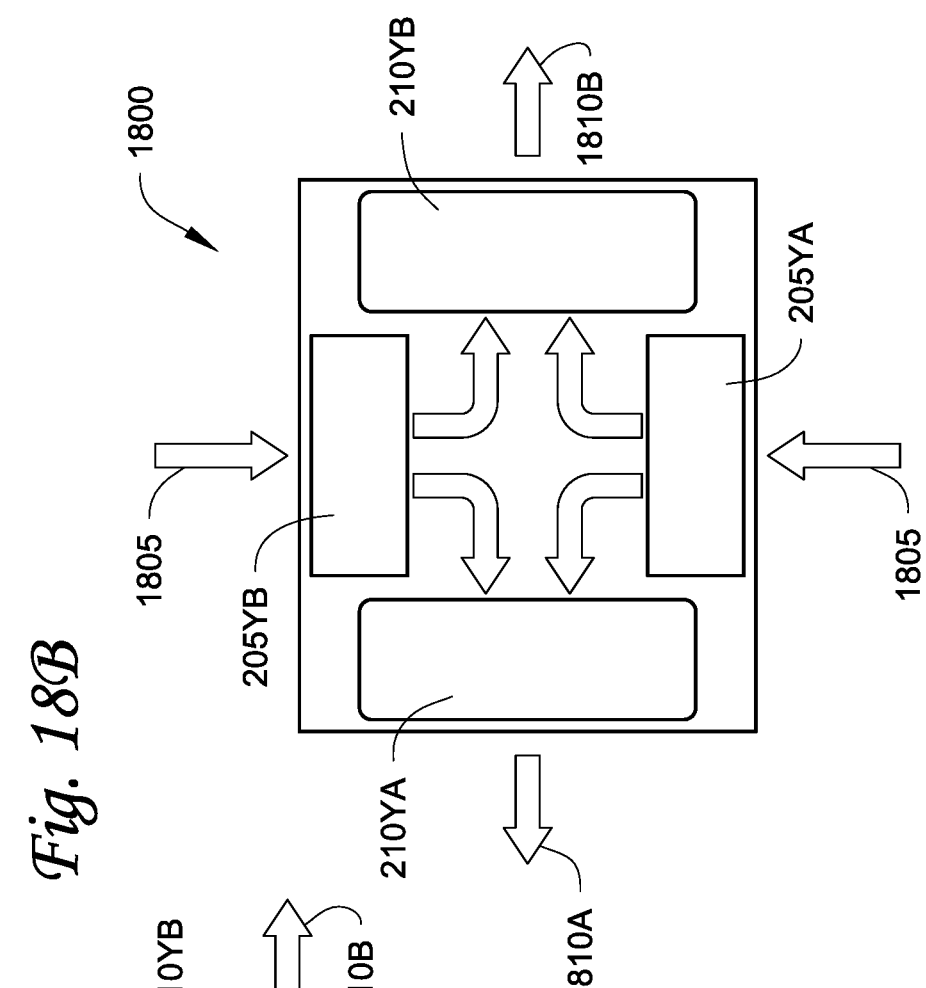
Fig. 18A
Fig. 18B

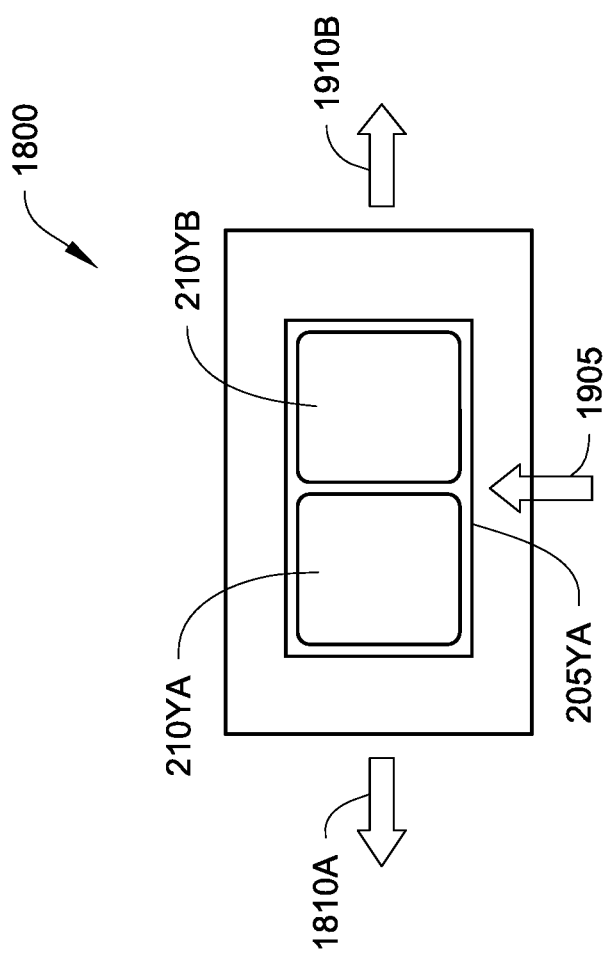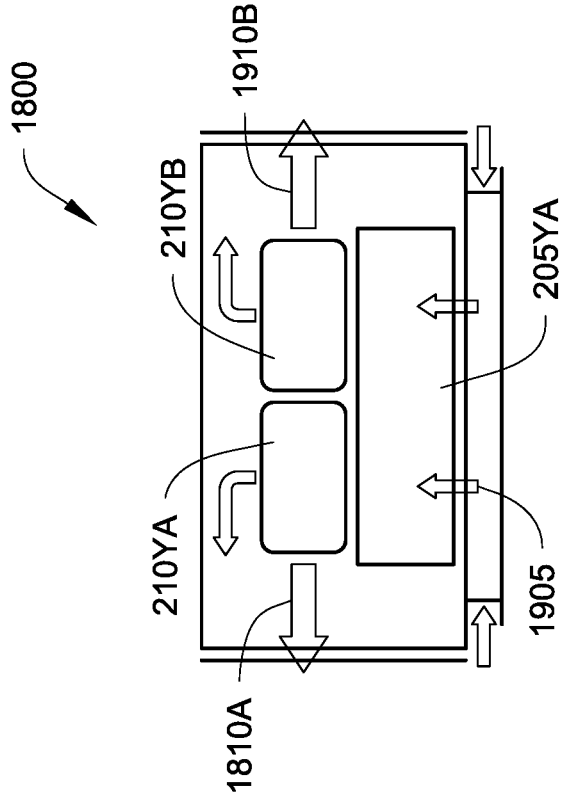

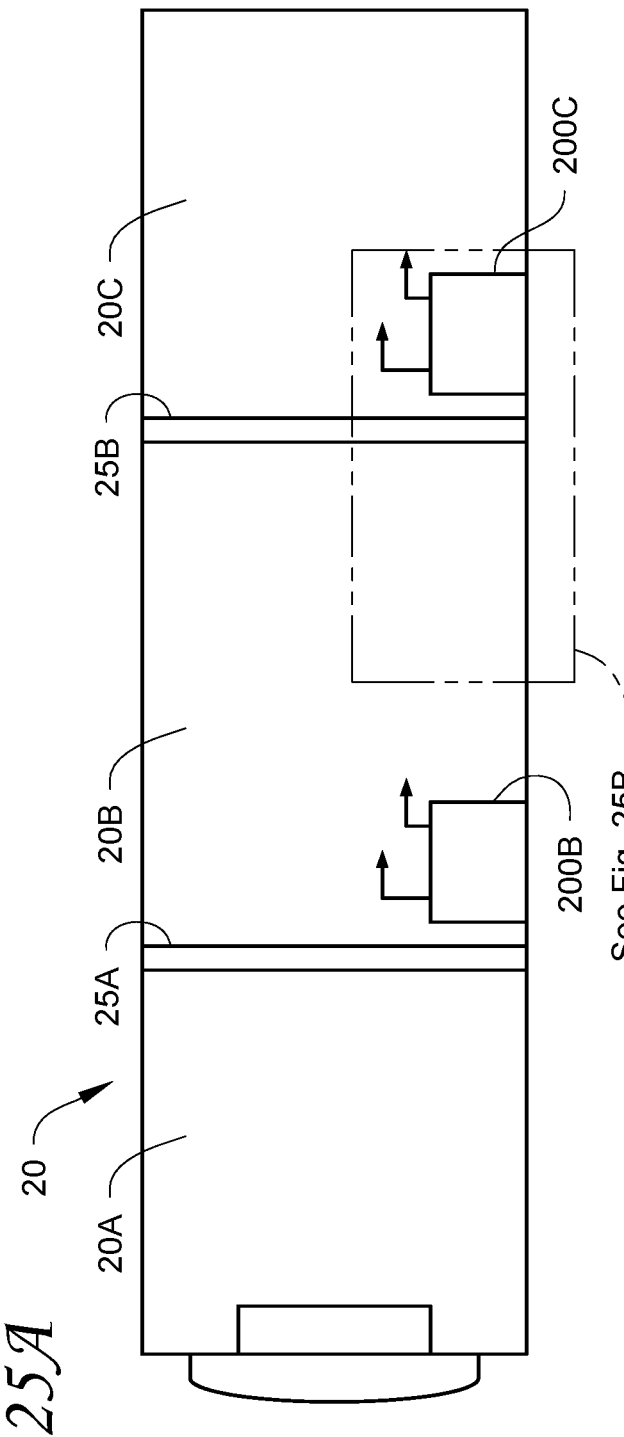
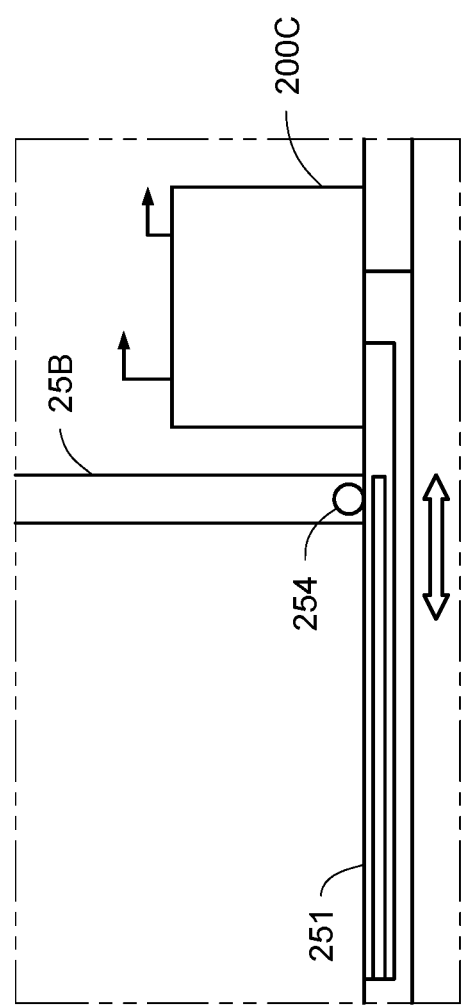
Fig. 25A
Fig. 25B

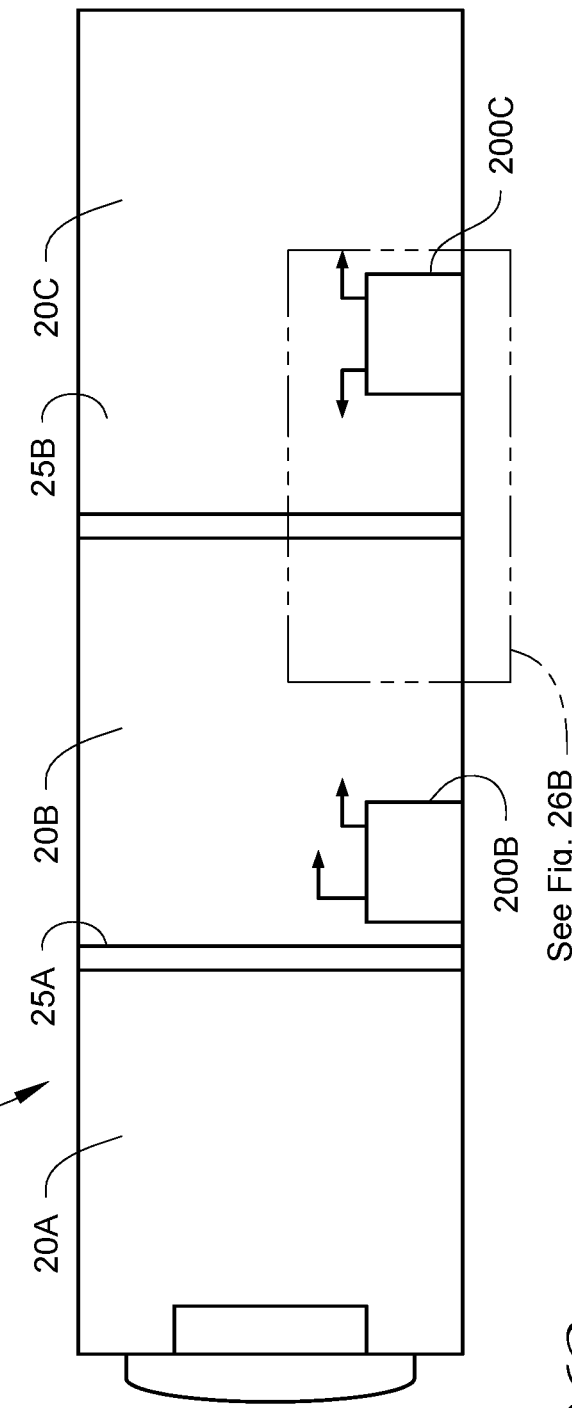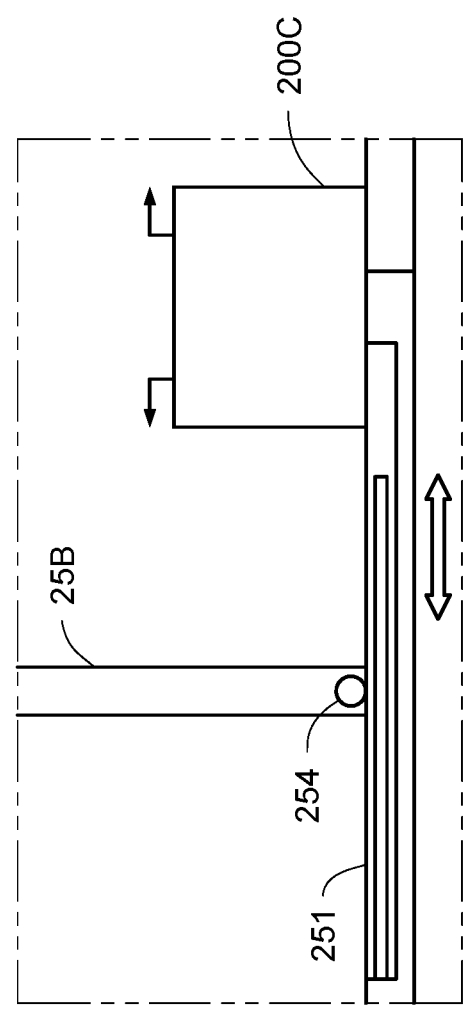

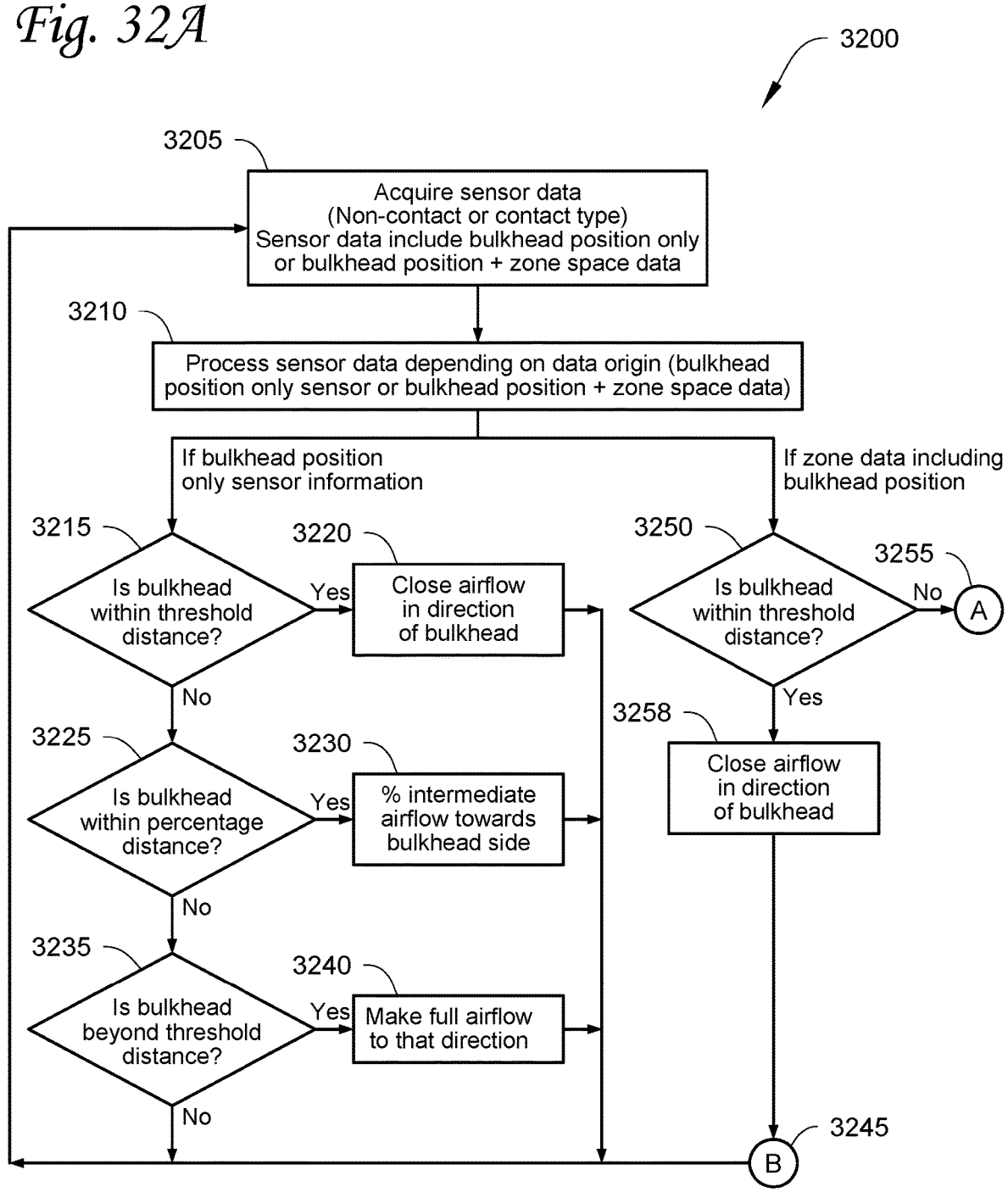

METHOD AND SYSTEM FOR CONTROLLING AIRFLOW VOLUME AND FLOW DIRECTION FROM A REMOTE HEAT EXCHANGER UNIT OF A TRANSPORT CLIMATE CONTROL SYSTEM

FIELD

The embodiments disclosed herein relate generally to a transport climate control system (TCS). In particular, the embodiments described herein are directed to a method and system for controlling airflow volume and flow direction from a remote heat exchanger unit of a transport climate control system.

BACKGROUND

A transport climate control system (TCS) is generally used to control an environmental condition (e.g., temperature, humidity, air quality, and the like) within a transport unit (e.g., a container (such as a container on a flat car, an intermodal container, etc.), a truck, a box car, or other similar transport unit). In some embodiments, the transport unit can include a plurality of zones and the TCS can be a multi-zone TCS (MTCS) that is configured to provide independent climate control to each of the plurality of zones within the transport unit.

SUMMARY

The embodiments disclosed herein relate generally to a transport climate control system (TCS). In particular, the embodiments described herein are directed to a method and system for controlling airflow volume and flow direction from a remote heat exchanger unit of a transport climate control system.

The embodiments described and recited herein pertain generally to implementing one or more remote heat exchanger units within a climate controlled space, with each of the remote heat exchanger units capable of dispensing a configurable airflow based on environmental conditions in at least a portion of the climate controlled space of the transport unit.

In particular, the embodiments described herein can allow for a configurable remote heat exchanger unit that can adjust airflow discharge arrangements to provide optimal airflow within a climate controlled space based on environmental conditions, e.g., spacing of the cargo, temperature within portions of the climate controlled space, and/or the physical layout of the climate controlled space.

Embodiments for controlling airflow volume and/or direction obviate manual configuration of the configurable remote heat exchangers or corresponding dampers are described and recited herein. As a result, a customer may be relieved of the organizational burden to remember to manually reconfigure the airflow as well as the physical burden to do so. Further still, the customer would be relieved of the need to train operators to do so, since airflow management would be automated.

Further still, the embodiments described herein for controlling airflow volume and/or direction may be regarded as an advancement in temperature management of a climate controlled space or one or more zones of a climate controlled space. For example, upon sensing or detecting a need to drop temperatures within a given climate controlled space to, for example, preserve cargo, the temperature may be pulled down more quickly as managed by the embodiments described and recited herein.

In one embodiment, a method for controlling airflow volume and flow direction from a remote heat exchanger of a transport climate control system includes: a controller receiving data from a sensor within at least a portion of a climate controlled space, wherein the received data indicates a position of a bulkhead within the climate controlled space relative to a position of the remote heat exchanger; determining an airflow volume and determining a flow direction from the remote heat exchanger unit based on the received data; and instructing the remote heat exchanger to provide the determined airflow volume and the determined flow direction; and the remote heat exchanger receiving instructions from the controller and adjusting operation to provide the determined airflow volume and the determined flow direction based on the instructions.

DRAWINGS

Reference may be made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

FIG. 1 shows a schematic cross sectional side view of a climate controlled transport unit, in accordance with one or more non-limiting example embodiments of a remote heat exchanger unit with configurable air discharge.

FIG. 2A-i shows an air duct system with a configurable air discharge, in accordance with at least one example embodiment described and recited herein.

FIG. 2A-ii shows an air duct system with another configurable air discharge, in accordance with at least one example embodiment described and recited herein.

Example FIG. 2A-iii shows an air duct system with yet another configurable air discharge, in accordance with at least one example embodiment described and recited herein.

Example FIG. 2A-iv shows a side view of a remote heat exchanger unit utilized in the example embodiments of FIGS. 2A-i and 2A-ii.

FIG. 2B shows a schematic diagram of a separable air duct system, in accordance with example embodiments described and recited herein.

FIG. 2C-i shows an example environment with an example deployment of the remote heat exchanger unit of FIGS. 2A-i and 2A-ii, in accordance with at least some of the embodiments described and recited herein.

FIG. 2C-ii shows an example environment with another example deployment of the remote heat exchanger unit of FIGS. 2A-i and 2A-ii, in accordance with at least some of the embodiments described and recited herein.

FIG. 4A-i shows a schematic diagram of an example architecture of a remote heat exchanger unit with an example air discharge configuration, in accordance with at least one example embodiment described and recited herein.

Figure 4B:
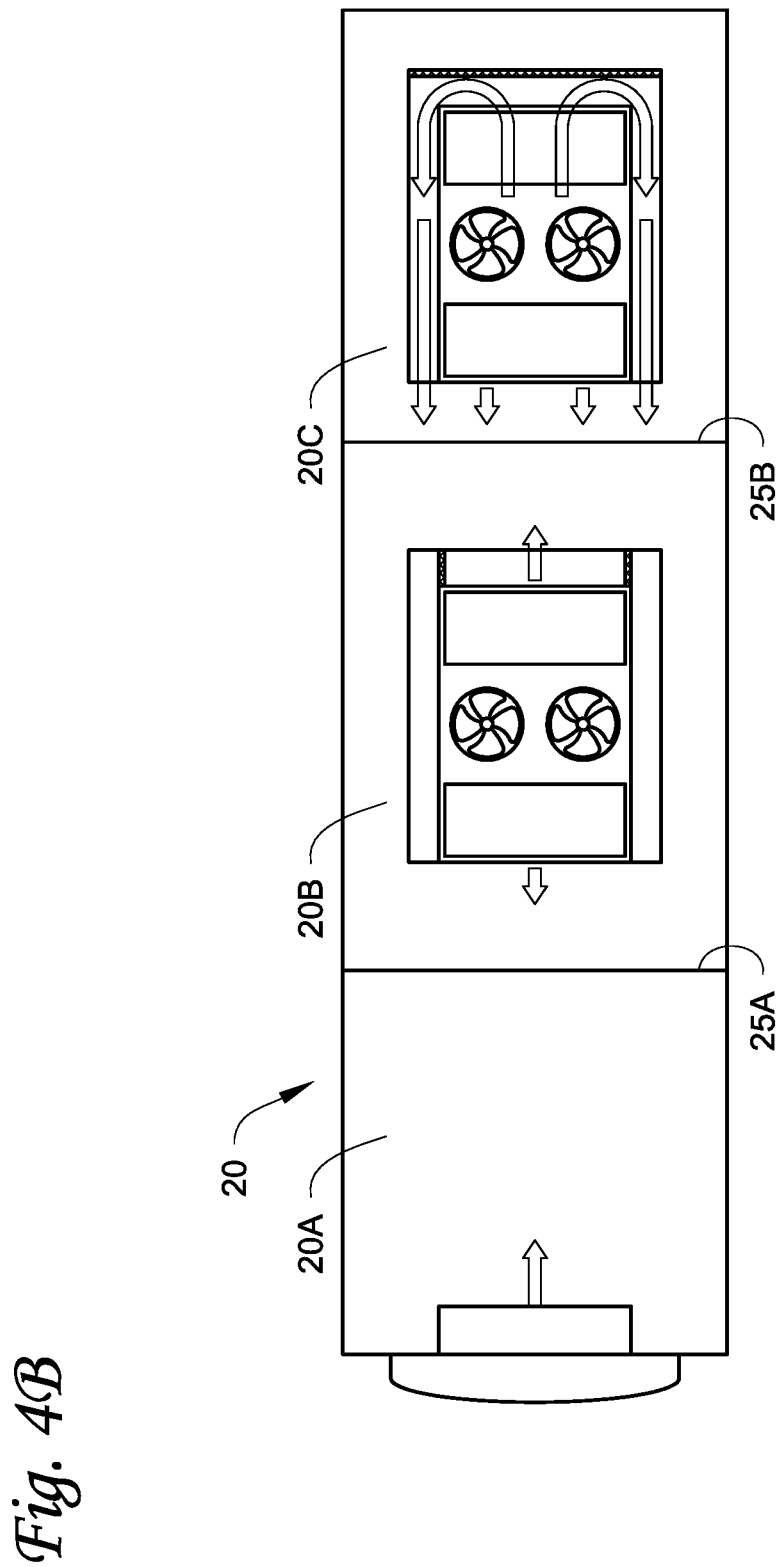

FIG. 4A-ii shows a side view of a remote heat exchanger unit in accordance with the example of FIG. 4A-i.

FIG. 4A-iii shows a schematic diagram of an example architecture of a remote heat exchanger unit with another example air discharge configuration, in accordance with at least one example embodiment described and recited herein.

FIG. 4A-iv shows a side view of a remote heat exchanger unit in accordance with the example of FIG. 4A-iii.

FIG. 4B shows an example environment for the remote heat exchanger unit of FIGS. 4A-i and 4A-iii, in accordance with at least some of the embodiments described and recited herein.

FIG. 5A-i shows a schematic diagram of an example architecture of a remote heat exchanger unit with an example air discharge configuration, in accordance with at least one example embodiment described and recited herein.

Figure 5B:
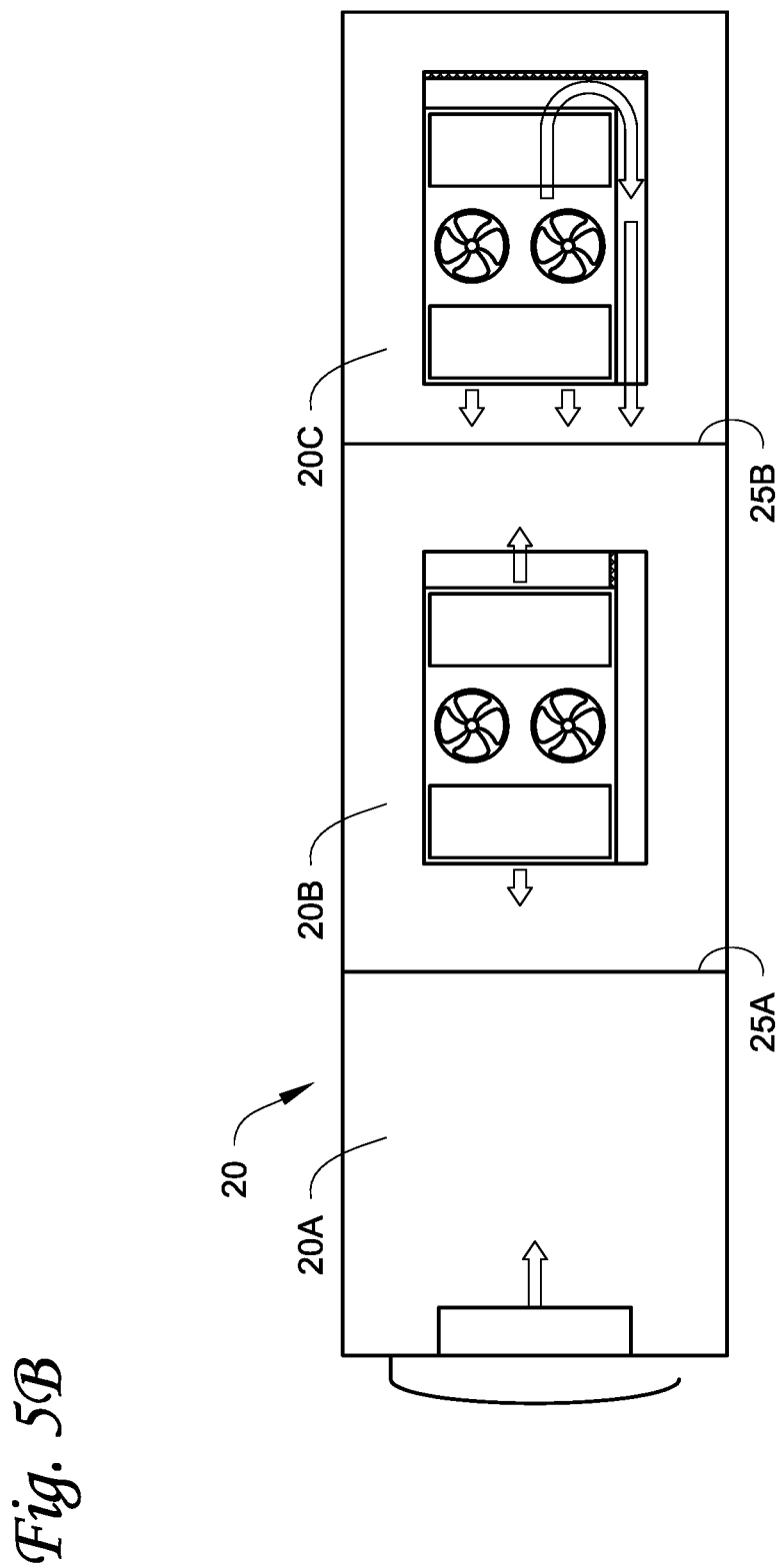

FIG. 5A-ii shows a side view of a remote heat exchanger unit in accordance with the example of FIG. 5A-i.

FIG. 5A-iii shows a schematic diagram of an example architecture of a remote heat exchanger unit with another example air discharge configuration, in accordance with at least one example embodiment described and recited herein.

FIG. 5A-iv shows a side view of a remote heat exchanger unit in accordance with the example of FIG. 5A-iii.

FIG. 5B shows an example environment for the remote heat exchanger unit of FIGS. 5A-i and 5A-iii, in accordance with at least some of the embodiments described and recited herein.

FIG. 6A-i shows a schematic diagram of an example architecture of a remote heat exchanger unit with yet another example air discharge configuration, in accordance with at least one example embodiment described and recited herein.

Figure 6B:
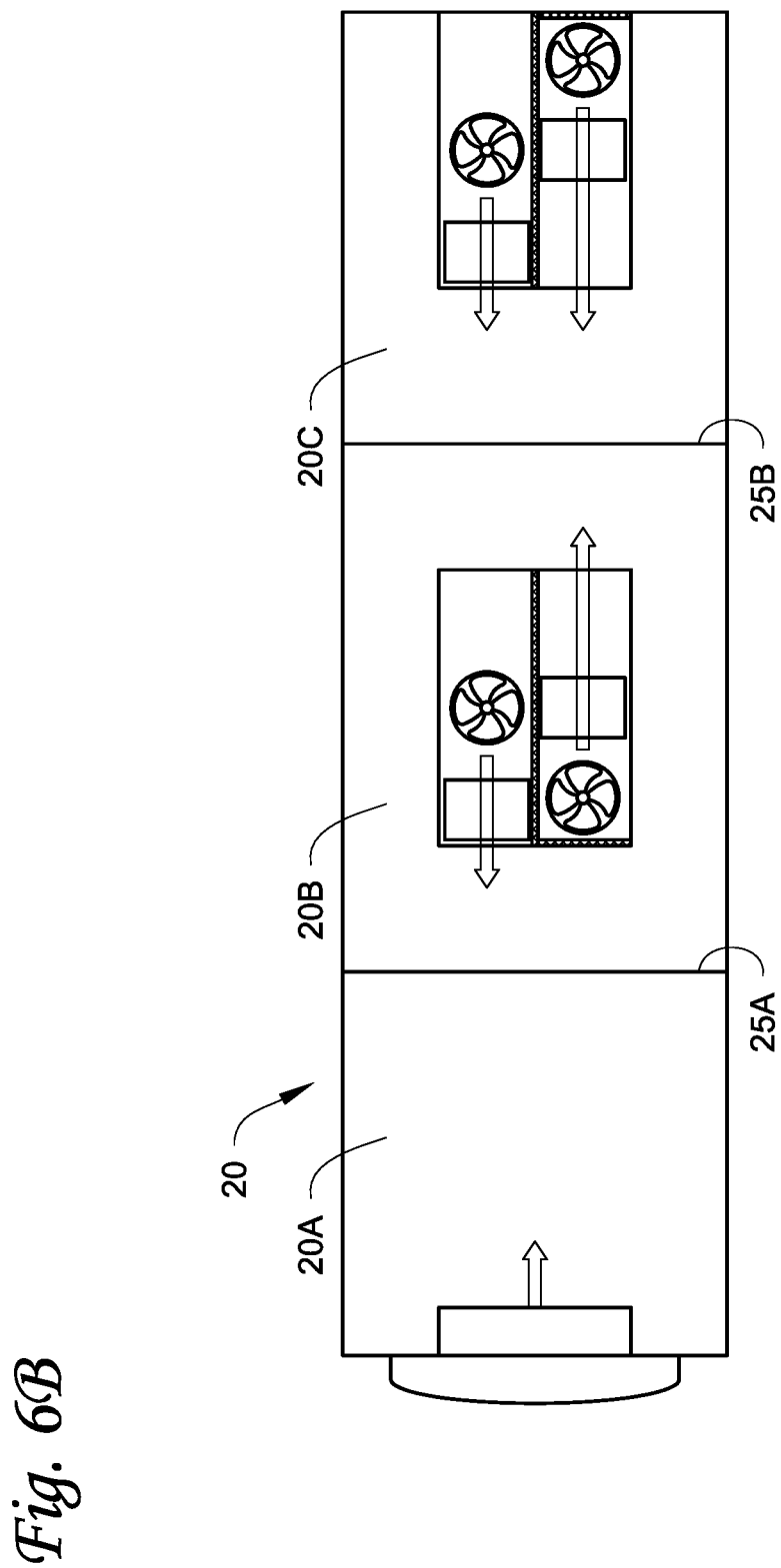

FIG. 6A-ii shows a side view of a remote heat exchanger unit in accordance with the example of FIG. 6A-i.

FIG. 6A-iii shows a schematic diagram of an example architecture of a remote heat exchanger unit with another example air discharge configuration, in accordance with at least one example embodiment described and recited herein.

FIG. 6A-iv shows a side view of a remote heat exchanger unit in accordance with the example of FIG. 6A-iii.

FIG. 6B shows an example environment for the remote heat exchanger unit of FIGS. 6A-i and 6A-iii, in accordance with at least some of the embodiments described and recited herein.

FIG. 7A-i shows a schematic diagram of an example architecture of a remote heat exchanger unit with yet another example air discharge configuration, in accordance with at least one example embodiment described and recited herein.

Figure 7B:
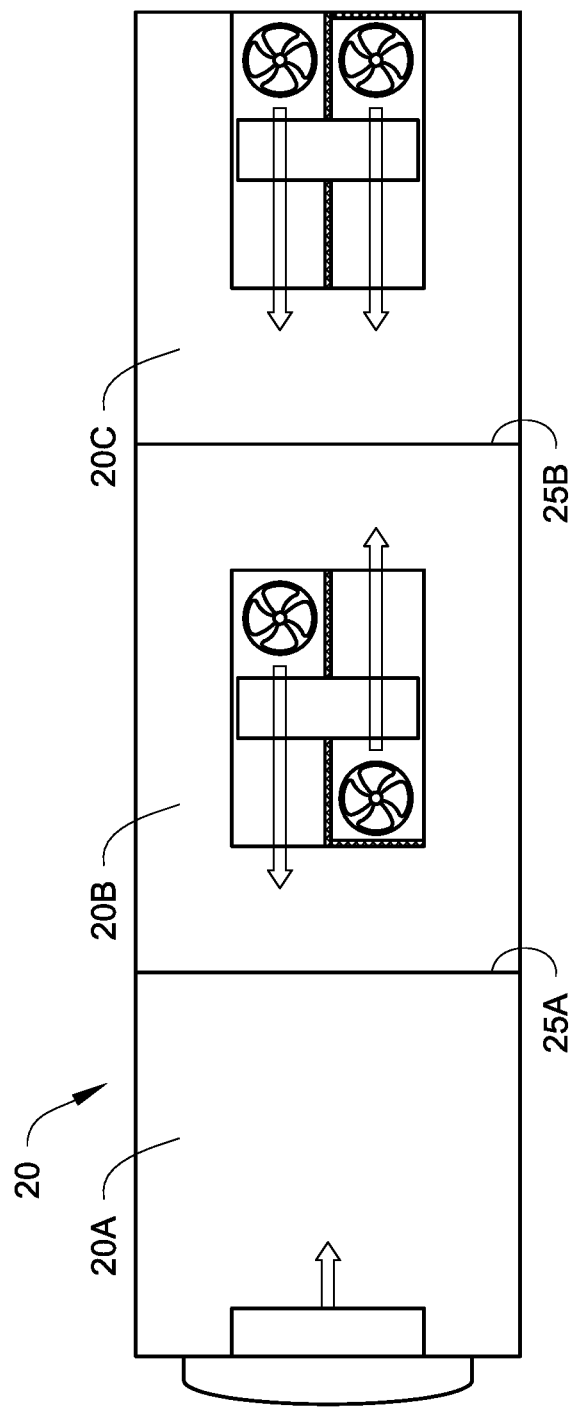

FIG. 7A-ii shows a side view of a remote heat exchanger unit in accordance with the example of FIG. 7A-i.

FIG. 7A-iii shows a schematic diagram of an example architecture of a remote heat exchanger unit with another example air discharge configuration, in accordance with at least one example embodiment described and recited herein.

FIG. 7A-iv shows a side view of a remote heat exchanger unit in accordance with the example of FIG. 7A-iii.

FIG. 7B shows an example environment for the remote heat exchanger unit of FIGS. 7A-i and 7A-iii, in accordance with at least some of the embodiments described and recited herein.

FIG. 8A-i shows a schematic diagram of an example architecture of a remote heat exchanger unit with yet another example air discharge configuration, in accordance with at least one example embodiment described and recited herein.

FIG. 8A-ii shows a side view of a remote heat exchanger unit in accordance with the example of FIG. 8A-i.

FIG. 8A-iii shows a schematic diagram of an example architecture of a remote heat exchanger unit with another example air discharge configuration, in accordance with at least one example embodiment described and recited herein.

FIG. 8A-iv shows a side view of a remote heat exchanger unit in accordance with the example of FIG. 8A-iii.

FIG. 8B shows an example environment for the remote heat exchanger unit of FIGS. 8A-i and 8A-iii, in accordance with at least some of the embodiments described and recited herein.

FIG. 9A-i shows a schematic diagram of an example architecture of a remote heat exchanger unit with yet another example air discharge configuration, in accordance with at least one example embodiment described and recited herein.

Figure 9B:
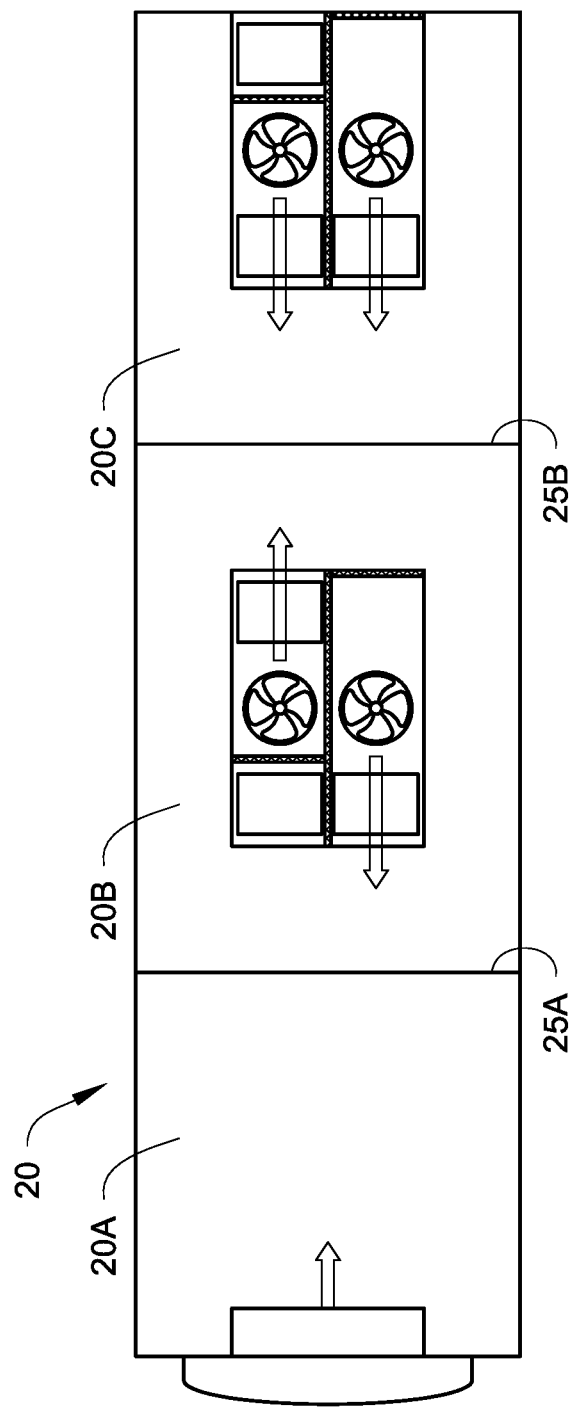

FIG. 9A-ii shows a side view of a remote heat exchanger unit in accordance with the example of FIG. 9A-i.

FIG. 9A-iii shows a schematic diagram of an example architecture of a remote heat exchanger unit with another example air discharge configuration, in accordance with at least one example embodiment described and recited herein.

FIG. 9A-iv shows a side view of a remote heat exchanger unit in accordance with the example of FIG. 9A-iii.

FIG. 9B shows an example environment for the remote heat exchanger unit of FIGS. 9A-i and 9A-iii, in accordance with at least some of the embodiments described and recited herein.

FIG. 10A-i shows a schematic diagram of an example architecture of a remote heat exchanger unit with yet another example air discharge configuration, in accordance with at least one example embodiment described and recited herein.

Figure 10B:
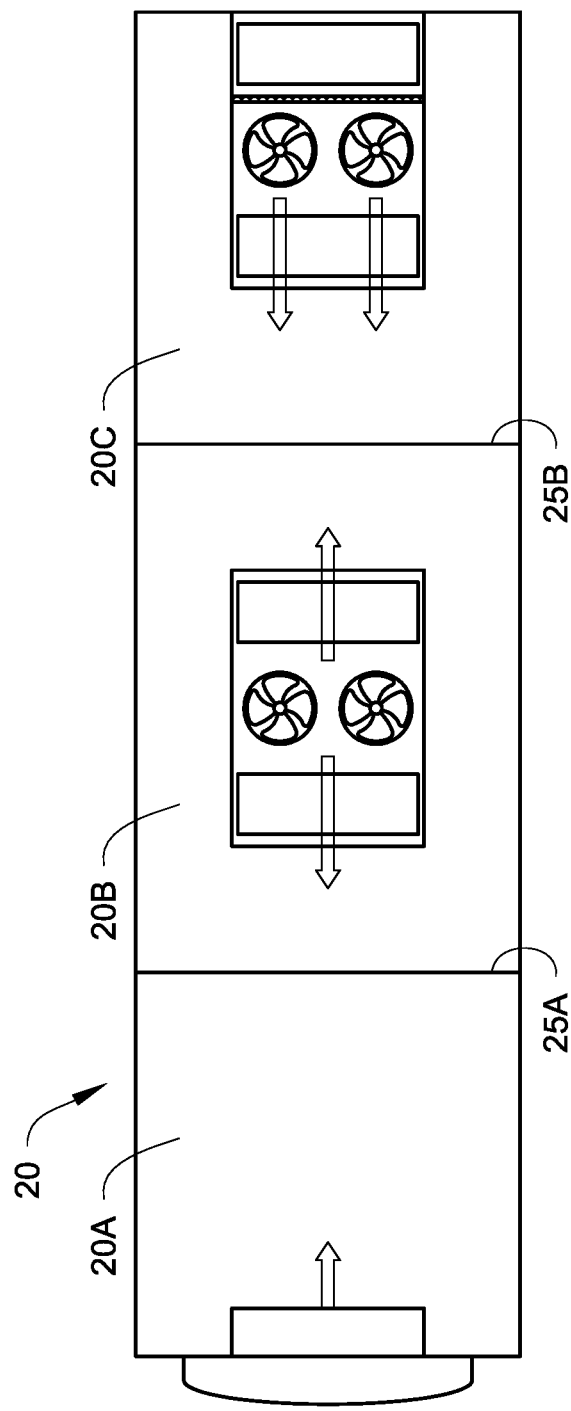

FIG. 10A-ii shows a side view of a remote heat exchanger unit in accordance with the example of FIG. 10A-i.

FIG. 10A-iii shows a schematic diagram of an example architecture of a remote heat exchanger unit with another example air discharge configuration, in accordance with at least one example embodiment described and recited herein.

FIG. 10A-iv shows a side view of a remote heat exchanger unit in accordance with the example of FIG. 10A-iii.

FIG. 10B shows an example environment for the remote heat exchanger unit of FIGS. 10A-i and 10A-iii, in accordance with at least some of the embodiments described and recited herein.

FIG. 11A-i shows a schematic diagram of an example architecture of a remote heat exchanger unit with yet another example air discharge configuration, in accordance with at least one example embodiment described and recited herein.

Figure 11B:
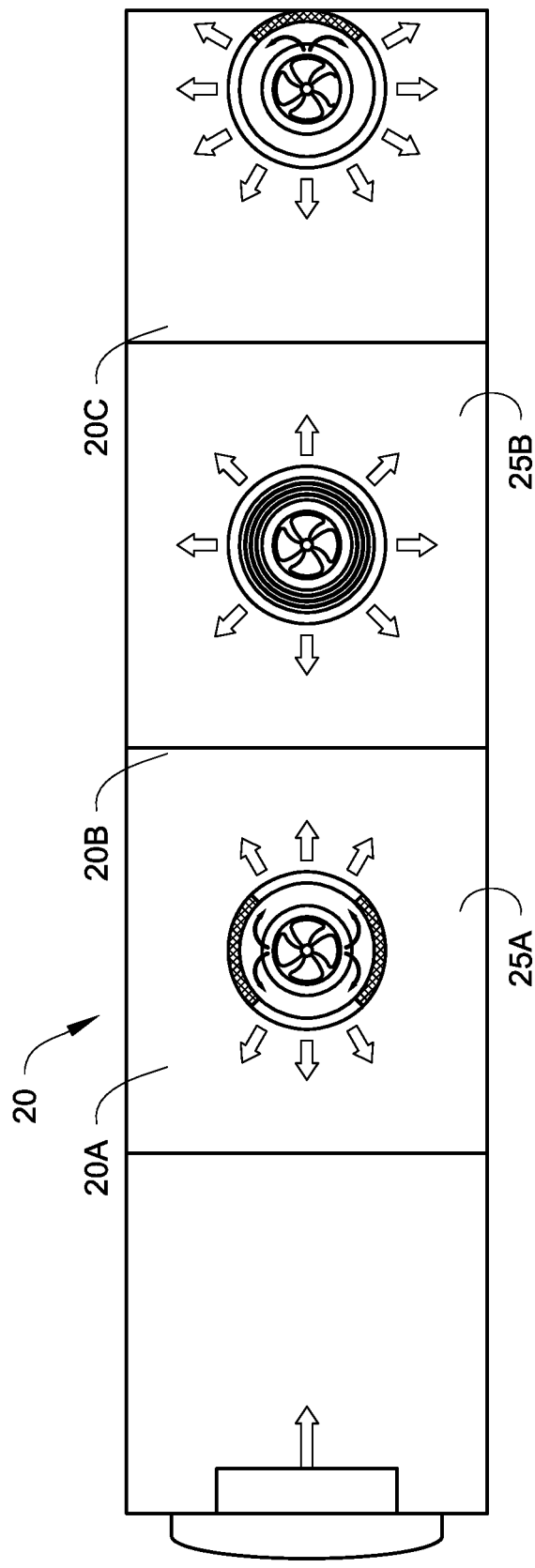

FIG. 11A-ii shows a side view of the embodiment of Example FIG. 11A-i.

FIG. 11A-iii shows a schematic diagram of an example architecture of a remote heat exchanger unit with yet another example air discharge configuration, in accordance with at least one example embodiment described and recited herein.

FIGS. 11A-v through 11A-vii show multiple top view airflows pertaining to the non-limiting example embodiment of FIG. 11A-i.

FIG. 11B shows a schematic diagram of additional example architectures of a remote heat exchanger unit with configurable air discharge, in accordance with at least one example embodiment described and recited herein.

FIG. 11C shows an example environment for the remote heat exchanger units of FIGS. 11A and 11B, in accordance with at least some of the embodiments described and recited herein.

FIG. 12A-i shows a schematic diagram of an example triangular architecture of a remote heat exchanger unit with yet another example air discharge configuration, in accordance with at least one example embodiment described and recited herein.

FIG. 12A-ii shows a schematic diagram of another example triangular architecture of a remote heat exchanger unit with yet another example air discharge configuration, in accordance with at least one example embodiment described and recited herein.

Figure 12B:
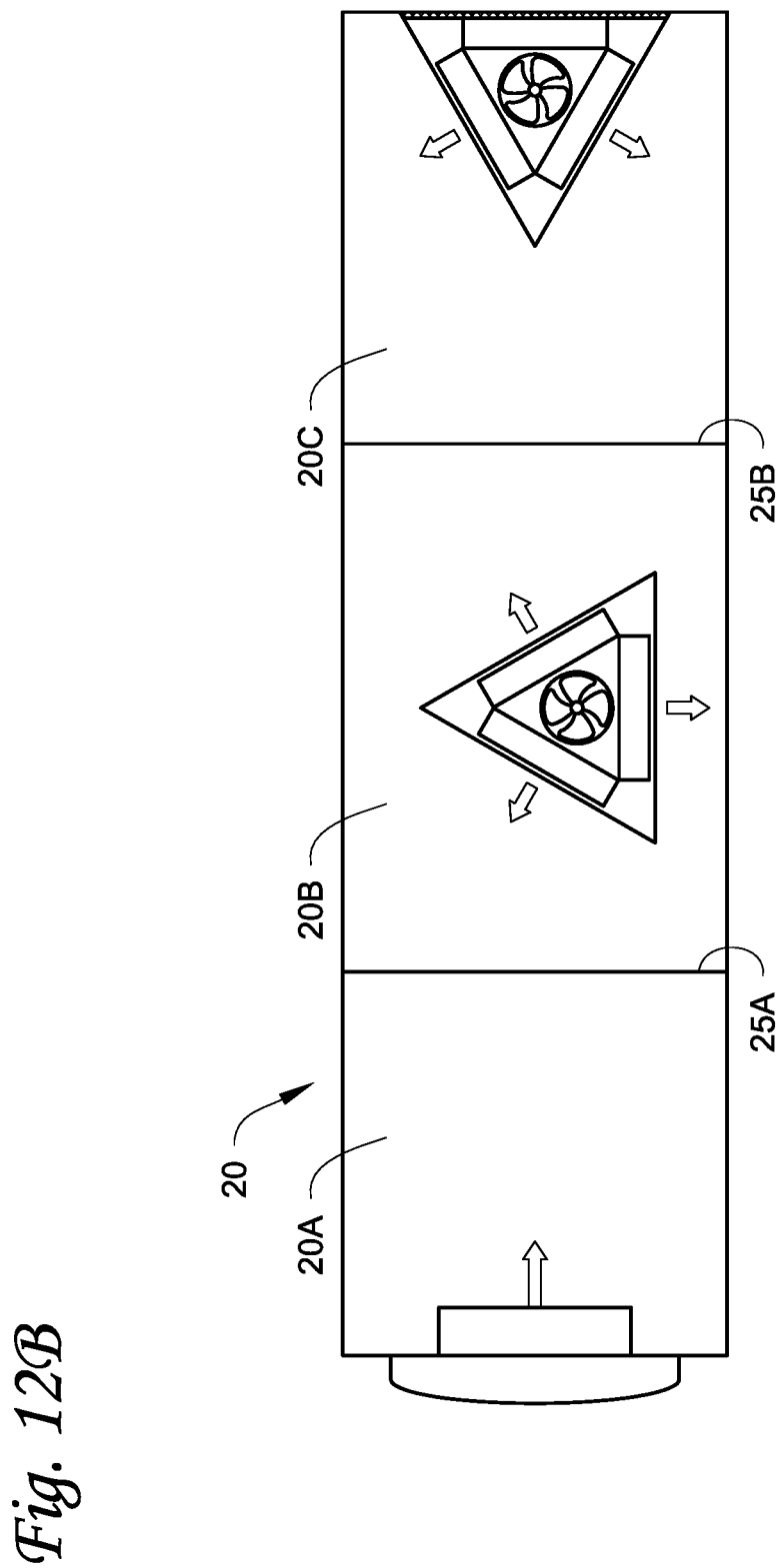

FIG. 12B shows an example environment for the remote heat exchanger units of FIG. 12A-i and FIG. 12A-ii, in accordance with at least some of the embodiments described and recited herein.

FIG. 13A-i shows a schematic diagram of another example triangular architecture of a remote heat exchanger unit with yet another example air discharge configuration, in accordance with at least one example embodiment described and recited herein.

FIG. 13A-ii shows a schematic diagram of yet another example triangular architecture of a remote heat exchanger unit with yet another example air discharge configuration, in accordance with at least one example embodiment described and recited herein.

Figure 13B:
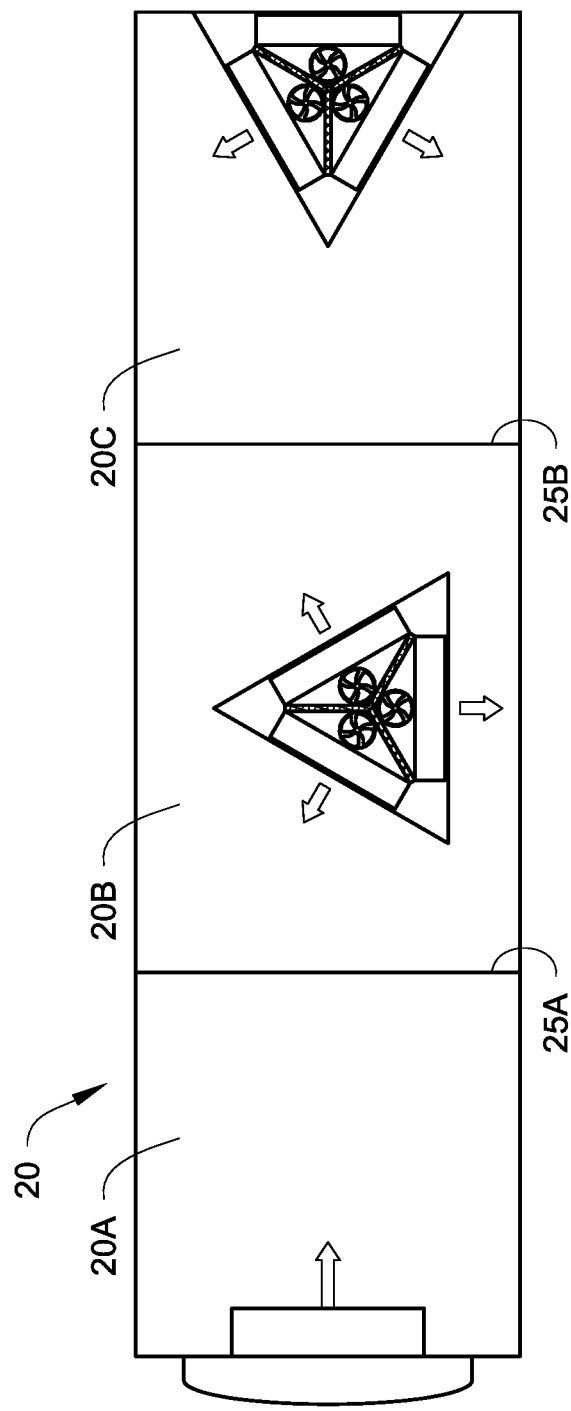

FIG. 13B shows an example environment for the remote heat exchanger units of FIG. 13A-i and FIG. 13A-ii, in accordance with at least some of the embodiments described and recited herein.

FIG. 14A-i shows a schematic diagram of an example square architecture of a remote heat exchanger unit with another example air discharge configuration, in accordance with at least one example embodiment described and recited herein.

FIG. 14A-ii shows a schematic diagram of another example square architecture of a remote heat exchanger unit with another example air discharge configuration, in accordance with at least one example embodiment described and recited herein.

FIG. 14A-iii shows a schematic diagram of another example square architecture of a remote heat exchanger unit with yet another example air discharge configuration, in accordance with at least one example embodiment described and recited herein.

Figure 14B:
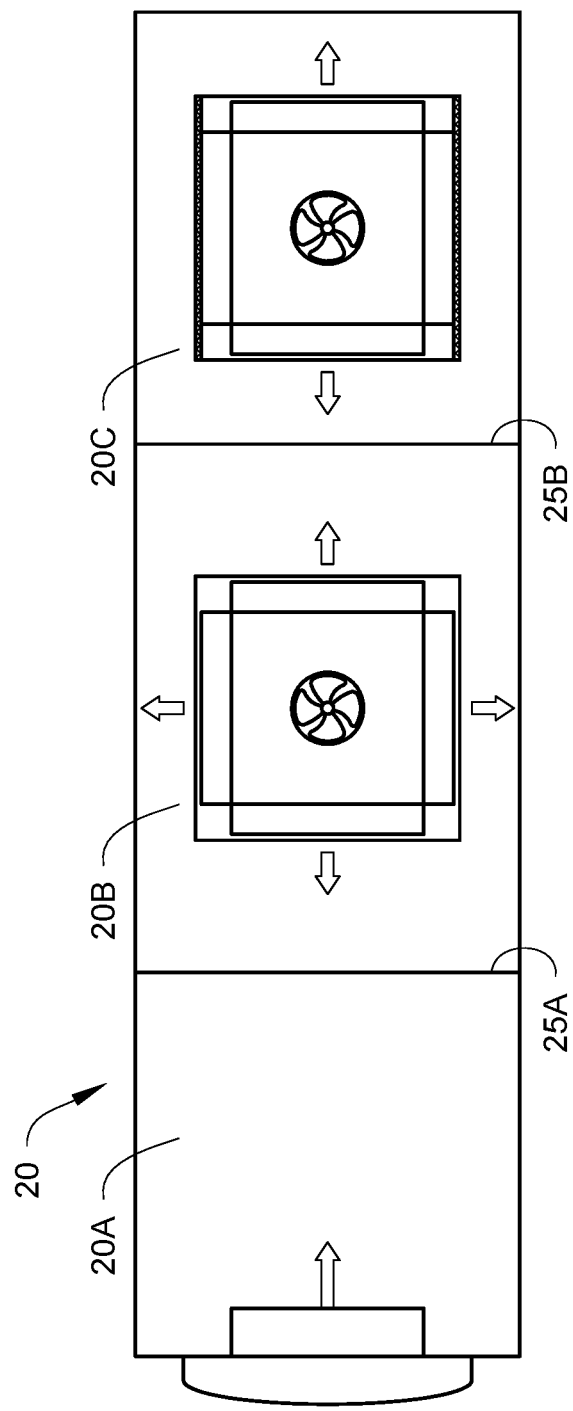

FIG. 14B shows an example environment for the remote heat exchanger unit of FIGS. 14A-ii and 14A-iii, in accordance with at least some of the embodiments described and recited herein.

FIG. 15A-i shows a schematic diagram of an example architecture of a remote heat exchanger unit with another example air discharge configuration, in accordance with at least one example embodiment described and recited herein.

FIG. 15A-ii shows a schematic diagram of another example architecture of a remote heat exchanger unit with another example air discharge configuration, in accordance with at least one example embodiment described and recited herein.

FIG. 15A-iii shows a schematic diagram of another example square architecture of a remote heat exchanger unit with yet another example air discharge configuration, in accordance with at least one example embodiment described and recited herein.

Figure 15B:
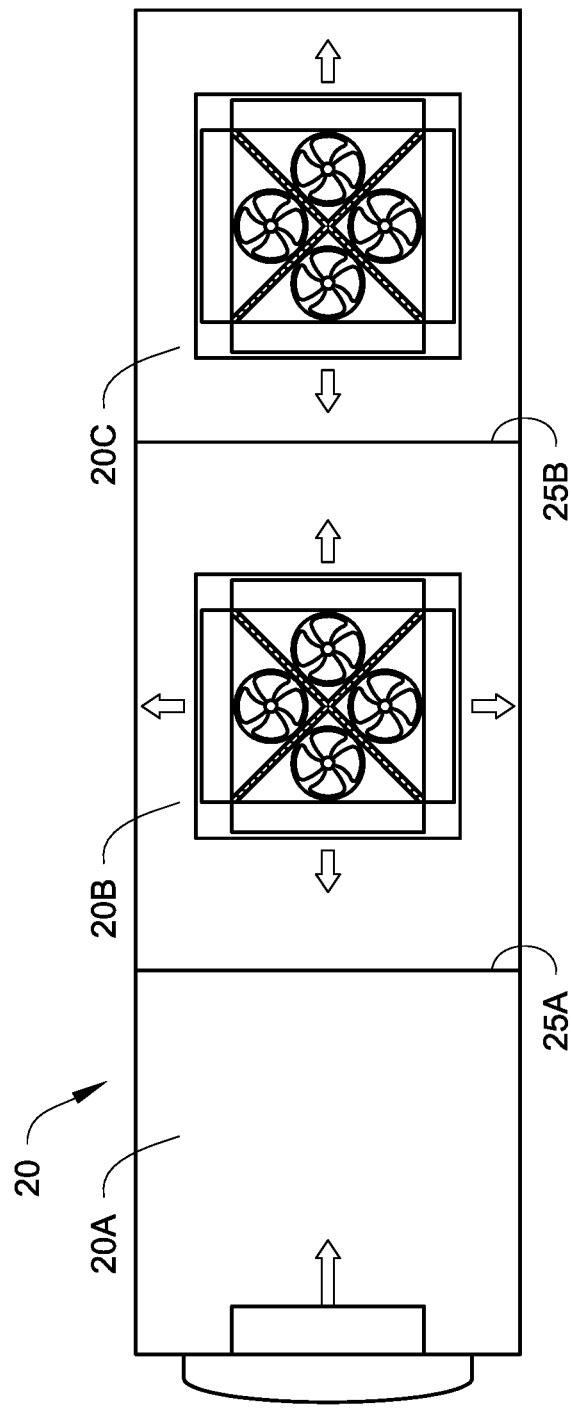

FIG. 15B shows an example environment for at least two of the remote heat exchanger units of FIGS. 15A-i-15A-iii, in accordance with at least some of the embodiments described and recited herein.

Figure 16A:
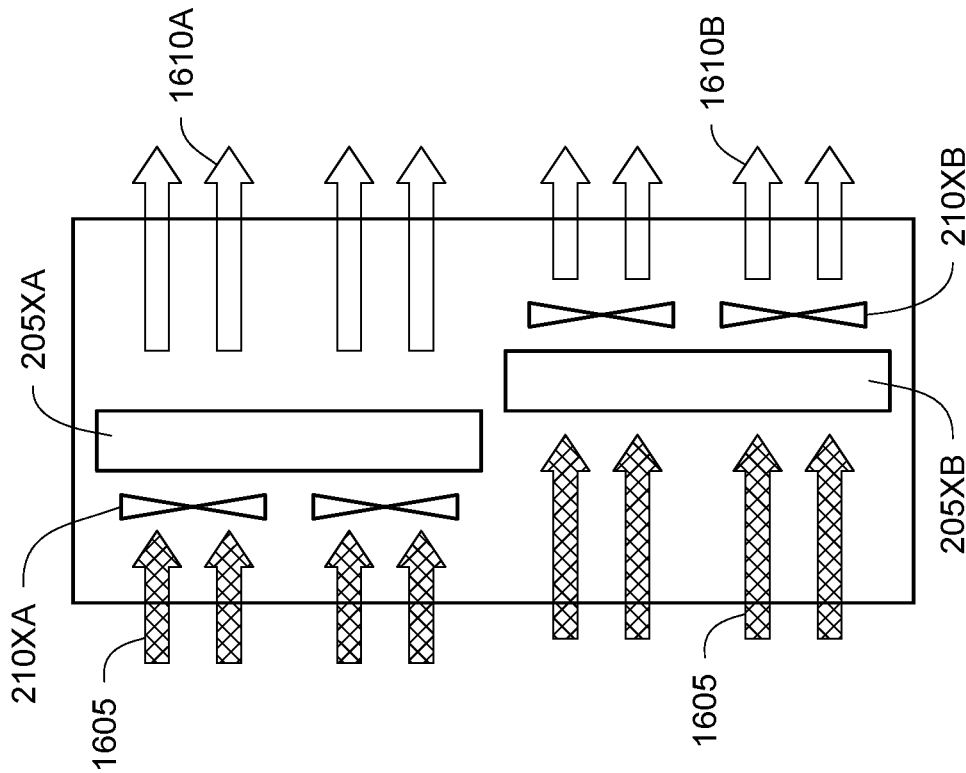

FIG. 16A shows a schematic diagram of a remote heat exchanger unit for configurable air discharge, in accordance with at least one example embodiment described and recited herein.

Figure 16B:
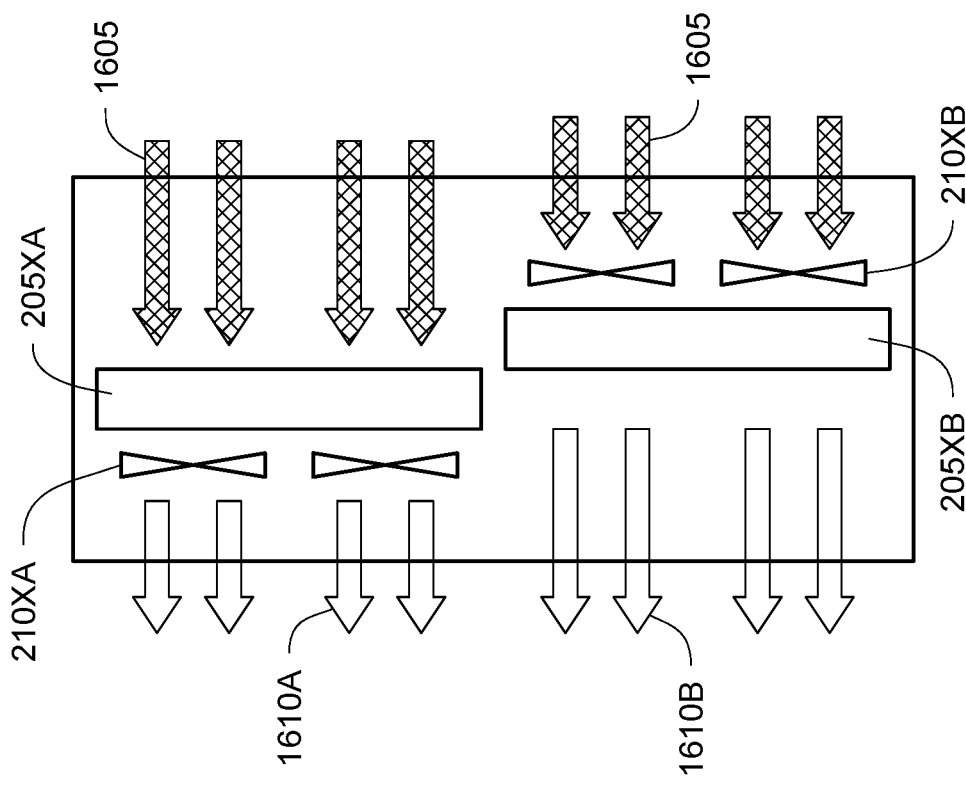

FIG. 16B shows a schematic diagram of an alternative configuration of the remote heat exchanger unit for configurable air discharge, in accordance with at least the example embodiment of FIG. 16A.

Figure 17A:
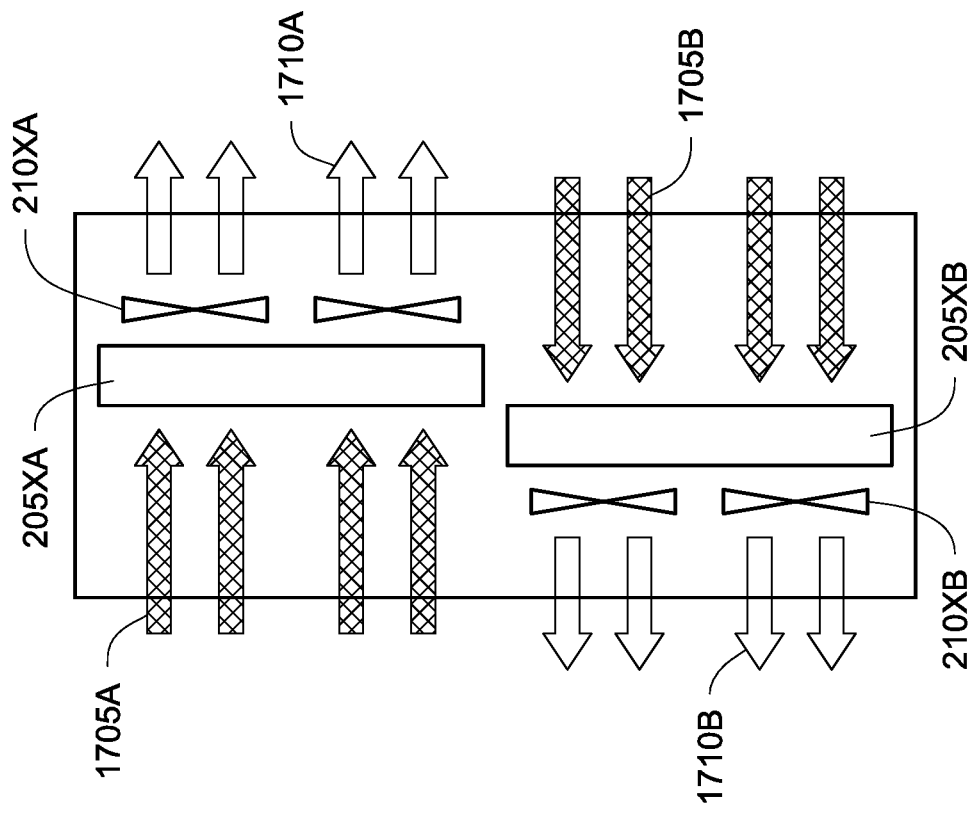

FIG. 17A shows a schematic diagram of a remote heat exchanger unit bi-directional fans for configurable air discharge, in accordance with at least one other example embodiment described and recited herein.

Figure 17B:
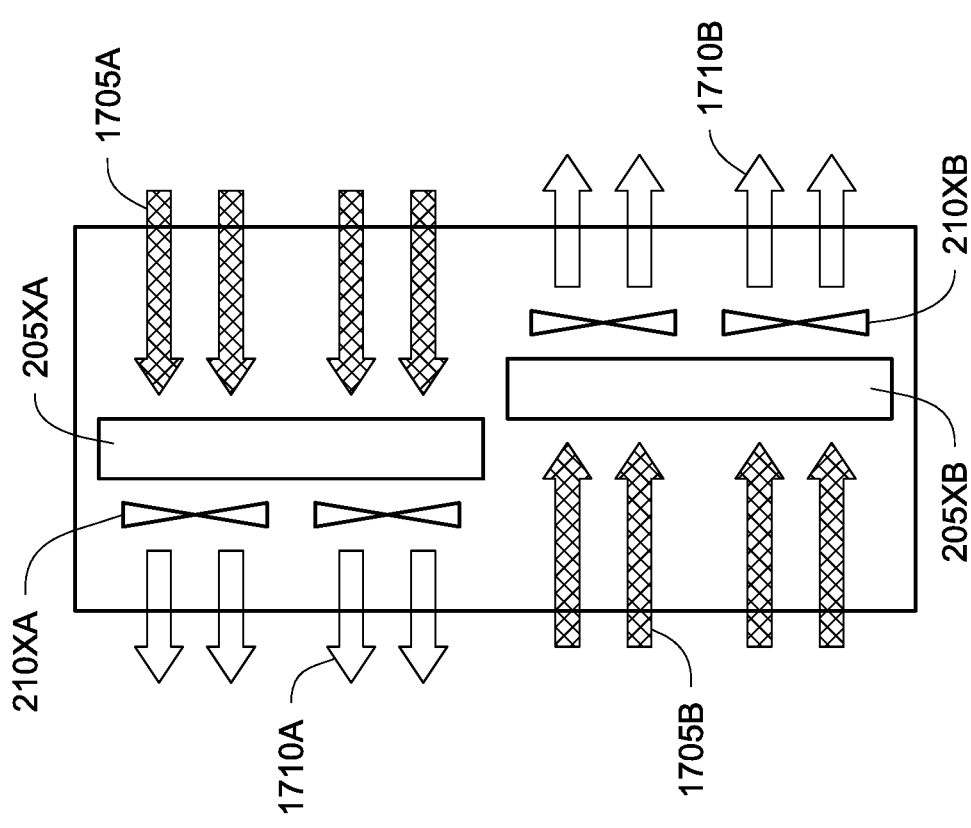

FIG. 17B shows a schematic diagram of an alternative configuration of the remote heat exchanger unit for configurable air discharge, in accordance with at least the example embodiment of FIG. 17A.

FIG. 18A shows a side view of a schematic diagram of a remote heat exchanger unit for configurable air discharge, in accordance with at least one example embodiment described and recited herein.

FIG. 18B shows a top view of a schematic diagram of a remote heat exchanger unit for configurable air discharge, in accordance with at least the example embodiment of FIG. 18A.

FIG. 19A shows a side view of a schematic diagram of a remote heat exchanger unit for configurable air discharge, in accordance with at least one other example embodiment described and recited herein.

FIG. 19B shows a top view of a schematic diagram of a remote heat exchanger unit for configurable air discharge, in accordance with at least the example embodiment of FIG. 19A.

Figure 20:
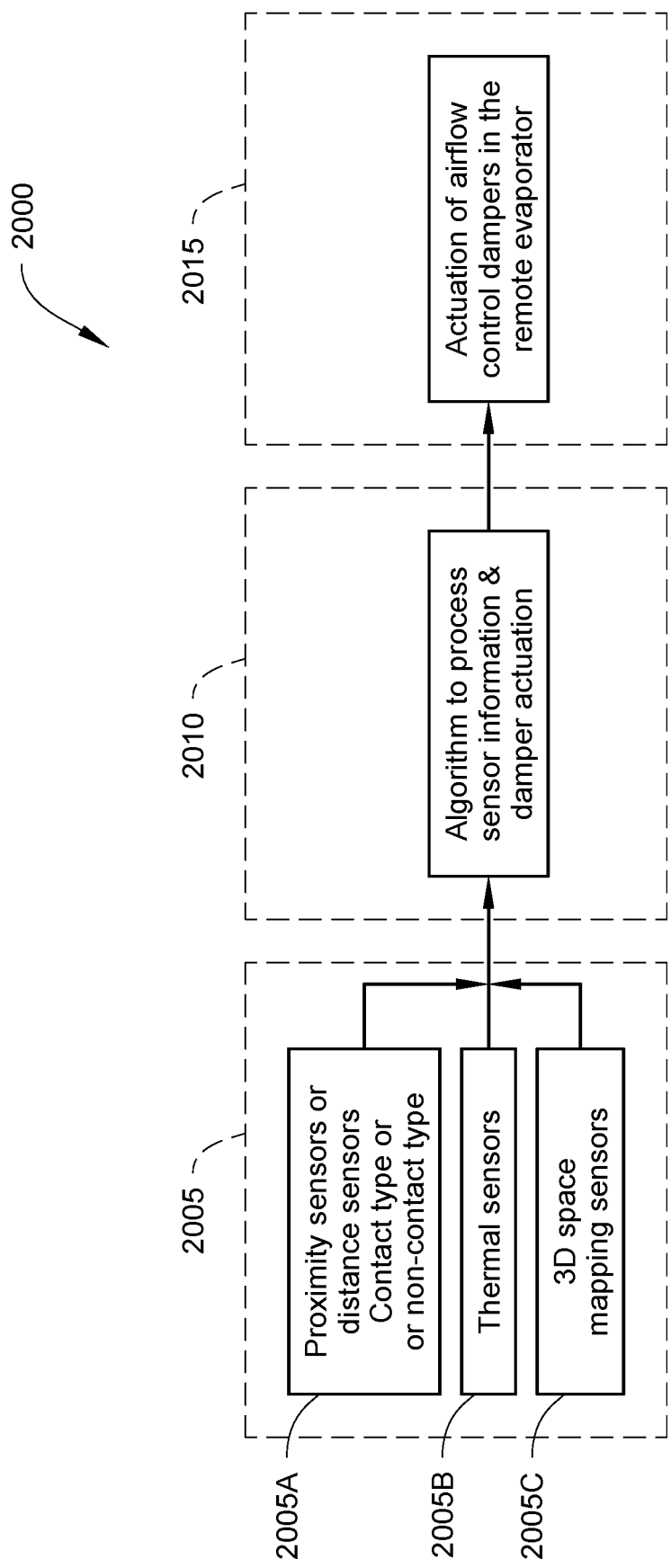

FIG. 20 shows a diagram of a remote evaporator automation system, in accordance with at least one example embodiment described and recited herein.

Figure 21A:
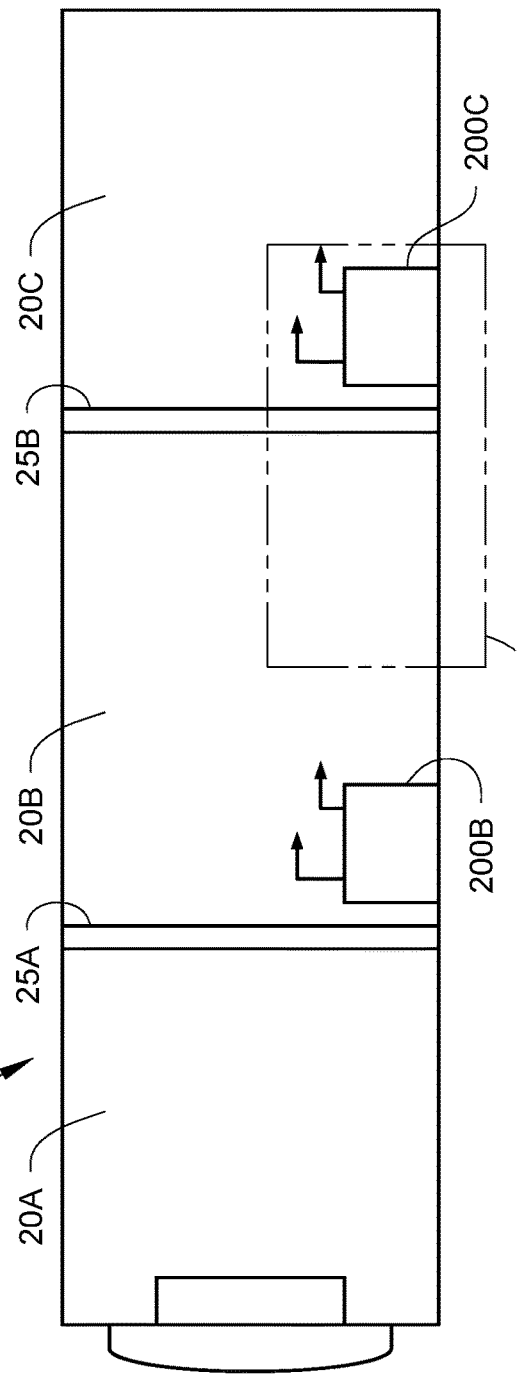

FIG. 21A shows an example environment for a remote evaporator automation system, in accordance with at least one example embodiment described and recited herein.

Figure 21B:
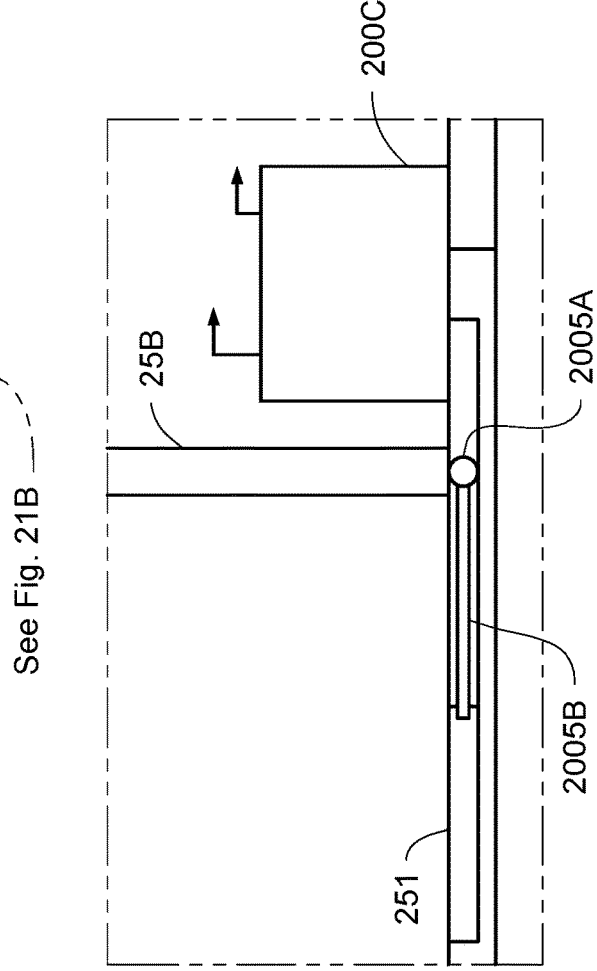

FIG. 21B shows an example bulkhead configuration in accordance with the example environment for the remote evaporator automation system of FIG. 21A.

Figure 22A:
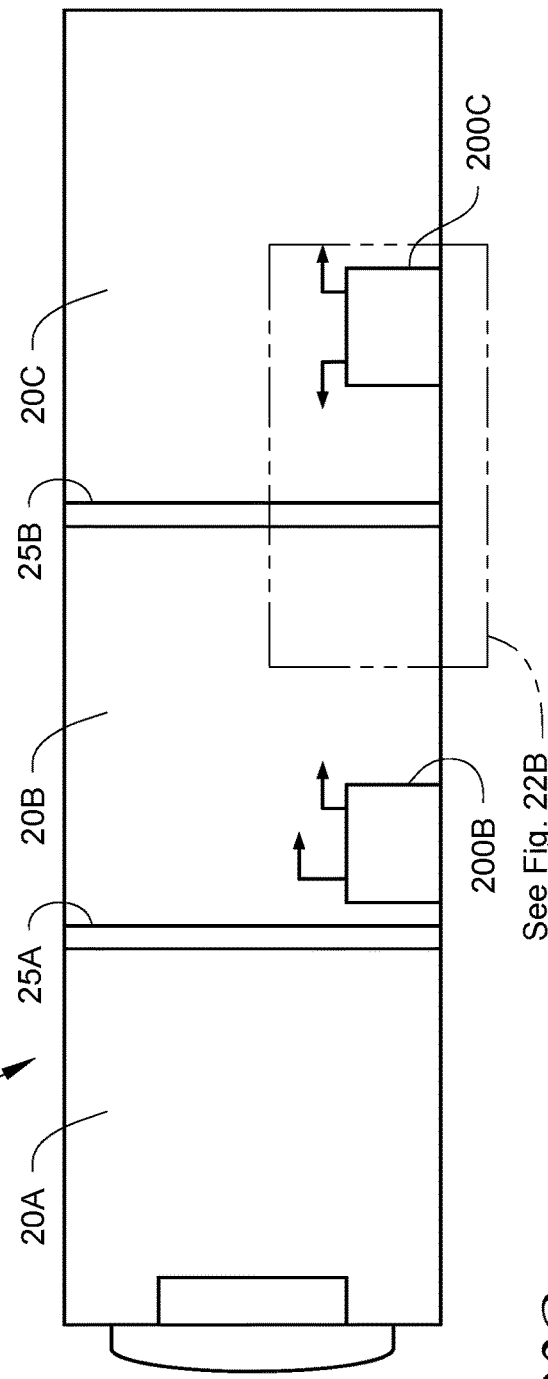

FIG. 22A shows another example environment for a remote evaporator automation system, in accordance with at least one example embodiment described and recited herein.

Figure 22B:
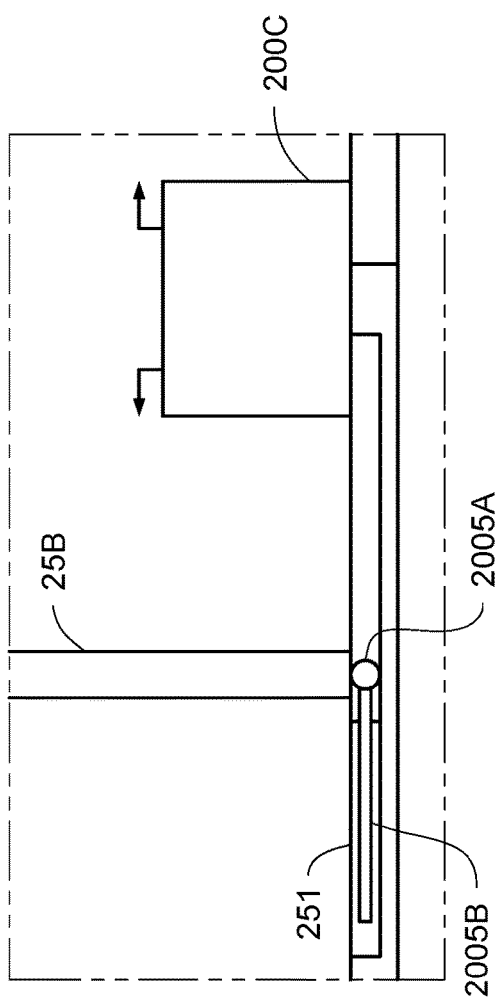

FIG. 22B shows an example bulkhead configuration in accordance with the example environment for the remote evaporator automation system of FIG. 22A.

Figure 23A:
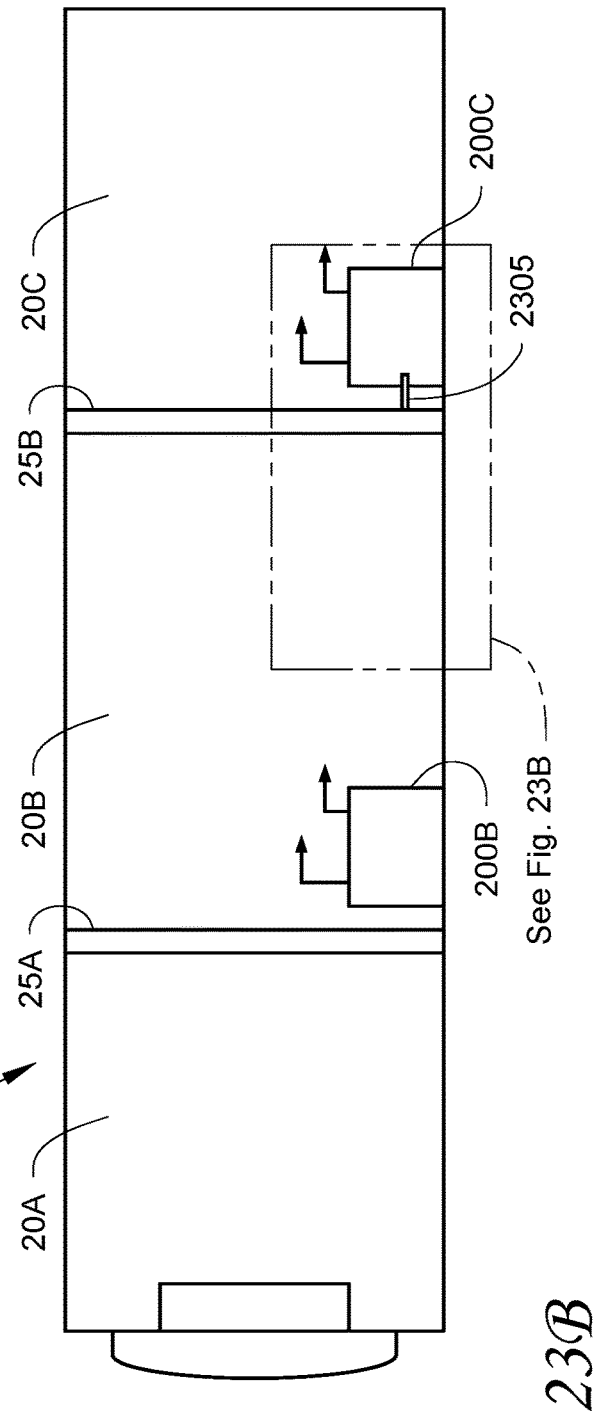

FIG. 23A shows another example environment for a remote evaporator automation system, in accordance with at least one example embodiment described and recited herein.

Figure 23B:
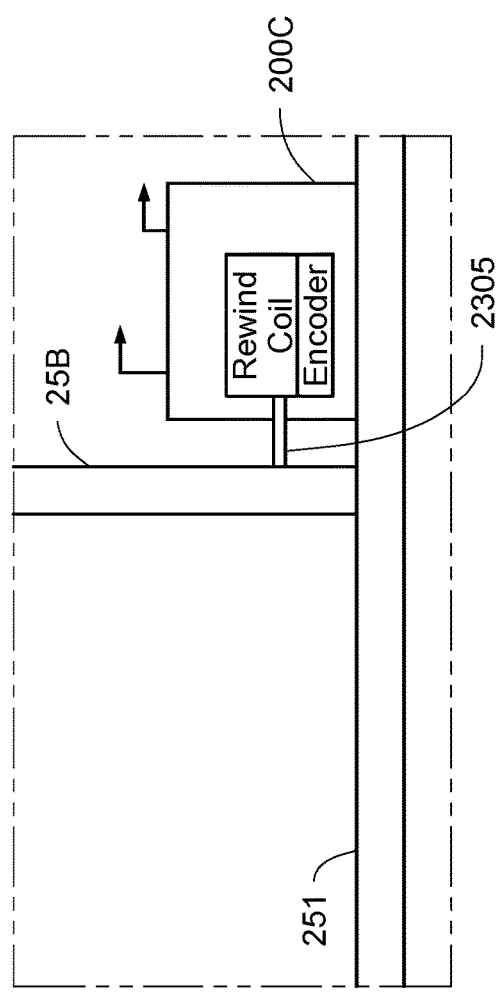

FIG. 23B shows an example bulkhead configuration in accordance with the example environment for the remote evaporator automation system of FIG. 23A.

Figure 24A:
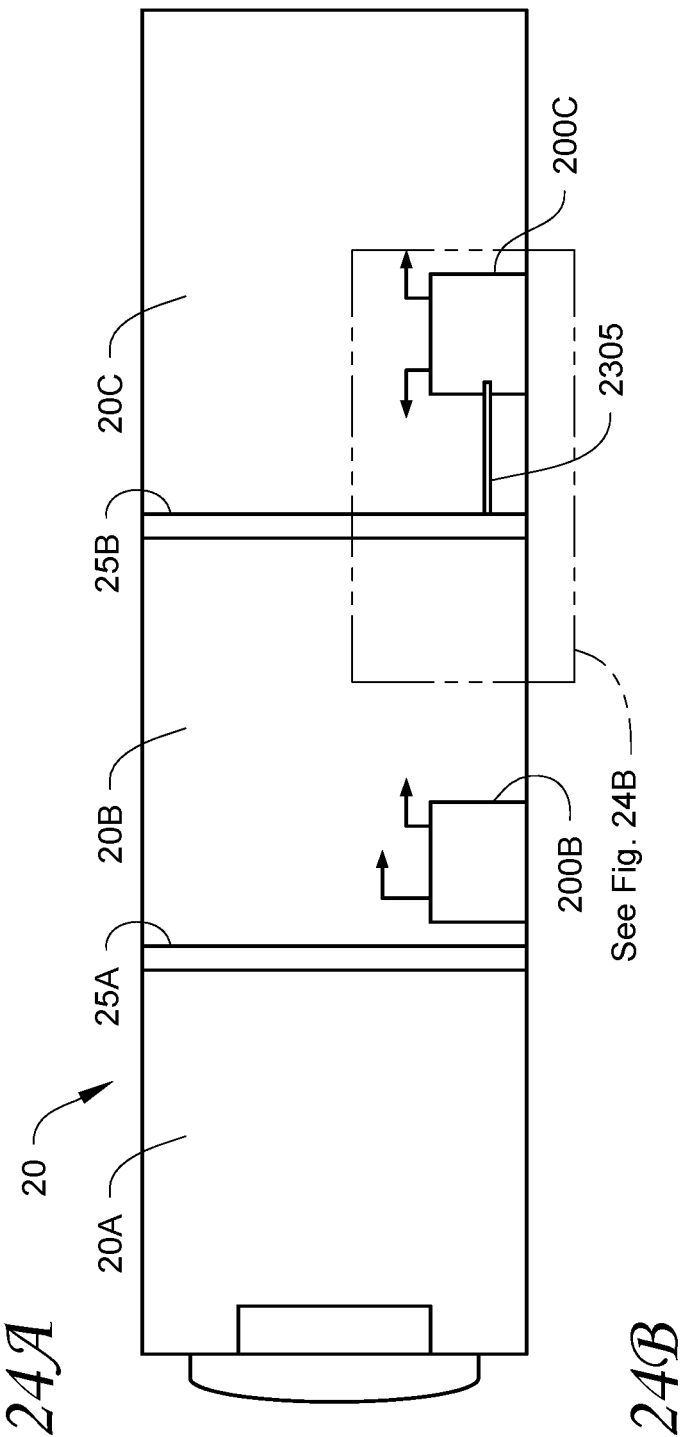

FIG. 24A shows another example environment for a remote evaporator automation system, in accordance with at least one example embodiment described and recited herein.

Figure 24B:
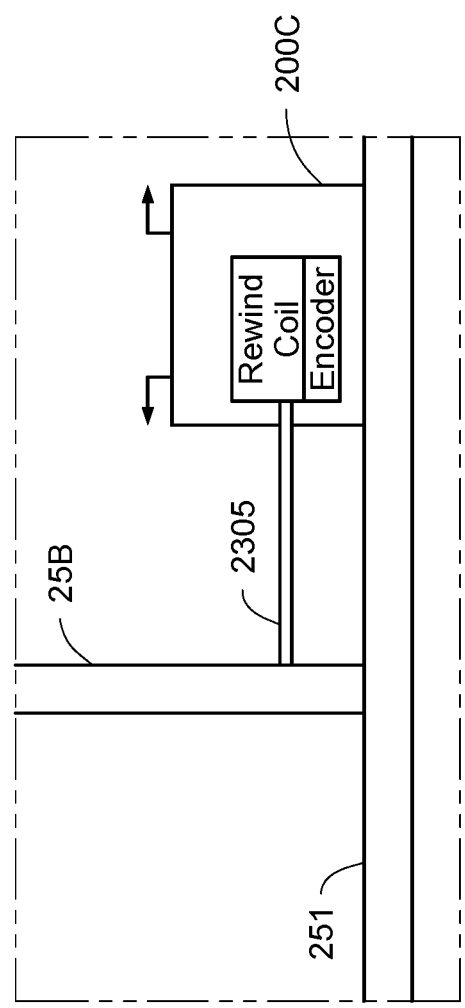

FIG. 24B shows an example bulkhead configuration in accordance with the example environment for the remote evaporator automation system of FIG. 24A.

FIG. 25A shows another example environment for a remote evaporator automation system, in accordance with at least one example embodiment described and recited herein.

FIG. 25B shows an example bulkhead configuration in accordance with the example environment for the remote evaporator automation system of FIG. 25A.

FIG. 26A shows another example environment for a remote evaporator automation system, in accordance with at least one example embodiment described and recited herein.

FIG. 26B shows an example bulkhead configuration in accordance with the example environment for the remote evaporator automation system of FIG. 26A.

Figure 27:
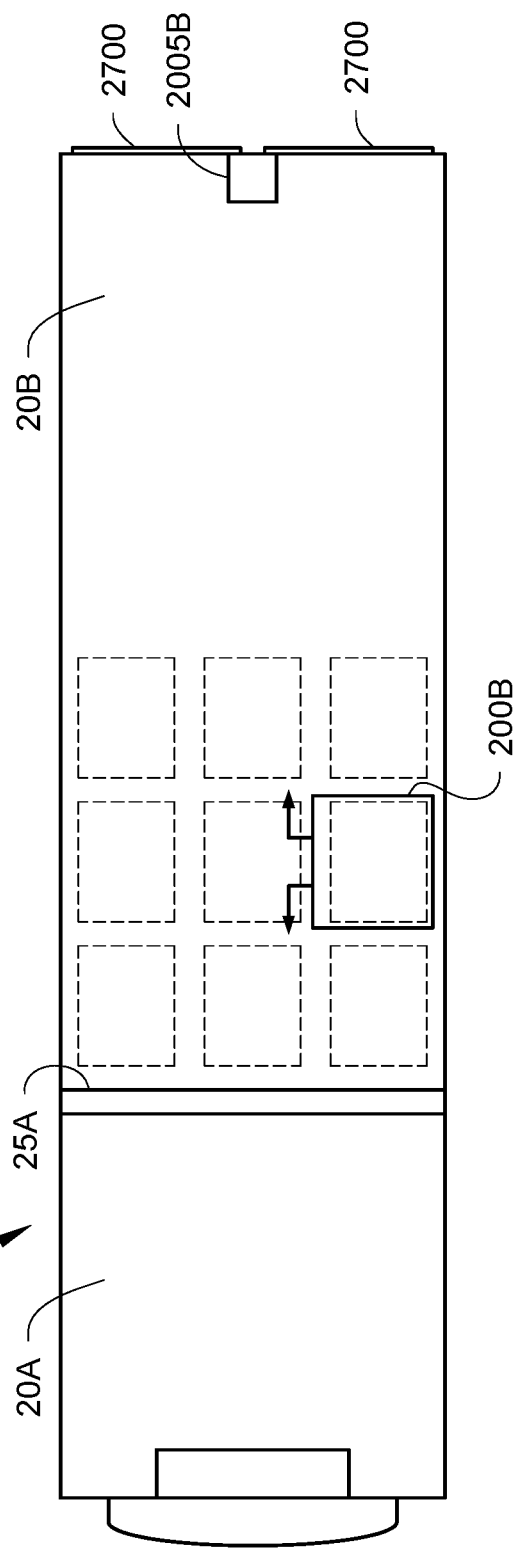

FIG. 27 shows an overhead perspective of an example of thermal imaging in an example environment for a remote evaporator automation system, as described and recited herein.

Figure 28:
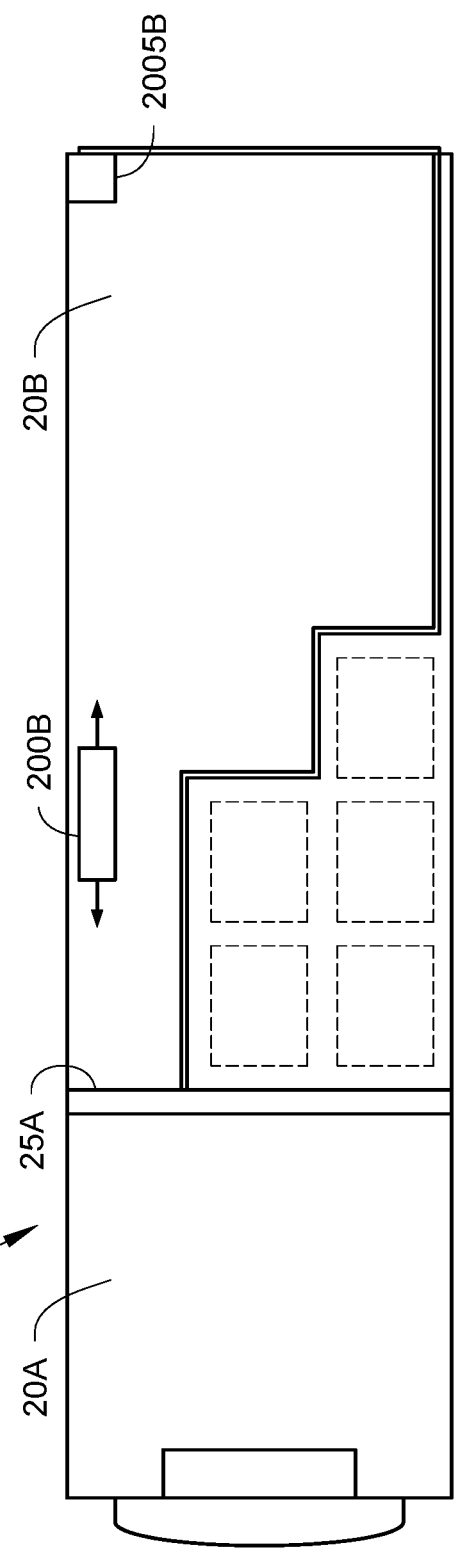

FIG. 28 shows a side-view perspective of an example of thermal imaging in the example environment of FIG. 27 for a remote evaporator automation system, as described and recited herein.

Figure 29:
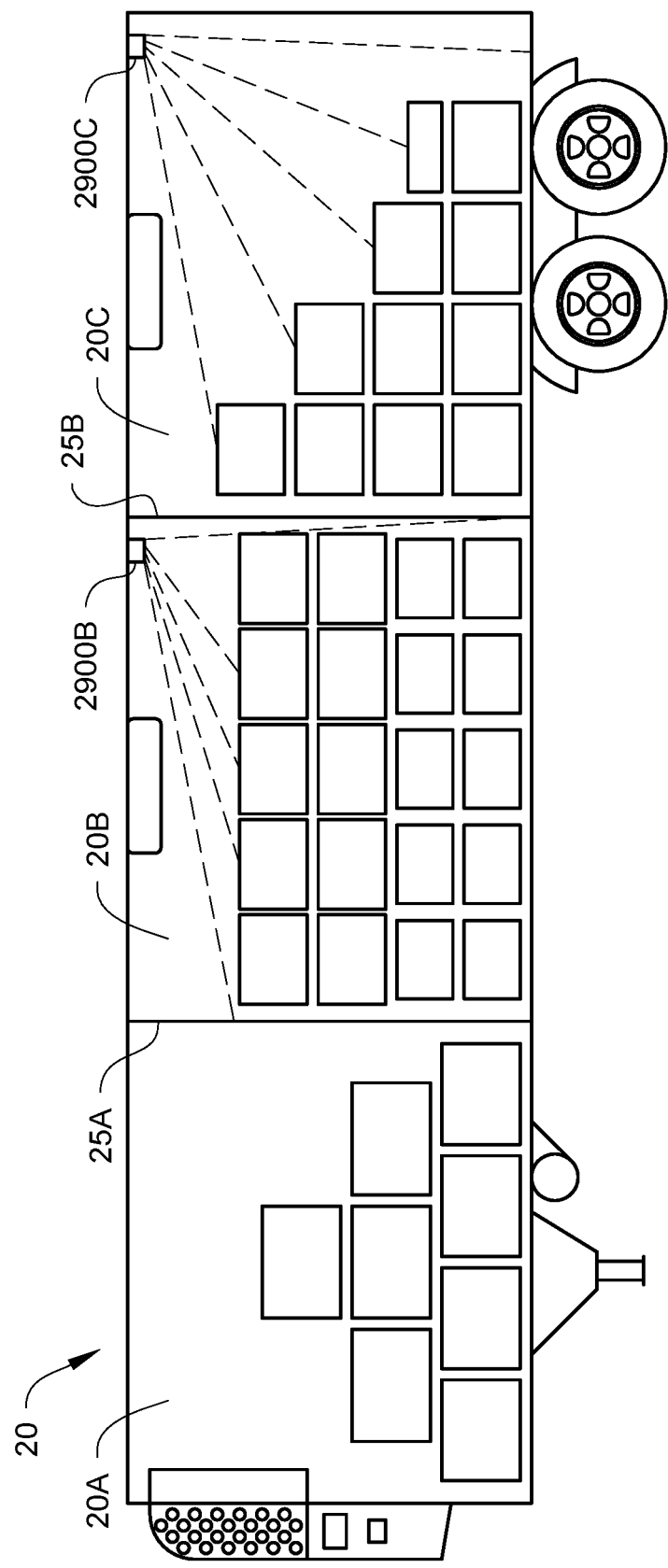

FIG. 29 shows an example of digital imaging in accordance with an example environment for a remote evaporator automation system, as described and recited herein.

Figure 30:
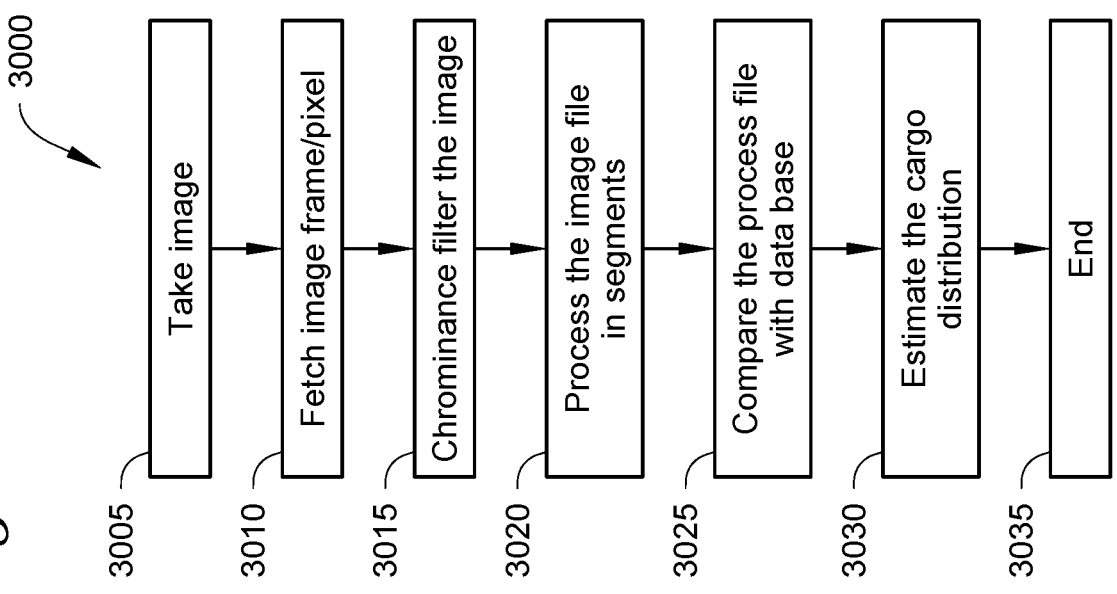

FIG. 30 shows an example processing flow for digital imaging processing in accordance with at least the embodiment of FIG. 29 for a remote evaporator automation system, as described and recited herein.

Figure 31:
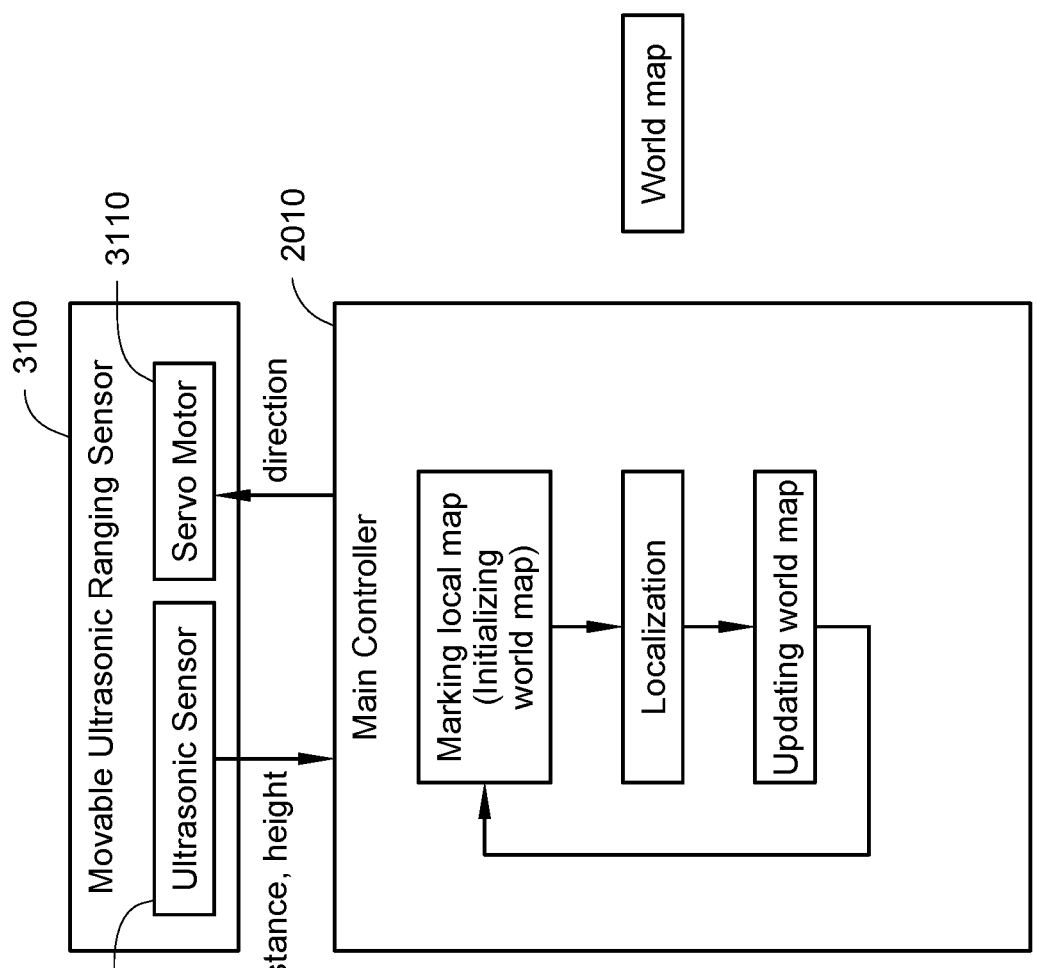

FIG. 31 shows an example processing flow for sonar-based 3D space scanning in accordance with at least some of the embodiments of a remote evaporator automation system, as described and recited herein.

Figure 32B:
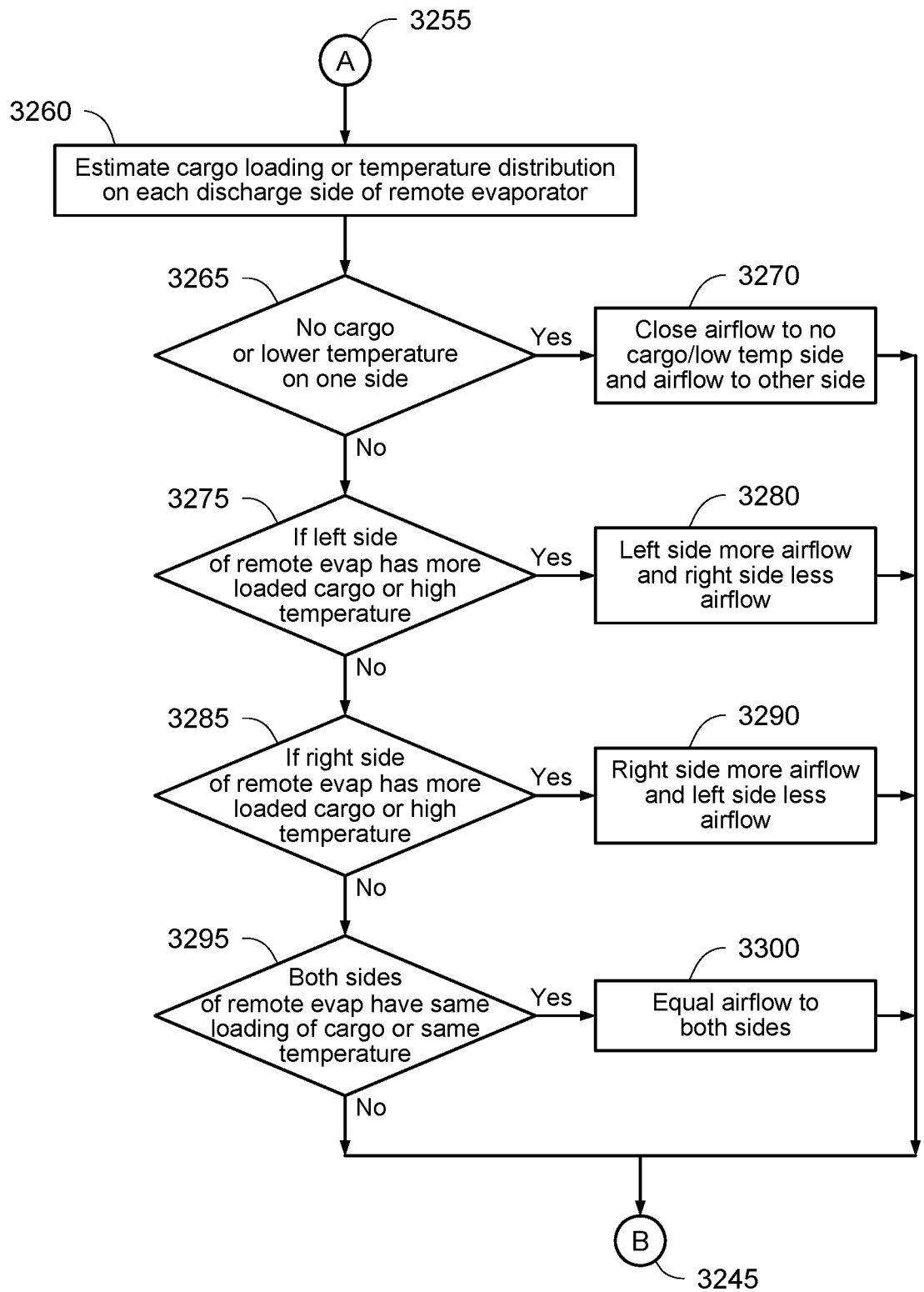

FIGS. 32A and 32B combine to show an example processing flow for processing sensor data in accordance with various embodiments of a remote evaporator automation system, as described and recited herein.

Figure 33A:
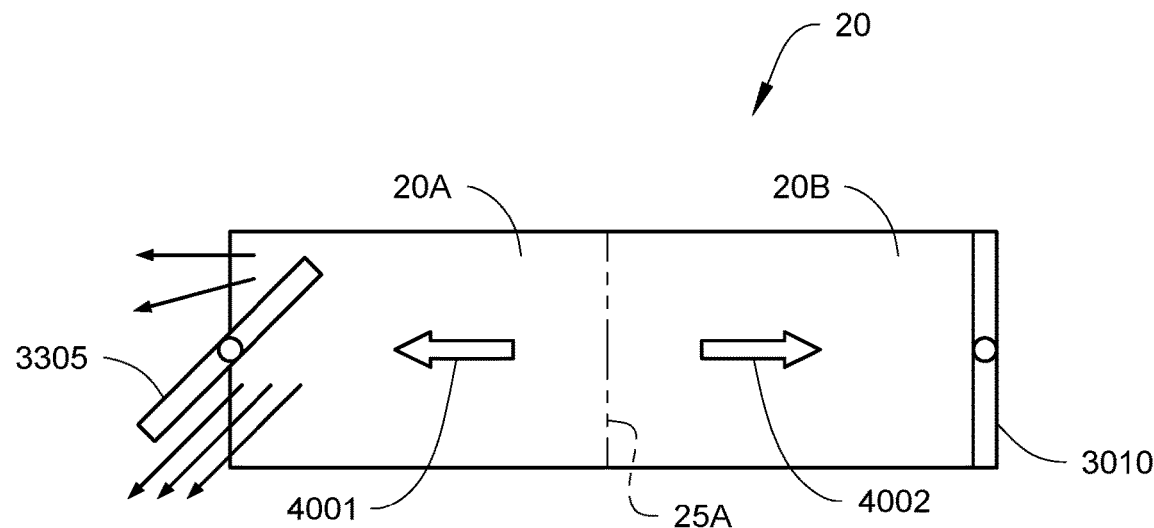

FIG. 33A shows an example implementation of airflow in accordance with various embodiments of a remote evaporator automation system, as described and recited herein.

Figure 33B:
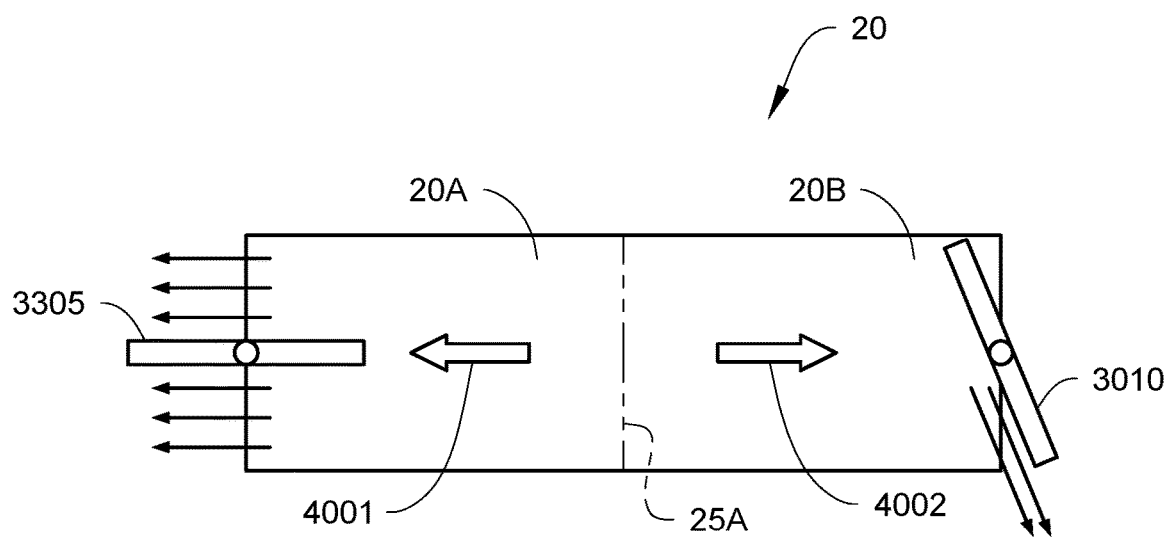

FIG. 33B shows another example implementation of airflow in accordance with various embodiments of a remote evaporator automation system, as described and recited herein.

DETAILED DESCRIPTION

It is noted that: U.S. application Ser. No. 18/303,761, "REMOTE HEAT EXCHANGER UNIT WITH CONFIGURABLE AIR DISCHARGE OF A TRANSPORT CLIMATE CONTROL SYSTEM," filed concurrently herewith on Apr. 20, 2023, and the contents of which are incorporated herein by reference.

The embodiments disclosed herein relate generally to a transport climate control system (TCS). In particular, the embodiments described herein are directed to a method and system for controlling airflow volume and flow direction from a remote heat exchanger unit of a transport climate control system.

Embodiments for controlling airflow volume and/or direction obviate manual configuration of the configurable remote heat exchangers or corresponding dampers are described and recited herein. As a result, a customer may be relieved of the organizational burden to remember to manually reconfigure the airflow as well as the physical burden to do so. Further still, the customer would be relieved of the need to train operators to do so, since airflow management would be automated.

Further still, the embodiments described herein for controlling airflow volume and/or direction may be regarded as an advancement in temperature management of a climate controlled space or one or more zones of a climate controlled space. For example, upon sensing or detecting a need to drop temperatures within a given climate controlled space to, for example, preserve cargo, the temperature may be pulled down more quickly as managed by the embodiments described and recited herein.

Embodiments described and/or recited herein may refer to the accompanying drawings; however, such embodiments are non-limiting examples that may be embodied in various other forms, as well. Well-known functions or constructions are not described in detail to avoid obscuring the present disclosure unnecessarily. Therefore, specific structural and functional details disclosed herein are not to be interpreted as limiting, but merely as a basis for the claims and as a representative basis for teaching one skilled in the art how to variously utilize the present disclosure in any appropriately detailed structure. In this description, as well as in the drawings, similarly-referenced numbers represent elements that may perform the same, similar, or equivalent functions.

Further, as the example embodiments illustrated, described, and recited herein, are not intended to be limiting, it is understood that the corresponding configurations are changeable. As an example, a duct or an airflow that is illustrated as being directed to the left may be, in a non-limiting alternative embodiment, be directed to the right, and vice-versa. It will be appreciated that in other non-limiting embodiments, the duct or airflow can be directed in any direction desired for the specific implementation. Thus, it is understood that the quantity of permutations of embodiments in accordance with the example embodiments is considerable.

The scope of the disclosure should be determined by the appended claims and their legal equivalents, rather than by the examples given herein. For example, no element is essential to the practice of the disclosure unless specifically described herein as "critical" or "essential." The embodiments described and recited herein pertain generally to providing a configurable remote heat exchanger unit in order to improve, or even optimize, air distribution within a given zone of the climate controlled space. The embodiments include and provide configurable air flow directions for conditioned air exiting a remote heat exchanger unit, as well as improved or even optimized temperature distribution within the climate controlled space.

A TCS is generally used to control an environmental condition (e.g., temperature, humidity, air quality, and the like) within a transport unit (e.g., a container (such as a container on a flat car, an intermodal container, etc.), a truck, a box car, or other similar transport unit). The transport unit can include a plurality of zones and the TCS can be a multi-zone TCS (MTCS). Each zone may require a climate condition (e.g., temperature, humidity, air quality, etc.) that is different from other zone(s). The MTCS can be configured to provide independent climate control to each of the plurality of zones within the transport unit.

A MTCS may have one host unit and one or more remote heat exchanger units that are each configured to provide climate control to each of the one or more zones within the multi-zone transport unit. A transport climate control unit (TCU) of the MTCS may include a compressor, an expansion valve, a first heat exchanger (e.g., condenser), and a host heat exchanger unit. The host heat exchanger unit can include a second heat exchanger (e.g., a host heat exchanger), one or more fan(s) for providing climate control within the particular zone the host heat exchanger unit is located, one or more flow regulators (e.g., solenoid valve(s), etc.) for controlling the amount of working fluid (e.g., refrigerant) flow into the host heat exchanger unit, and one or more throttling devices (e.g., electronic throttling valve(s), etc.) for controlling the amount of working fluid flow available to a suction end of the compressor of the MTCS.

Each remote heat exchanger unit may have a remote heat exchanger (e.g., a heat exchanger coil), one or more fan(s) for providing climate control within the particular zone the remote heat exchanger unit is located, one or more flow regulating devices (e.g., solenoid valve(s), etc.) for controlling the amount of working fluid flow into the remote heat exchanger unit, and one or more throttling devices (e.g., electronic throttling valve(s), etc.) for controlling the amount of working fluid flow available to a suction end of the compressor of the MTCS. Each remote heat exchanger unit can be connected to the TCU via a common working fluid line. One remote heat exchanger unit may be used to provide climate control for one zone of the transport unit.

The MTCS can be used to, for example, cool, heat, and defrost the two or more zones of the transport unit. Note that in some instances, the remote heat exchanger unit may have two or more remote heat exchangers (e.g., a first heat exchanger coil and a second heat exchanger coil connected in parallel or in series).

The MTCS includes a working fluid circuit and a controller (e.g., a MTCS controller) that is configured to manage, command, direct, and regulate the behavior of one or more components of the working fluid circuit (e.g., an evaporator, a condenser, a compressor, an expansion device, etc.). The MTCS controller can also be configured to manage, command, direct, and regulate the behavior of the host heat exchanger unit and the one or more remote heat exchanger units. The MTCS generally may be a vapor-compressor type refrigeration system, or any other suitable climate control system that can use working fluid, cold plate technology, etc.

FIG. 1 illustrates one embodiment of a MTCS 100 for a transport unit (TU) 125 that can be towed, for example, by a tractor (not shown) in accordance with one or more non-limiting example embodiments of a remote heat exchanger unit with configurable air discharge. The MTCS 100 includes a transport climate control unit (TCU) 110 that provides environmental control (e.g. temperature, humidity, air quality, etc.) within a climate controlled space 150 of the TU 125. The MTCS 100 also includes a MTCS controller 170 and one or more sensors (not shown) that are configured to measure one or more parameters of the MTCS 100 and communicate parameter data to the MTCS controller 170. The MTCS 100 is powered by a power source 112. The TCU 110 is disposed on a front wall 130 of the TU 125. In other embodiments, it will be appreciated that the TCU 110 can be disposed, for example, on a rooftop 126 or another wall of the TU 125.

The TU 125 shown in FIG. 1 is a trailer unit. However, it will be appreciated that the embodiments described herein are not limited to trucks and trailer units, but can apply to any other type of transport unit (e.g., a container on a flat car, an intermodal container, etc.), a truck, a box car, or other similar transport unit.

The programmable MTCS Controller 170 that may comprise a single integrated control unit or may comprise a distributed network of TCS control elements. The number of distributed control elements in a given network can depend upon the particular application of the principles described herein. The MTCS controller 170 is configured to control operation of the MTCS 100.

As shown in FIG. 1, the power source 112 is disposed in the TCU 110. In other embodiments, the power source 112 can be separate from the TCU 110. Also, in some embodiments, the power source 112 can include two or more different power sources disposed within or outside of the TCU 110. In some embodiments, the power source 112 can include a combustion engine, a battery, an alternator, a generator, a solar panel, a fuel cell, etc. When the power source 112 includes a combustion engine that can be, for example, a two speed engine, a variable speed engine, etc.

The climate controlled space 150 is divided into a plurality of zones 152. The term "zone" means a part of an area of the climate controlled space 150 separated by walls 175. In some examples, each of the zones 152 can maintain a set of environmental condition parameters (e.g. temperature, humidity, air quality, etc.) that is independent from other zones 152.

Note that in FIG. 1 the climate controlled space 150 is divided into three zones: a first zone 152a; a second zone 152b; and a third zone 152c. Each of the zones 152 shown in FIG. 1 is divided into substantially equal areas. However, it is to be realized that the climate controlled space 150 may be divided into any number of zones in any size configuration that is suitable for environmental control of the different zones.

The MTCS 100 is configured to control and maintain separate environmental condition requirements in each of the zones 152. The MTCS 100 includes a host heat exchanger unit 111 provided within the TCU 110 for providing climate control within the first zone 152a and a plurality of remote heat exchanger units 180 disposed in the TU 125. Namely a first remote heat exchanger unit 180a is disposed in the second zone 152b and a second remote heat exchanger unit 180b is disposed in the third zone 152c. The host heat exchanger unit 111 and the remote heat exchanger units 180 are collectively referred to herein as heat exchange units. In some embodiments, each of the first zone 152a, the second zone 152b, and the third zone 152c can be either a frozen temperature zone operating to maintain a temperature set point within a frozen temperature range or a fresh temperature zone operating to maintain a temperature set point within a fresh temperature range. In one embodiment, for example, the frozen temperature range can be between about −25° F. to about 15° F. and the fresh temperature range can be between about 16° F. to about 90° F. In another embodiment, for example, the frozen temperature range can be between about −25° F. to about 24° F. and the fresh temperature zone can be between about 26° F. to about 90° F. It will be appreciated that any of the first, second and third zones 152a-c can be a fresh temperature zone operating to maintain a temperature set point within a fresh temperature range or a frozen temperature zone operating to maintain a temperature set point within a frozen temperature range.

Each remote heat exchanger unit 180a, 180b is fluidly connected to the host heat exchanger unit 111. The host heat exchanger unit 111 and each remote heat exchanger unit 180a, 180b may include one or more heat exchanger coils, one or more fan(s) for providing climate control within the particular zone the heat exchanger unit is located, one or more flow regulators (e.g., solenoid valve(s), etc.) for controlling the amount of working fluid flow into the heat exchanger unit, and one or more throttling devices (e.g., electronic throttling valve(s), etc.) for controlling the amount of working fluid flow available to a suction end of the compressor of the MTCS 100. The heat exchange units (e.g., the host heat exchanger unit 111 and each of the remote heat exchanger units 180) can operate in a plurality of operational modes (e.g., a NULL mode, a running NULL mode, a COOL mode, a HEAT mode, a DEFROST mode, a low fan speed mode, a high fan speed mode, a high engine speed mode, a low engine speed mode, etc.).

Further details of the remote heat exchanger units 180*a*, 180*b* are described below with respect to FIGS. 2A-15B.

FIG. 2A shows a schematic diagram of example architectures of a remote heat exchanger unit 200 with configurable air discharge, in accordance with at least one example embodiment described and recited herein. FIG. 2A shows configured views for example Examples (i)-(iv) for variable configurations of remote heat exchanger unit 200, as described below.

As depicted in FIG. 2A, a non-limiting example embodiment of remote heat exchanger unit 200 may include an air intake, e.g., bottom air intake 202A or top air intake 202B; at least one heat exchanger coil 205 over which air received through one or both of air intake 202A or 202B is directed to air outlet 212; one or more fans, e.g., fans 210A and 210B, to direct air received through at least one air intake 202A, 202B over the at least one heat exchanger coil 205; and a separable air duct system 215 to variably direct conditioned air received from the air outlet 212 out from the remote heat exchanger unit 200.

Air intake 202, which may alternatively be referred to as an air return inlet, may refer to one or more openings through which air is received into remote heat exchanger unit 200. In accordance with the example embodiments described and recited herein, an embodiment of remote heat exchanger unit 200 may include at least one of bottom air intake 202A, which is disposed on a bottom portion of remote heat exchanger unit 200, and top air intake 202B, which is disposed on a top portion of remote heat exchanger unit 200. The embodiments described, recited, and even suggested herein are not so limited, though. Air intake 202 may also be disposed on any surface of remote heat exchanger unit 200, e.g., a lateral side surface, especially as remote heat exchanger unit 200 is not limited to square or rectangular configurations.

Heat exchanger coil 205 may refer to one or more heat exchanger coils disposed within remote heat exchanger unit 200 to receive air from the conditioned space, as blown by a heat exchanger blower (not shown) and re-condition the received air as it blows over heat exchanger coil 205. The re-conditioned air may then be directed to air outlet 212.

Although not limiting, as described and recited herein, unless otherwise noted or specified, each embodiment of heat exchanger coil 205 may be understood to have associated therewith a corresponding drain pan, heating system, liquid line solenoid valve, blower, etc.

Fan 210 may refer to a fan to blow air, received through one or more of air intakes 202, across one or more of heat exchanger coils 205 towards air outlet 212.

In accordance with all of the example embodiments described and recited herein, alternatives thereto may include bi-directional fan 210 that may rotate either in a clockwise direction or a counter-clockwise direction. Therefore, the alternative embodiments that include bi-directional fan 210 may have symmetrical fan blades to thereby effectively control the direction of airflow influenced by bi-directional fan 210, dependent upon, for example, a rotational direction of the fan blades.

Air outlet 212 may refer to an opening in remote heat exchanger unit 200 to regulate, in part, the exhausting of conditioned air from remote heat exchanger unit 200. Accordingly, climate controlled air (e.g., cooled air, heated air, etc.) exiting air outlet 212 may be directed back into the conditioned space, where it will undergo a heat exchange with air from the climate controlled space and maintain the climate controlled space at the desired temperature. In accordance with varying non-limiting example embodiments described and recited herein, remote heat exchanger unit 200 may have one or more air outlets 212. For example, for an embodiment having two heat exchanger coils 205, remote heat exchanger unit 200 may include an air outlet 212 corresponding to each of the multiple heat exchanger coils 205.

Separable air duct system 215 may refer to a duct system that facilitates configurable airflow direction based on a disposition of heat exchanger coil 205 in its environment, e.g., within the climate controlled space.

Air duct intake openings 220 may refer to openings in separable air duct system 215 through which, respectively, air directed over heat exchanger coil 205 and through air outlet 212 may be directed into the environment of remote heat exchanger unit 200 in desired directions.

Throughout the figures and descriptions thereof, there may be a depiction and/or description of multiple features, such as but not limited to, fans 210A and 210B; air duct intake openings 220A, 220B, and 220C; etc. However, none of the embodiments depicted, described, or recited herein are so limited with regard to quantity of the features shown and disclosed relative to the various embodiments of remote heat exchanger unit 200. Therefore, unless context otherwise requires, the description and recitation herein may refer to such features in the singular, e.g., fan or fans 210, air duct intake opening or intake openings 220, etc., without limiting the scope of any of the embodiments depicted, described, or recited herein.

Examples FIG. 2A-i through FIG. 2A-iv include one heat exchanger coil 205. Air discharged from air outlet 212 may be directed to separable air duct system 215, which has, e.g., air outlets 2160A, 2160B, and 2160C.

Example FIG. 2A-i shows separable air duct system 215 configured to discharge air from air outlet 212 from a single opening, e.g., opening 2160A, by blocking airflow at any two of openings 2160A, 2160B, and 2160C. In the figure, opening 2160C is blocked.

Example FIG. 2A-ii shows separable air duct system 215 configured to discharge air from air outlet 212 from all available openings, e.g., openings 2160A-C, by opening all of openings 2160A-C.

Example FIG. 2A-iii shows separable air duct system 215 configured to discharge air from air outlet 212 from opposing lateral openings, e.g., openings 2160A and B, by blocking any one of openings 2160A-C. In the figure, opening 2160B is blocked.

Example FIG. 2A-iv shows a side view of remote heat exchanger unit 200.

Figure 2B:
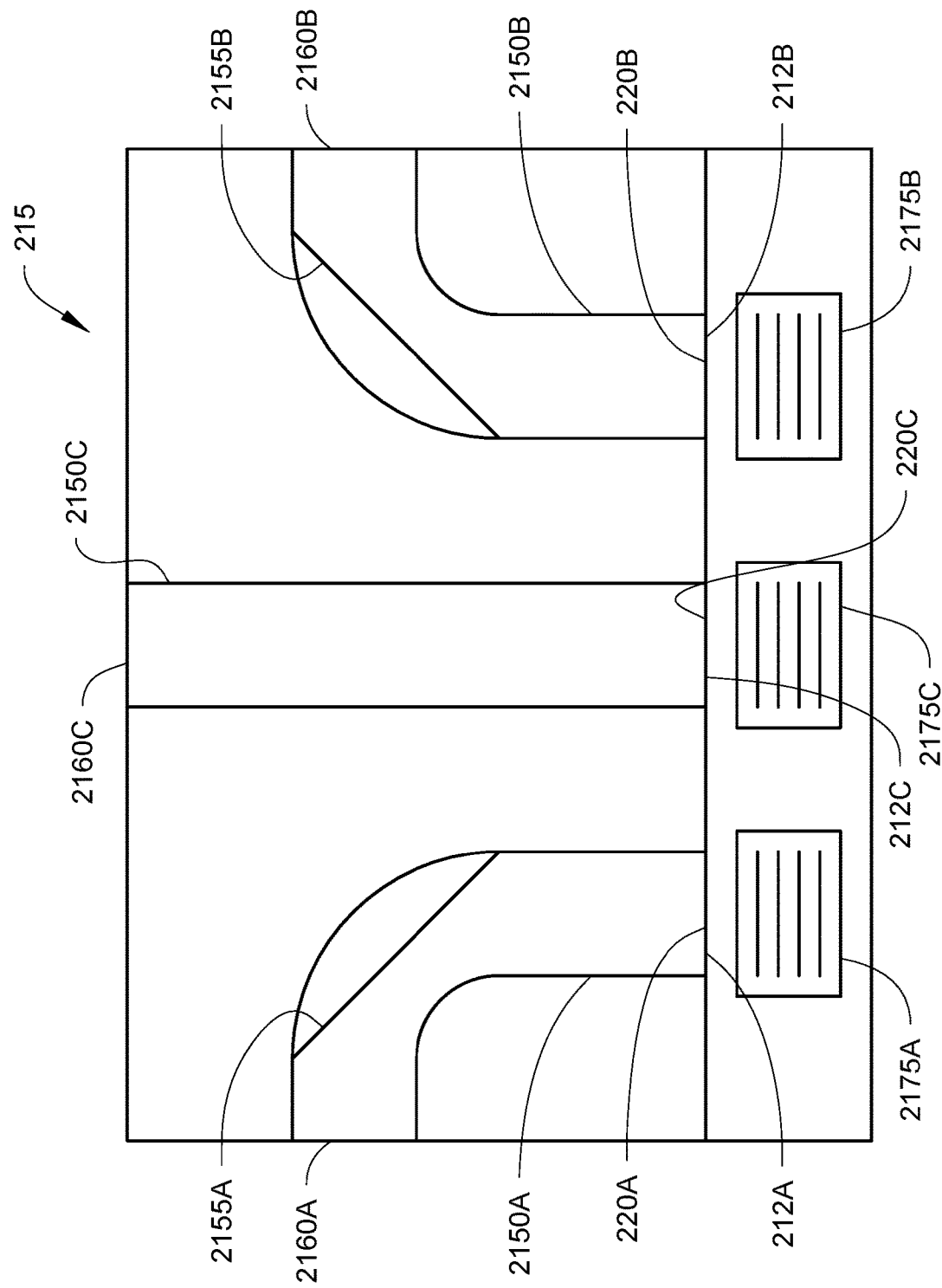

FIG. 2B shows a schematic diagram of separable air duct system 215, in accordance with example embodiments described and recited herein.

As depicted, a non-limiting example embodiment of separable air duct system 215 may include, e.g., air duct intake openings 220A-C, ducts 2150A-C, guide vanes 2155A-C, and air duct outlet openings 2160A—C.

Air duct intake openings 220A-C may refer to openings on separable air duct system 215 that may connect to air outlet 212 corresponding to remote heat exchanger unit 200. Separable air duct system 215 may be sealed, attached, or otherwise connected to remote heat exchanger unit 200 such that substantially all air flowing through air outlet 212 is directed into separable air duct system 215, more particularly into one or more of air duct intake openings 220A-C.

In accordance with at least some of the example embodiments described and recited herein, air outlet 212 may be comprised of a series of openings to which, e.g., each of air duct intake openings 220A-C are sealed, attached, or otherwise connected; or air outlet 212 may be configured as a singular opening, over portions of which one or more of air duct intake openings 220A-C are sealed, attached, or otherwise connected.

In accordance with at least some of the example embodiments described and recited herein, one or more of air outlets 212A-C may have attached thereto louver or damper 2175A-C, which may be variably opened or closed to regulate air flow from the respective air duct outlet opening either manually or in an automated manner.

Although not limiting, as described and recited herein, unless otherwise noted or specified, each occurrence of one or more of air outlets 212 being described as closed may be understood to mean that corresponding damper 2175 has been closed or maintained as closed. Likewise, each occurrence of one or more of air outlets 212 being described as open may be understood to mean that corresponding damper 2175 has been opened or maintained as open. It will be appreciated that the dampers 2175 can be either manually, mechanically or electronically actuated to open or close.

Similarly, also without being limiting, as described and recited herein, unless otherwise noted or specified, each occurrence of one or more of air duct openings 2160 being described as closed may be understood to mean a corresponding damper (not shown) has been closed or maintained as closed. Likewise, each occurrence of one or more of air duct openings 2160 being described as open may be understood to mean that a corresponding damper (not shown) has been opened or maintained as open.

Ducts 2150A-C may each be regarded as conduits or passages through which air receives from remote heat exchanger unit 200, via air outlet 212, may be exhausted from air duct intake openings 220A-C to air duct outlet openings 2160A-C, respectively.

In accordance with at least some of the example embodiments described and recited herein, one or more of ducts 2150A-C may be made of a rigid material or, alternatively, a flexible and configurable material. With regard to a flexible and configurable material, a particular one of ducts 2150A-C may be configured to change a direction to which air flowing there through is exhausted; and a particular one of ducts 2150A-C may be configured to affect the velocity of the air flowing there through by expanding or contracting.

Guide vanes 2155A-C may be flexible or configurable materials disposed within at least a portion of one or more of ducts 2150A-C as an alternate or additional means to affect the velocity of the air exhausted from the respective duct.

Air duct outlet openings 2160A-C, as referenced above, may be openings of respective ones of ducts 2150A-C that may or may not be sealed, attached, or otherwise connected to a shell of remote heat exchanger unit 200, and through which air may be exhausted to the environment of remote heat exchanger unit 200.

Throughout the figures and descriptions thereof, there may be a depiction and/or description of multiple features, such as but not limited to, air duct intake openings 220A, 220B, and 220C; ducts 2150A-C, guide vanes 2155A-C, and air duct outlet openings 2160A-C, etc. However, none of the embodiments depicted, described, or recited herein are so limited with regard to quantity of the features shown and disclosed relative to the various embodiments of separable air duct system 215. Therefore, unless context otherwise requires, the description and recitation herein may refer to such features in the singular, e.g., air duct intake openings or opening 220, duct or ducts 2150, guide vane or vanes 2155, and air duct outlet opening or openings 215, etc., without limiting the scope of any of the embodiments depicted, described, or recited herein.

FIG. 2C shows an example environment for the remote heat exchanger unit 200 of FIG. 2A, in accordance with at least some of the embodiments described and recited herein. Further, FIG. 2C shows Examples 2C-iv and 2C-v for deployment of remote heat exchanger unit 200.

As shown and described with regard to FIG. 1, transport unit 20 may be attached to and configured to be towed by a tractor (not shown). In accordance with at least some example embodiments described and recited herein, transport unit 20 may be a trailer, though the embodiments described herein are not limited to a trailer, but may apply to any type of non-passenger transport unit (e.g., a truck, a container (such as a container on a flat car, an intermodal container, a marine container, etc.), a box car, a semi-tractor, other similar transport unit, or even passenger vehicles, e.g., mass transit buses, etc.

Within a climate controlled space of the transport unit 20, as shown and described with regard to FIG. 2C, there may be disposed movable walls or barriers, or bulkheads 25A and 25B. Further, in the various non-limiting example embodiments, transport unit 20 may include one or more of walls 25 depending on factors including, but not limited to, types of cargo, quantities of the various types of cargo, temperature requirements for maintaining the various types of cargo, etc. Therefore, the respective sizes and temperature requirements for climate controlled zones 20A-C may vary, with the sizes thereof being changed by placement of respective ones of walls 25A and B.

As depicted, a non-limiting example of embodiment of transport unit 20 may include climate controlled zones 20A, 20B, and 20C, as well as walls or barriers 25A and 25B. However, none of the embodiments depicted, described, or recited herein are so limited with regard to the quantity thereof, as shown and disclosed relative to the various embodiments of transport unit 20. Therefore, unless context otherwise requires, the description and recitation herein may refer to climate controlled zones as well as walls or barriers or bulkheads in the singular, e.g., climate controlled zones 20A-C, wall or walls 25, or barrier or barriers 25, or bulkhead or bulkheads 25 without limiting the scope of any of the embodiments depicted, described, or recited herein.

Without being limiting, the description of barriers 25A and B, as well as climate controlled zones 20A-C, may be applied throughout all embodiments described, recited, and even suggested herein.

Example FIG. 2C-i shows one embodiment of remote heat exchanger unit 200 in zone 20B, with separable air duct system 215 configured to discharge air from air outlet 212 from opposing lateral openings, e.g., openings 2160A and C, by blocking one or both of air outlet 212B or opening 2160B; and another embodiment of remote heat exchanger unit 200 in zone 20C, with separable air duct system 215 configured to discharge air from air outlet 212 from openings 2160B and C by blocking one or both of air outlet 212A or opening 2160A.

Example FIG. 2C-ii shows one embodiment of remote heat exchanger unit 200 in zone 20B, with separable air duct system 215 configured to discharge air from air outlet 212 from all available openings, e.g., openings 2160A-C, by opening all of air outlets 212 and openings 2160A-C; and another embodiment of remote heat exchanger unit 200 in zone 20C, with separable air duct system 215 configured to discharge air from air outlet 212B by blocking one or both of air outlet 212A and opening 2160A, as well as one or both of air outlet 212B or opening 2160C.

FIG. 3 shows schematic diagrams of example architectures of a remote heat exchanger unit 200 with configurable air discharge, in accordance with at least one example embodiment described and recited herein. FIG. 3 shows configured views for Examples FIG. 3A through FIG. 3F for variable configurations of remote heat exchanger unit 200, as described below.

Examples FIG. 3A through FIG. 3F pertain to a non-limiting example embodiment of remote heat exchanger unit 200 that may include bottom air intake 202A; heat exchanger coils 205A and 205B over which air received through air intake 202A directed outward; fans 210A and 210B to direct air received through air intake 202A over heat exchanger coils 205; and separable air duct system 215.

Figure 3B:
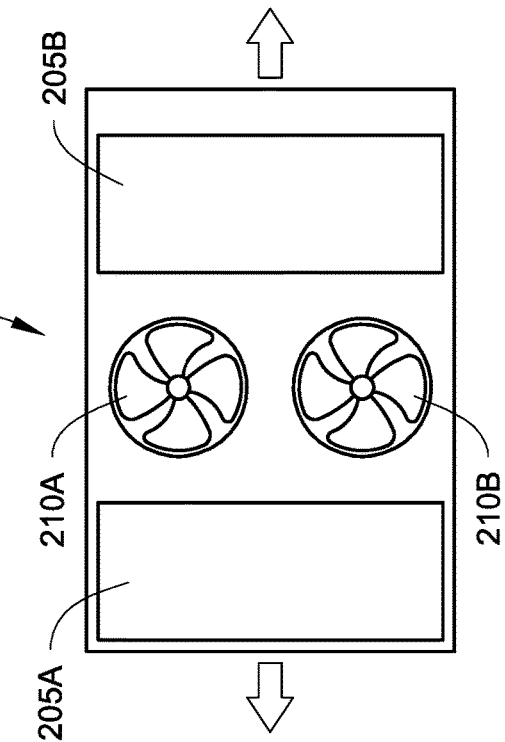
FIG. 3B shows a top view of a non-limiting example embodiment of a remote heat exchanger unit, in accordance with at least one example embodiment described and recited herein.
Figure 3C:
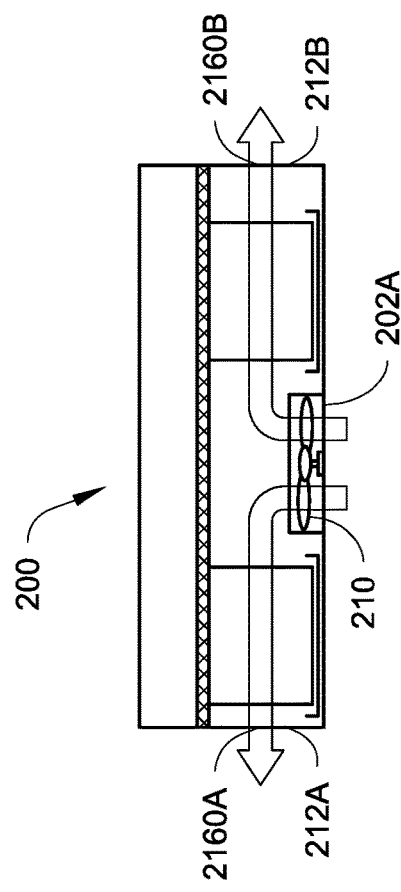
FIG. 3C shows a side view of a non-limiting example embodiment of a remote heat exchanger unit, in accordance with at least another example embodiment described and recited herein.
Figure 3A:
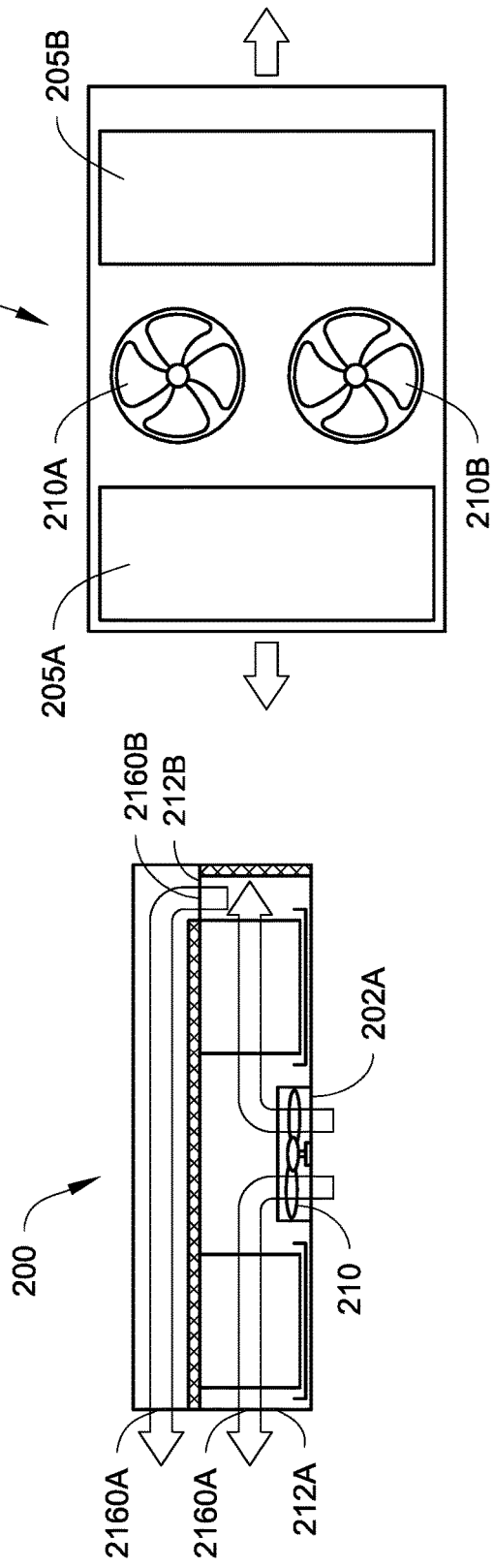
FIG. 3A shows a side view of a non-limiting example embodiment of a remote heat exchanger unit, in accordance with at least one example embodiment described and recited herein.

Example FIG. 3A shows a side view of a non-limiting example embodiment of remote heat exchanger unit 200. In the example embodiment, one or more of fans 210 draws air from environment into bottom air intake 202A and over each of heat exchanger coils 205. Although the example embodiment depicts heat exchanger coils 205 on opposing sides of fans 210, implying a separation of about 180°, the example is non-limiting. Multiple heat exchanger coils 205 within an embodiment of remote heat exchanger unit 200 may be separated in varying configurations.

As described previously, for an embodiment having two heat exchanger coils 205, remote heat exchanger unit 200 may include an air outlet 212 for each of the multiple heat exchanger coils 205. Accordingly, whereas Example FIG. 3A shows separable air duct system 215 disposed on top of remote heat exchanger unit 200, air that is blown by one or more of fans 210 over heat exchanger coil 205A is discharged from remote heat exchanger unit 200 through a corresponding one of air outlets 212; and air that is blown by one or more of fans 210 over heat exchanger coil 205B is discharged from remote heat exchanger unit 200 through opening 2160B, via air duct outlet 212, by blocking openings 2160A and 2160C (not shown).

Example FIG. 3B shows a top view of a non-limiting example embodiment of remote heat exchanger unit 200 in which one or more of fans 210A and B draws air from environment into bottom air intake 202A and over each of heat exchanger coils 205A and B. Heat exchanger coils 205A and B are disposed on opposing sides of fans 210. Air duct system 215 is disposed on a side of remote heat exchanger unit 200 so as to receive air from air outlet 212B corresponding to heat exchanger coil 205B. Thus, air that is blown by one or more of fans 210 over heat exchanger coil 205A is discharged from remote heat exchanger unit 200 through corresponding air outlet 212A; and air that is blown by one or more of fans 210 over heat exchanger coil 205B is exhausted from remote heat exchanger unit 200 through opening 2160B, via outlet 212B, by blocking openings 2160A and 2160C (not shown).

Example FIG. 3C shows a side view of a non-limiting example embodiment of remote heat exchanger unit 200. In the example embodiment, one or more of fans 210 draws air from environment into bottom air intake 202A and over each of heat exchanger coils 205. Remote heat exchanger unit 200 may include an air outlet 212 for each of heat exchanger coils 205A and 205B. Separable air duct system 215 is disposed on top of remote heat exchanger unit 200, and air that is blown by one or more of fans 210 over heat exchanger coil 205A is discharged from remote heat exchanger unit 200 through corresponding air outlets 212A; and air that is blown by one or more of fans 210 over heat exchanger coil 205B is discharged from remote heat exchanger unit 200 through corresponding air outlets 212B. That is, one or both of air outlet 212A or duct opening 2160A and one or both of air outlet 212C or duct opening 2160C is blocked.

Figure 3E:
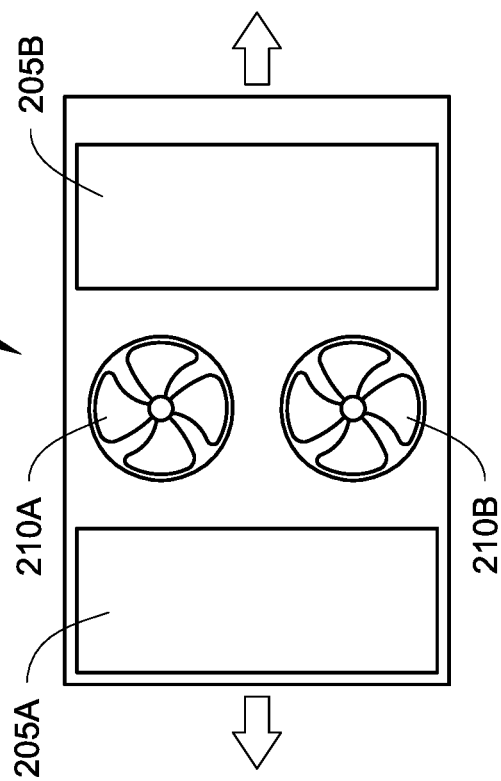
FIG. 3E shows a top view of a non-limiting example embodiment of a remote heat exchanger unit, in accordance with at least another example embodiment described and recited herein, in accordance with at least one example embodiment described and recited herein.
Figure 3F:
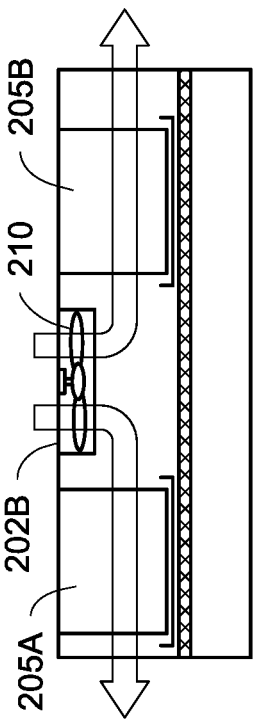
FIG. 3F shows a side view of a non-limiting example embodiment of a remote heat exchanger unit, in accordance with at least yet another example embodiment described and recited herein.
Figure 3D:
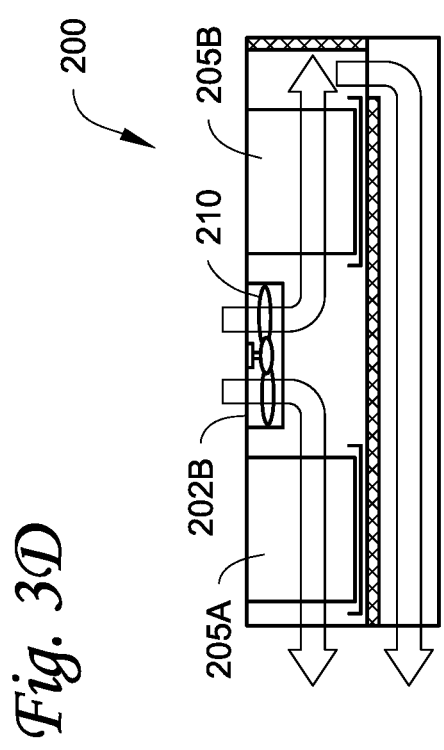
FIG. 3D shows a side view of a non-limiting example embodiment of a remote heat exchanger unit, in accordance with at least yet another example embodiment described and recited herein.

Example FIG. 3D shows a shows a side view of a non-limiting example embodiment of remote heat exchanger unit 200 in which one or more of fans 210 draws air from environment into top air intake 202B and over each of heat exchanger coils 205A and 205B. Separable air duct system 215 is disposed beneath remote heat exchanger unit 200, and air that is blown by one or more of fans 210 over heat exchanger coil 205A is discharged from remote heat exchanger unit 200 through a corresponding one of air outlets 212; and air that is blow by one or more of fans 210 over heat exchanger coil 205B is discharged from remote heat exchanger unit 200 through opening 2160B, via outlet 212, by blocking one or both of air outlet 212A or air duct opening 2160A and one or both of air outlet 212C or 2160C (not shown).

Example FIG. 3E shows a top view of a non-limiting example embodiment of remote heat exchanger unit 200 in which one or more of fans 210 draws air from environment into top air intake 202B and over each of heat exchanger coils 205. Heat exchanger coils 205 are disposed on opposing sides of fans 210. Air duct system 215 is disposed beneath remote heat exchanger unit 200 so as to receive air from air outlet 212B corresponding to heat exchanger coil 205B. Thus, air that is blown by one or more of fans 210 over heat exchanger coil 205A is discharged from remote heat exchanger unit 200 through corresponding air outlet 212A and air duct opening 2160A; and air that is blown by one or more of fans 210 over heat exchanger coil 205B is discharged from remote heat exchanger unit 200 through opening 2160B, via outlet 212B, by blocking openings one or both of air outlet 212A or air duct opening 2160A and one or more of air outlet 212A or air duct opening 2160C (not shown).

Example FIG. 3F shows a side view of a non-limiting example embodiment of remote heat exchanger unit 200. In the example embodiment, one or more of fans 210 draws air from environment into top air intake 202B and over each of heat exchanger coils 205. Remote heat exchanger unit 200 may include an air outlet 212 for each of heat exchanger coils 205A and 205B. Separable air duct system 215 is disposed beneath remote heat exchanger unit 200, and air that is blown by one or more of fans 210 over heat exchanger coil 205A may be discharged from remote heat exchanger unit 200 through corresponding air duct opening 2160 A, via air outlet 212A; and air that is blown by one or more of fans 210 over heat exchanger coil 205B is discharged from remote heat exchanger unit 200 through corresponding air duct opening 2160B, via air outlet 212B. That is, one or both of air outlet 212A or duct opening 2160A and one or both of air outlet 212B or duct opening 2160B is blocked.

FIG. 4A shows a schematic diagram of example architectures of a remote heat exchanger unit with configurable air discharge, in accordance with at least one example embodiment described and recited herein.

Examples FIG. 4A-i through FIG. 4A-iv pertain to a non-limiting example embodiment of remote heat exchanger unit 200 that may include bottom air intake 202A; heat exchanger coils 205A and 205B over which air received through air intake 202A directed outward; fans 210A and 210B to direct air received through bottom air intake 202A over heat exchanger coils 205; and separable air duct system 215, which is configured to cover three of four lateral sides of remote heat exchanger unit 200.

Example FIG. 4A-i shows a top view of a non-limiting example embodiment of remote heat exchanger unit 200. In the example embodiment, one or both of fans 210A and B draws air from environment into bottom air intake 202A and over each of heat exchanger coils 205A and B. Although the example embodiment depicts heat exchanger coils 205A and B on opposing sides of fans 210A and B, implying a separation of about 180°, the example is non-limiting. Multiple heat exchanger coils 205 within an embodiment of remote heat exchanger unit 200 may be separated in varying configurations.

As described previously, for an embodiment having two heat exchanger coils 205A and B, remote heat exchanger unit 200 may include air outlets 212A and B, respectively, for heat exchanger coils 205A and 205B. Accordingly, whereas Example FIG. 4A-i shows separable air duct system 215 being U-shaped to cover three of four lateral sides of remote heat exchanger unit 200, air that is blown by one or more of fans 210 over heat exchanger coil 205A is discharged from remote heat exchanger unit 200 through corresponding air outlet 212A and air duct opening 2160A; and air that is blown by one or more of fans 210 over heat exchanger coil 205B is discharged from remote heat exchanger unit 200 through opening 2160C, via outlet 212C, by blocking one or both of air outlet 212A or duct opening 2160A and one or both of air outlet 212B or duct opening 2160B.

Example FIG. 4A-ii shows a side view of the non-limiting example embodiment of remote heat exchanger unit 200 from Example (i) of FIG. 4A. In the example embodiment, one or more of fans 210 draws air from environment into bottom air intake 202A and over heat exchanger coil 205A.

Example FIG. 4A-iii shows a top view of a non-limiting example embodiment of remote heat exchanger unit 200 in which one or more of fans 210A and B draws air from environment into bottom air intake 202A and over both of heat exchanger coils 205A and 205B. Heat exchanger coils 205A and B are disposed on opposing sides of fans 210. Air duct system 215 is U-shaped to cover three of four lateral sides of remote heat exchanger unit 200; air that is blown by one or more of fans 210 over heat exchanger coil 205A is discharged from remote heat exchanger unit 200 through corresponding air outlet 212A; and air that is blown by one or more of fans 210 over heat exchanger coil 205B is discharged from remote heat exchanger unit 200 through air outlets 212A and B as well as openings 2160A and B, by blocking one or both of air outlet 212C or duct opening 2160C.

Further, as previously described, ducts may be made of a flexible and configurable material. Thus, in accordance with the non-limiting example embodiment of FIG. 4A, air that is blown by one or more of fans 210 over heat exchanger coil 205B is discharged from remote heat exchanger unit 200 through openings 2160A and B, via a corresponding outlet 212, through flexible ducts 2150A and 2150B so as to exit remote heat exchanger unit 200 in an air flow that is adjacent to the air flow exiting from outlet 212A corresponding to heat exchanger coil 205A.

Example FIG. 4A-iv shows a side view of the non-limiting example embodiment of remote heat exchanger unit 200 from Example FIG. 4A-iii. In the example embodiment, one or more of fans 210 draws air from environment into bottom air intake 202A and over heat exchanger coil 205A.

FIG. 4B shows an example environment for the remote heat exchanger unit of FIG. 4A, in accordance with at least some of the embodiments described and recited herein.

As shown and described with regard to FIG. 1, transport unit 20 is attached to and configured to be towed by a tractor (not shown). Within a climate controlled space of the transport unit 20 are movable walls or barriers, i.e, bulkheads 25A and 25B. Further, as depicted and as previously described, a non-limiting example of embodiment of transport unit 20 includes a climate controlled space with climate controlled zones 20A, 20B, and 20C, configured by walls or barriers 25A and 25B.

Example FIG. 4B shows one embodiment of remote heat exchanger unit 200 in climate controlled zone 20B, with separable air duct system 215 configured as in Example FIG. 4A-i, i.e., separable air duct system 215 being U-shaped to cover three of four lateral sides of remote heat exchanger unit 200; air that is blown by one or more of fans 210 over heat exchanger coil 205A or discharged from remote heat exchanger unit 200 through corresponding air outlet 212; and air that is blown by one or more of fans 210 over heat exchanger coil 205B is discharged from remote heat exchanger unit 200 through opening 2160C, via outlet 212C, by blocking one or both of air outlet 212A or duct opening 2160A and one or both of air outlet 212B or duct opening 2160B.

Example FIG. 4B also shows one embodiment of remote heat exchanger unit 200 in climate controlled zone 20C, with separable air duct system 215 configured as in Example FIG. 4A-iii, i.e., separable air duct system 215 being U-shaped to cover three of four lateral sides of remote heat exchanger unit 200, air that has been blown by one or more of fans 210 over heat exchanger coil 205A being discharged from remote heat exchanger unit 200 through corresponding air outlet 212; and air that has been blown by one or more of fans 210 over heat exchanger coil 205B being discharged from remote heat exchanger unit 200 through openings 2160A and B, via outlet 212, by blocking one or both of air outlet 212C or duct opening 2160C.

FIG. 5A shows a schematic diagram of an architecture of a remote heat exchanger unit with configurable air discharge, in accordance with at least one example embodiment described and recited herein.

Examples FIG. 5A-i through FIG. 5A-iv, pertain to a non-limiting example embodiment of remote heat exchanger unit 200 that may include bottom air intake 202A; heat exchanger coils 205A and 205B over which air received through air intake 202A directed outward; fans 210A and 210B to direct air received through bottom air intake 202A over heat exchanger coils 205A and B; and separable air duct system 215, which is configured to cover three of four lateral sides of remote heat exchanger unit 200.

Example FIG. 5A-i shows a top view of a non-limiting example embodiment of remote heat exchanger unit 200. In the example embodiment, one or more of fans 210A and B draws air from environment into bottom air intake 202A and over both of heat exchanger coils 205A and B. Multiple heat exchanger coils 205 within an embodiment of remote heat exchanger unit 200 may be separated in varying configurations, as described previously.

Also as previously described, for an embodiment having heat exchanger coils 205A and B, remote heat exchanger unit 200 may include an air outlets 212A and B corresponding respectively to heat exchanger coils 205A and 205B. Accordingly, whereas Example FIG. 5A-i shows separable air duct system 215 being L-shaped to cover two adjacent sides of remote heat exchanger unit 200, air that is blown by one or more of fans 210 over heat exchanger coil 205A is discharged from remote heat exchanger unit 200 through corresponding air outlet 212A and air duct opening 2160A; and air that is blown by one or more of fans 210 over heat exchanger coil 205B is discharged from remote heat exchanger unit 200 through opening 2160A, via outlet 212A, by blocking one or both of air outlet 212B or duct opening 2160B and one or both of air outlet 212C or duct opening 2160C (not shown).

Example FIG. 5A-ii shows a side view of the non-limiting example embodiment of remote heat exchanger unit 200 from Example FIG. 5A-i. In the example embodiment, one or more of fans 210 draws air from environment into bottom air intake 202A and over heat exchanger coil 205A.

Example FIG. 5A-iii shows a top view of a non-limiting example embodiment of remote heat exchanger unit 200 in which one or more of fans 210 draws air from environment into bottom air intake 202A and over both of heat exchanger coils 205A and 205B. Heat exchanger coils 205A and B are disposed on opposing sides of fans 210. Air duct system 215 is L-shaped to cover two adjacent lateral sides of remote heat exchanger unit 200; air that is blown by one or more of fans 210 over heat exchanger coil 205A is discharged from remote heat exchanger unit 200 through corresponding air outlet 212 and duct opening 2160A; and air that is blown by one or more of fans 210 over heat exchanger coil 205B is discharged from remote heat exchanger unit 200 through duct opening 2160B, via air outlet 212, by blocking one or both of air outlet 212A or duct opening 2160A and one or both of air outlet 212B or duct opening 2160B (not shown).

In accordance with the non-limiting example embodiment of FIG. 5A, air that is blown by one or more of fans 210 over heat exchanger coil 205B is discharged from remote heat exchanger unit 200 through opening 2160B, via outlet 212B, through flexible ducts 2150B so as to exit remote heat exchanger unit 200 in an air flow that is adjacent to the air flow exiting from air outlet 212 corresponding to heat exchanger coil 205A.

Example FIG. 5A-iv shows a side view of the non-limiting example embodiment of remote heat exchanger unit 200 from Example FIG. 5A-iii. In the example embodiment, one or more of fans 210 draws air from environment into bottom air intake 202A and over heat exchanger coils 205A and 205B, and discharges the air through air duct openings 212A and B respectively corresponding to the heat exchanger coils.

FIG. 5B shows an example environment for the remote heat exchanger unit of FIG. 5A, in accordance with at least some of the embodiments described and recited herein.

As shown and described with regard to FIG. 1, transport unit 20 is attached to and configured to be towed by a tractor (not shown). Within transport unit 20 are movable walls, barriers, or bulkheads 25A and 25B. Further, as depicted and as previously described, a non-limiting example of embodiment of transport unit 20 may include a climate controlled space with climate controlled zones 20A, 20B, and 20C, configured by walls or barriers 25A and 25B.

Example FIG. 5B shows one embodiment of remote heat exchanger unit 200 in climate controlled zone 20B, with separable air duct system 215 configured as in Example FIG. 5A-i, i.e., separable air duct system 215 being L-shaped to cover adjacent lateral sides of remote heat exchanger unit 200; air that is blown by one or more of fans 210 over heat exchanger coil 205A is discharged from remote heat exchanger unit 200 through corresponding air outlet 212A; and air that is blown by one or more of fans 210 over heat exchanger coil 205B is discharged from remote heat exchanger unit 200 through opening 2160C, via outlet 212, by blocking one or both of air outlet 212A or duct opening 2160A and one or both of air outlet 212B or duct opening 2160B.

Example FIG. 5B also shows one embodiment of remote heat exchanger unit 200 in climate controlled zone 20C, with separable air duct system 215 configured as in Example FIG. 5A-iii, i.e., separable air duct system 215 being U-shaped to cover three of four lateral sides of remote heat exchanger unit 200, air that is blown by one or more of fans 210 over heat exchanger coil 205A is from remote heat exchanger unit 200 through corresponding air outlet 212A; and air that is blown by one or more of fans 210 over heat exchanger coil 205B being discharged from remote heat exchanger unit 200 through opening 2160B, via outlet 212B, by blocking one or both of air outlet 212A or duct opening 2160A and one or both of air outlet 212C or duct opening 2160C (not shown).

FIG. 6A shows a schematic diagram of an architecture of a remote heat exchanger unit with configurable air discharge, in accordance with at least one example embodiment described and recited herein.

Example FIG. 6A-i shows a top view of a non-limiting example embodiment of remote heat exchanger unit 200 in which two non-aligned heat exchanger coils 205 are separated by a partition wall to separate respective corresponding airflow streams. The embodiments of remote heat exchanger unit 200 are configured to have a dual-side airflow discharge. The dual-side airflow discharge is implemented by positioning fan 210A to be adjacent to a rear portion of remote heat exchanger unit 200, on an opposite side of heat exchanger coil 205A as outlet 212A; and by maintaining fan 210B in its centralized position.

Example FIG. 6A-ii shows a side view of the embodiment of Example FIG. 6A-i, by which fans 210 draw air from environment into bottom air intake 202.

Example FIG. 6A-iii shows a top view of a non-limiting example embodiment of remote heat exchanger unit 200 in which two non-aligned heat exchanger coils 205A and B are separated by a partition wall to separate respective corresponding airflow streams. The embodiment of remote heat exchanger unit 200 is configured to have a single-side airflow discharge. The single-side airflow discharge is implemented by positioning fan 210A to be adjacent to a rear portion of remote heat exchanger unit 200, on an opposite side of heat exchanger coil 205A as outlet 212A; and by maintaining fan 210B in its centralized position.

Example FIG. 6A-iv shows a side view of the embodiment of Example FIG. 6A-iii, by which fans 210 draw air from environment into bottom air intake 202A.

FIG. 6B shows an example environment for the remote heat exchanger unit of FIG. 6A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 6B shows one embodiment of remote heat exchanger unit 200 in climate controlled zone 20B, with separable air duct system 215 configured as in Examples FIG. 6A-i and FIG. 6A-ii, i.e., dual-side airflow discharge. Further, Example FIG. 6A-v also shows one embodiment of remote heat exchanger unit 200 in climate controlled zone 20C, with separable air duct system 215 configured as in Examples FIG. 6A-i and FIG. 6A-ii, i.e., single-side airflow discharge.

FIG. 7A shows a schematic diagram of an architecture of a remote heat exchanger unit with configurable air discharge, in accordance with at least one example embodiment described and recited herein.

Example FIG. 7A-i shows a top view of a non-limiting example embodiment of remote heat exchanger unit 200 in which heat exchanger coil 205 straddles a partition wall disposed to separate respective corresponding airflow streams. The embodiment of remote heat exchanger unit 200 is configured to have a dual-side airflow discharge. The dual-side airflow discharge is implemented by positioning fan 210A to be adjacent to a rear portion of remote heat exchanger unit 200, on an opposite side of heat exchanger coil 205A as outlet 212A, and closing air outlet 212B on the respective side of the partition; and by similarly positioning fan 210B to be adjacent to an opposing end of remote heat exchanger unit 200, relative to fan 210A and outlet 212B, and closing outlet 212A on the respective side of the partition.

Example FIG. 7A-ii shows a side view of the embodiment of Example FIG. 7A-i, by which fans 210 draw air from environment into bottom air intake 202.

Example FIG. 7A-iii shows a top view of a non-limiting example embodiment of remote heat exchanger unit 200 in which heat exchanger coil 205 straddles a partition wall to separate respective corresponding airflow streams. The embodiment of remote heat exchanger unit 200 is configured to have a single-side airflow discharge. The single-side airflow discharge is implemented by positioning fans 210A and 210B to be adjacent to a rear portion of remote heat exchanger unit 200, on an opposite side of respective outlet 212A and 212B, thus blowing air over heat exchanger coil 205 and through the respective openings 212.

Example FIG. 7A-iv shows a side view of the embodiment of Example FIG. 7A-iii, by which fans 210 draw air from environment into bottom air intake 202.

FIG. 7B shows an example environment for the remote heat exchanger unit of FIG. 7A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 7B shows one embodiment of remote heat exchanger unit 200 in climate controlled zone 20B, with separable air duct system 215 configured as in Examples FIG. 7A-i and FIG. 7A-ii, i.e., dual-side airflow discharge. Further, Example FIG. 7A-v also shows one embodiment of remote heat exchanger unit 200 in climate controlled zone 20C, with separable air duct system 215 configured as in Examples FIG. 7A-i and FIG. 7A-ii, i.e., single-side airflow discharge.

FIG. 8A shows a schematic diagram of an architecture of a remote heat exchanger unit with configurable air discharge, in accordance with at least one example embodiment described and recited herein.

Example FIG. 8A-i shows a top view of a non-limiting example embodiment of remote heat exchanger unit 200 in which heat exchanger coils 205A and 205B are disposed on opposite sides of a partition wall disposed to separate respective corresponding airflow streams. The embodiment of remote heat exchanger unit 200 is configured to have a dual-side airflow discharge. The dual-side airflow discharge is implemented by positioning fan 210A to be adjacent to a rear portion of remote heat exchanger unit 200, on an opposite side of heat exchanger coil 205A as outlet 212A, and closing the opposing outlet 212B on the respective side of the partition; and by similarly positioning fan 210B to be adjacent to an opposing end of remote heat exchanger unit 200, on an opposite side of heat exchanger coil 205B, relative to fan 210A and outlet 212B, and closing the opposing outlet 212A on the respective side of the partition.

Example FIG. 8A-ii shows a side view of the embodiment of Example FIG. 8A-i, by which fans 210 draw air from environment into bottom air intake 202.

Example FIG. 8A-iii shows a top view of a non-limiting example embodiment of remote heat exchanger unit 200 in which heat exchanger coils 205A and 205B are disposed on opposite sides of a partition wall disposed to separate respective corresponding airflow stream. The embodiment of remote heat exchanger unit 200 is configured to have a single-side airflow discharge. The single-side airflow discharge is implemented by positioning fans 210A and 210B to be adjacent to a rear portion of remote heat exchanger unit 200, on an opposite side of respective outlets 212A and 212B with heat exchanger coils 205A and 205B disposed there between, thus blowing air over heat exchanger coil 205 and through the respective openings 212.

Example FIG. 8A-iv shows a side view of the embodiment of Example FIG. 8A-iii, by which fans 210 draw air from environment into bottom air intake 202.

FIG. 8B shows an example environment for the remote heat exchanger unit of FIG. 8A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 8B shows one embodiment of remote heat exchanger unit 200 in climate controlled zone 20B, with separable air duct system 215 configured as in Examples FIG. 8A-i and FIG. 8A-ii, i.e., dual-side airflow discharge. Further, Example (v) also shows one embodiment of remote heat exchanger unit 200 in climate controlled zone 20C, with separable air duct system 215 configured as in Examples FIG. 8A-i and FIG. 8A-ii, i.e., single-side airflow discharge.

FIG. 9A shows a schematic block diagram of an architecture of a remote heat exchanger unit with configurable air discharge, in accordance with at least one example embodiment described and recited herein.

Example FIG. 9A-i shows a top view of a non-limiting example embodiment of remote heat exchanger unit 200 in which heat exchanger coil 205A is disposed on an opposite side of a partition wall disposed to separate respective corresponding airflow streams as heat exchanger coils 205B and 205C. The embodiments of remote heat exchanger unit 200 may be configured to have a dual-side airflow discharge, with heat exchanger coil 205A being in one air stream and heat exchanger coils 205B and 205C being in the other air stream.

The air stream with heat exchanger coils 205B and 205C may be configured to have a single side airflow discharge or a dual-side airflow discharge. The dual side airflow discharge may be implemented by blocking airflow from fan 210B to heat exchanger coil 205B with a partition, and closing a corresponding liquid line solenoid valve working fluid to heat exchanger coils 205B. The partition may be a plastic or metal plate or a damper. Otherwise, heat exchanger coil 205A is positioned to be adjacent to a rear portion of remote heat exchanger unit 200, adjacent to outlet 212A, with fan 210A centrally disposed; and by centrally positioning fan 210B between heat exchanger coil 205B and heat exchanger coil 205C, with outlet 212B adjacent to heat exchanger coil 205C.

Example FIG. 9A-ii shows a side view of the embodiment of Example FIG. 9A-i, by which fans 210 draw air from environment into bottom air intake 202.

Example FIG. 9A-iii shows a top view of a non-limiting example embodiment of remote heat exchanger unit 200 in which heat exchanger coil 205A is disposed on an opposite side of a partition wall disposed to separate respective corresponding airflow streams as heat exchanger coils 205B and 205C. The single side discharge may be implemented by blocking airflow from fan 210B to heat exchanger coil 205C with a partition, and closing a corresponding liquid line solenoid valve working fluid flow to heat exchanger coil 205C. A limit switch may be utilized to sense the airflow blockage location and to control the liquid line solenoid valve. Otherwise, heat exchanger coil 205A is positioned to be adjacent to a rear portion of remote heat exchanger unit 200, adjacent to outlet 212A, with fan 210A centrally disposed; and by centrally positioning fan 210B between heat exchanger coil 205B and heat exchanger coil 205C, with outlet 212B adjacent to heat exchanger coil 205B.

Example FIG. 9A-iv shows a side view of the embodiment of Example FIG. 9A-iii, by which fans 210 draw air from environment into bottom air intake 202.

FIG. 9B shows an example environment for the remote heat exchanger unit of FIG. 9A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 9B shows one embodiment of remote heat exchanger unit 200 in climate controlled zone 20B, with separable air duct system 215 configured as in Examples (i) and (ii) of FIG. 9A, i.e., dual-side airflow discharge. Further, Example FIG. 9B also shows one embodiment of remote heat exchanger unit 200 in climate controlled zone 20C, with separable air duct system 215 configured as in FIG. 9A-i and FIG. 9A-ii, i.e., single-side airflow discharge.

FIG. 10A shows a schematic diagram of an architecture of a remote heat exchanger unit with configurable air discharge, in accordance with at least one example embodiment described and recited herein.

Example FIG. 10A-i shows a top view of a non-limiting example embodiment of remote heat exchanger unit 200 in which heat exchanger coil 205A is disposed in a same airflow stream as heat exchanger coil 205B. The dual-side airflow discharge may be implemented by positioning heat exchanger coil 205A to be adjacent to a rear portion of remote heat exchanger unit 200, adjacent to outlet 212A, with fans 210A and 210B centrally disposed and heat exchanger coil 205B adjacent to outlet 212B, and opening liquid line solenoid valve working fluid flow to heat exchanger coils 205A and 205B.

Example FIG. 10A-ii shows a side view of the embodiment of Example FIG. 10A-i, by which fans 210 draw air from environment into bottom air intake 202A.

Example FIG. 10A-iii shows a top view of a non-limiting example embodiment of remote heat exchanger unit 200 in which heat exchanger coil 205A is disposed in a same airflow stream as heat exchanger coil 205B. The single-side airflow discharge may be implemented by blocking airflow to either heat exchanger coils 205A or 205B with a partition and closing the corresponding liquid line solenoid valve working fluid flow to the blocked heat exchanger coil. The partition may be a plastic or metal plate or a damper. A limit switch may be utilized to sense airflow block and to control the liquid line solenoid valve.

Example FIG. 10A-iv shows a side view of the embodiment of Example FIG. 10A-iii, by which fans 210 draw air from environment into bottom air intake 202.

FIG. 10B shows an example environment for the remote heat exchanger unit of FIG. 10A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 10B shows one embodiment of remote heat exchanger unit 200 in climate controlled zone 20B, with separable air duct system 215 configured as in Examples FIG. 10A-i and FIG. 10A-ii, i.e., dual-side airflow discharge. Further, Example FIG. 10B also shows one embodiment of remote heat exchanger unit 200 in climate controlled zone 20C, with separable air duct system 215 configured as in Examples FIG. 10A-i and FIG. 10A-ii, i.e., single-side airflow discharge.

FIG. 11A shows a schematic diagram of an architecture of a remote heat exchanger unit with configurable air discharge, in accordance with at least one example embodiment described and recited herein.

Example FIG. 11A-i shows a top view of a non-limiting example embodiment of remote heat exchanger unit 200 in which lone heat exchanger coil 205 is disposed in a circular shape.

Example FIG. 11A-ii shows a side view of the embodiment of Example FIG. 11A-i, by which fans 210 draw air from environment into a bottom air intake (not shown).

Example FIG. 11A-iii shows a top view of a non-limiting example embodiment of remote heat exchanger unit 200 in which lone heat exchanger coil 205 is disposed in two substantially squared shells having rounded edges.

Example FIGS. 11A-v and 11A-vi top views of embodiments pertaining to the examples of Examples FIG. 11A-i and FIG. 11A-iii, respectively.

In accordance with Examples FIG. 11A-i through FIG. 11A-iv, airflow discharge may be in any direction. Single side discharge may be implemented by blocking airflow variably plugging inserts into all but one of the air outlets. Dual or three-side airflow discharge may be implemented by plugging two or more inserts at appropriate air outlets.

For the respective remote heat exchanger units, the drain pan and defrost heater are circularly shaped and tilted at angle to drain water during frost.

FIG. 11B shows an example environment for the remote heat exchanger unit of FIG. 11A, in accordance with at least some of the embodiments described and recited herein.

Within transport unit 20 (see FIG. 1) is a climate controlled space that includes climate controlled zones 20A, 20B, 20C, and 20D, configured by walls, barriers, or bulkheads 25A, 25B, and 25C.

Example FIG. 11B shows one embodiment of remote heat exchanger unit 200 in climate controlled zone 20B, with separable air duct system 215 configured to provide a dual-side airflow discharge; Example FIG. 11B also shows one embodiment of remote heat exchanger unit 200 in climate controlled zone 20C, with separable air duct system 215 configured to provide a 360-degree airflow discharge; and Example FIG. 11-v also shows one embodiment of remote heat exchanger unit 200 in climate controlled zone 20D, with separable air duct system 215 configured to provide a single-side airflow discharge.

FIG. 12A shows a schematic diagram of an architecture of a remote heat exchanger unit with configurable air discharge, in accordance with at least one example embodiment described and recited herein.

Example FIG. 12A-i shows a top view of a non-limiting example embodiment of remote heat exchanger unit 200 in which heat exchanger coils 205A, 205B, and 205C are disposed in a triangular configuration. The embodiment of remote heat exchanger unit 200 may be configured to have a three-side airflow discharge, with each of heat exchanger coils 205 disposed adjacent to a corresponding outlet 212, and none of airflow outlets 212 are blocked.

Example FIG. 12A-ii shows a top view of a non-limiting example embodiment of remote heat exchanger unit 200 in which heat exchanger coils 205A, 205B, and 205C are disposed in a triangular configuration. The embodiment of remote heat exchanger unit 200 is configured to have a two-side airflow discharge, with outlet 212A corresponding to heat exchanger coil 205A closed, and the liquid line solenoid valve working fluid flow to heat exchanger coil 205 is closed; and heat exchanger coils 205B and 205B are disposed adjacent to corresponding outlet 212 that are permitting airflow therefrom.

Similarly, a single side discharge may be implemented by blocking airflow to any two of heat exchanger coils 205 and close the liquid line solenoid valve working fluid to those heat exchanger coils 205. A limit switch or using input may be used to sense the airflow blockage location and, thus, control liquid line solenoid valve to the blocked heat exchanger coils.

In the non-limiting example embodiments of Examples FIG. 12A-i and FIG. 12A-ii, each heat exchanger coil 205 has a corresponding drain pan, heating system, and liquid line solenoid valve. Further, air that is blown over the respective heat exchanger coils 205 by fan 210 is drawn in from bottom air intake 202A.

FIG. 12B shows an example environment for the remote heat exchanger unit of FIG. 12A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 12B shows one embodiment of remote heat exchanger unit 200 in climate controlled zone 20B, with separable air duct system 215 configured as in Examples FIG. 12A-i and FIG. 12A-ii. Example FIG. 12B shows one embodiment of remote heat exchanger unit 200 in climate controlled zone 20B, with separable air duct system 215 configured to implement a three-side airflow discharge and one embodiment of remote heat exchanger unit 200 in climate controlled zone 20C, with separable air duct system configured to implement a two-side air discharge.

FIG. 13A shows a schematic diagram of an architecture of a remote heat exchanger unit with configurable air discharge, in accordance with at least one example embodiment described and recited herein.

Example FIG. 13A-i shows a top view of a non-limiting example embodiment of remote heat exchanger unit 200 in which heat exchanger coils 205A, 205B, and 205C are disposed in a triangular configuration. Each of heat exchanger coils 205A, 205B, and 205C is separated from the others by partition walls to separate corresponding airflow streams produced by corresponding fans 210A, 210B, and 210C, as air is drawn into remote heat exchanger unit 200 via bottom air intake 202. The embodiment of remote heat exchanger unit 200 may be configured to have a three-side airflow discharge, with each of heat exchanger coils 205 disposed adjacent to a corresponding outlet 212, and none of airflow outlets 212 is blocked as all of fans 210 and heat exchanger coils 205 are activated.

Example FIG. 12A-ii shows a top view of a non-limiting example embodiment of remote heat exchanger unit 200 in which heat exchanger coils 205A, 205B, and 205C are disposed in a triangular configuration. Each of heat exchanger coils 205A, 205B, and 205C is separated from the others by partition walls to separate corresponding airflow streams produced by corresponding fans 210A, 210B, and 210C, as air is drawn into remote heat exchanger unit 200 via bottom air intake 202. The embodiment of remote heat exchanger unit 200 may be configured to have a two-side airflow discharge, by closing outlet 212A corresponding to heat exchanger coil 205A and deactivating heat exchanger coil 205A and fan 210A so that there is no working fluid flow thereto.

In accordance with an alternative non-limiting embodiment, a single side air discharge may be implemented by turning off two of fans 210 and deactivating corresponding heat exchanger coils 205.

In the non-limiting example embodiments of Examples FIGS. 13A-i and 13-ii, each heat exchanger coil 205 has a corresponding drain pan, heating system, and liquid line solenoid valve. Further, air that is blown over the respective heat exchanger coils 205 is drawn in from bottom air intake 202A.

FIG. 13B shows an example environment for the remote heat exchanger unit of FIG. 13A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 13B shows one embodiment of remote heat exchanger unit 200 in climate controlled zone 20B, with separable air duct system 215 configured as in Examples FIGS. 13A-i and 13A-ii. Example 13A-iii shows one embodiment of remote heat exchanger unit 200 in climate controlled zone 20B, with separable air duct system 215 configured to implement a three-side airflow discharge and one embodiment of remote heat exchanger unit 200 in climate controlled zone 20C, with separable air duct system configured to implement a one-side air discharge.

FIG. 14A shows a schematic diagram of an architecture of a remote heat exchanger unit with configurable air discharge, in accordance with at least one example embodiment described and recited herein.

Example FIG. 14A-i shows a top view of a non-limiting example embodiment of remote heat exchanger unit 200 in which heat exchanger coils 205A-D are disposed in a square or rectangular configuration. The embodiment of remote heat exchanger unit 200 may be configured to have a one-side airflow discharge, with each of heat exchanger coils 205 disposed adjacent to a corresponding outlet 212, with three of openings 212 being closed by blocking airflow to heat exchanger coils 205B-D using a partition.

Example FIG. 14A-ii shows a top view of a non-limiting example embodiment of remote heat exchanger unit 200 in which heat exchanger coils 205A-D are disposed in a square or rectangular configuration. The embodiment of remote heat exchanger unit 200 may be configured to have a four-side airflow discharge, with each of heat exchanger coils 205 disposed adjacent to a corresponding outlet 212, with none of outlets 212 being closed.

Example FIG. 14A-iii shows a top view of a non-limiting example embodiment of remote heat exchanger unit 200 in which heat exchanger coils 205A-D are disposed in a square or rectangular configuration. The embodiment of remote heat exchanger unit 200 may be configured to have a two-side airflow discharge, with each of heat exchanger coils 205 disposed adjacent to a corresponding outlet 212, with 212B and D being closed.

In the non-limiting example embodiments of Examples FIG. 14A-i through 14A-iii, each heat exchanger coil 205 has a corresponding drain pan, heating system, and liquid line solenoid valve. Further, air that is blown over the respective heat exchanger coils 205 by fan 210 is drawn in from bottom air intake 202A.

FIG. 14B shows an example environment for the remote heat exchanger unit of FIG. 14A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 14B shows one embodiment of remote heat exchanger unit 200 in climate controlled zone 20B, with separable air duct system 215 configured as in Example FIG. 14A-i and with separable air duct system 215 configured to implement a two-side airflow discharge for remote heat exchanger unit 200 in climate controlled zone 20C.

FIG. 15A shows a schematic diagram of an architecture of a remote heat exchanger unit with configurable air discharge, in accordance with at least one example embodiment described and recited herein.

Example FIG. 15A-i shows a top view of a non-limiting example embodiment of remote heat exchanger unit 200 in which heat exchanger coils 205A-205D are disposed in a square or rectangular configuration. Each of heat exchanger coils 205A-205D is separated from the others by partition walls to separate corresponding airflow streams produced by corresponding fans 210A-210D, as air is drawn into remote heat exchanger unit 200 via bottom air intake 202. The embodiment of remote heat exchanger unit 200 may be configured to have a one-side airflow discharge, with each of heat exchanger coils 205 disposed adjacent to a corresponding outlet 212, with three of openings 212 being closed.

Example FIG. 15A-ii shows a top view of a non-limiting example embodiment of remote heat exchanger unit 200 in which heat exchanger coils 205A-D are disposed in a square or rectangular configuration. Each of heat exchanger coils 205A-205D is separated from the others by partition walls to separate corresponding airflow streams produced by corresponding fans 210A-210D, as air is drawn into remote heat exchanger unit 200 via bottom air intake 202. The embodiment of remote heat exchanger unit 200 may be configured to have a four-side airflow discharge, with each of heat exchanger coils 205 disposed adjacent to a corresponding outlet 212, with none of outlets 212 being closed.

Example FIG. 15A-iii shows a top view of a non-limiting example embodiment of remote heat exchanger unit 200 in which heat exchanger coils 205A-D are disposed in a square or rectangular configuration. Each of heat exchanger coils 205A-205D is separated from the others by partition walls to separate corresponding airflow streams produced by corresponding fans 210A-210D, as air is drawn into remote heat exchanger unit 200 via bottom air intake 202. The embodiment of remote heat exchanger unit 200 may be configured to have a two-side airflow discharge, with each of heat exchanger coils 205 disposed adjacent to a corresponding outlet 212, with two of outlets 212 being closed.

In the non-limiting example embodiments of Examples FIG. 15A-i through FIG. 15-iii, each heat exchanger coil 205 has a corresponding drain pan, heating system, and liquid line solenoid valve. Further, air that is blown over the respective heat exchanger coils 205 by fan 210 is drawn in from bottom air intake 202A.

FIG. 15B shows an example environment for the remote heat exchanger unit of FIG. 15A, in accordance with at least some of the embodiments described and recited herein.

Within transport unit 20 (see FIG. 1) is a climate controlled space that includes climate controlled zones 20A, 20B, and 20C, configured by walls, barriers, or bulkheads 25A and 25B.

Example FIG. 15B shows one embodiment of remote heat exchanger unit 200 in climate controlled zone 20B, with separable air duct system 215 configured as in Example FIG. 15A-i and with separable air duct system 215 configured to implement a two-side airflow discharge for remote heat exchanger unit 200 in climate controlled zone 20C.

As indicated prior, in accordance with all of the example embodiments described and recited herein, alternatives thereto may include one or more bi-directional fans 210X that discharge an airflow in one direction or an opposite direction, e.g., from left to right or from right to left. In some embodiments, each of the one or more bi-directional fans 210X may be an axial fan that is capable of rotating in either a clockwise direction or a counter-clockwise direction. In various embodiments, each of the one or more bi-directional fans 210X may be an axial fan, a blower, an impeller fan, etc.

Therefore, the alternative embodiments of FIGS. 16A and 16B include bi-directional fan 210X, which may have symmetrical fan blades to thereby effectively control the direction of airflow influenced by bi-directional fan 210X, dependent upon, e.g., a rotational direction of the fan blades. The design of bi-directional fans 210X renders possible a single-discharge implementation, as in FIGS. 16A and 16B, in which airflow through both of the heat exchangers 205XA, 205XB flow in the same direction. The design of bi-directional fans 210X also renders possible a dual-discharge implementation (FIGS. 17A and 17B), in which airflow through both of the heat exchangers 205XA, 205XB flow in the opposite directions. Further, unlike other embodiments described and/or recited herein, no dampers are needed and discharge may be interchanged. The embodiments illustrated in FIGS. 16A, 16B, 17A, and 17B and otherwise described and/or recited herein are not limited to two embodiments of bi-directional fans 210X. Rather, the embodiments are numerous, e.g., implemented by bi-directional fans 210X in the order of multiples of two or three.

FIG. 16A shows a schematic diagram illustrating a single directional discharge of air, e.g., right to left, from a remote heat exchanger unit. A portion of return air 1605 passes over heat exchanger coil 205XA and is drawn through bi-directional fan 210XA to be discharged as air 1610A having undergone a heat exchange with the heat exchanger coil 205XA; and another portion of return air 1605 is drawn through bi-directional fan 210XB and passes over heat exchanger coils 205XB, to be discharged as air 1610B, having undergone a heat exchange with heat exchanger coils 205XA.

FIG. 16B shows a schematic diagram illustrating a single directional discharge of air, e.g., left to right, from a remote heat exchanger unit. A portion of return air 1605 is drawn through bi-directional fan 210XA and passes over heat exchanger coils 205XA, to be discharged as air 1610A, having undergone a heat exchange with heat exchanger coils 205XA; and another portion of return air 1605 passes over heat exchanger coils 205XB and is drawn through bi-directional fan 210XB to be discharged as air 1610B, having undergone a heat exchange with heat exchanger coils 205XB.

For the example embodiments of FIGS. 16A and 16B, implementing a single directional discharge of air, the symmetrical fan blades of bi-directional fans 210XA and 210XB rotate in a common direction, according to the intended direction of discharge.

As indicated prior, in accordance with all of the example embodiments described and recited herein, alternatives thereto may include one or more bi-directional fans 210X that discharge an airflow that undergo a heat exchange by one or more heat exchanger coils that are disposed beneath fans 210X, e.g., from beneath, and/or one or more bi-directional fans 210X that discharge an air flow that undergoes a heat exchange by multiple heat exchangers that may be disposed beneath or alongside the respective fans. In such embodiments, each of the one or more bi-directional fans 210X may be an axial fan that is capable of rotating in either a clockwise direction or a counter-clockwise direction. In various embodiments, each of the one or more bi-directional fans 210X may be an axial fan, a blower, an impeller fan, etc.

FIG. 17A shows a schematic diagram illustrating a dual directional discharge of air from a remote heat exchanger unit. A portion of warm return air 1705A passes from right to left over coil 205XA and is drawn through bi-directional fan 210XA to be discharged to the left as cold air 1710A; and another portion of warm return air 1705B is drawn from left to right over coil 205XB and is drawn through bi-directional fan 210XB to be discharged to the right as cold air 1710B.

FIG. 17B shows a schematic diagram illustrating a dual directional discharge of air from a remote heat exchanger unit. A portion of warm return air 1705A passes from left to right over coil 205XA and is drawn through bi-directional fan 210XA to be discharged to the right as cold air 1710A; and another portion of warm return air 1705B is drawn from right to left over coil 205XB and is drawn through bi-directional fan 210XB to be discharged to the left as cold air 1710B.

For the example embodiments of FIGS. 17A and 17B, implementing a dual directional discharge of air, the symmetrical fan blades of bi-directional fans 210XA and 210XB rotate in opposite directions, according to the respective intended directions of discharge.

FIG. 18A shows a side view of a schematic diagram of a draw-through coil design of a remote heat exchanger unit 1800 to control direction of airflow. As air 1805 passes over coil 205YA, fan 210YA may draw air 1805 therethrough to be discharged as air 1810A. Also, fan 210YB may be turned off and/or intentionally blocked, e.g., by an optional baffle or damper, to provide a single directional discharge of air. It will be appreciated that in other embodiments, fan 210YB may draw air 1805 therethrough to be discharged as air 1810B. Also, fan 210YA may be turned off and/or intentionally blocked, e.g., by an optional baffle or damper, to provide a single directional discharge of air. It will be appreciated that in some embodiments, both fans 210YA and 210YB may draw air 1805 therethrough to be discharged as air 1810A 1810B, respectively, to provide dual-directional discharge of air.

Also, when the remote heat exchanger unit 1800 includes optional baffles or dampers to block airflow exiting therethrough, the optional baffles or dampers can be fully opened, fully closed, or partially opened based on the requirements for the specific application. Similarly, one or both of fans 210YA and 210YB may be turned on at a reduced speed, thus resulting in a greater discharge of air drawn by the fan that operates at the higher speed and a lesser discharge of air drawn by the fan that operates at the lower speed. If both of fans 210YA and 210YB are turned on at the reduced speed, the discharge of air drawn by the respective fans is likely to be substantially similar.

FIG. 18B shows a top view of a schematic diagram of a draw-through coil design for the remote heat exchanger unit 1800 that allows for either a single-directional or dual-directional discharge of air, in accordance with at least the example embodiment of FIG. 18A. As air 1805 passes over coils 205YA and 205YB, fans 210YA and 210YB may draw air 1805 from both coils therethrough to be discharged as air 1810A and 1810B in both the left and right directions, respectively. As discussed above, either of the fans 210YA, 210YB may be turned off and/or intentionally blocked, e.g., by an optional baffle or damper. It will be appreciated that in some embodiments each of the fans 210YA, 210YB can be an axial fan, a blower, an impeller fan, etc.

FIG. 19A shows a side view of a schematic diagram of a draw-through coil design of a remote heat exchanger unit 1900 to control direction of airflow. As air 1905 through coil 205YA, fans 210YA and 210YB, which are stacked on top of coil 205YA, may draw air 1905 therethrough to be discharged as air 1910A and 1910B, in both the left and right directions. Therefore FIG. 19A illustrates a dual directional discharge of air. As discussed above, it will be appreciated that in some embodiments each of the one or more bi-directional fans 210X may be an axial fan, a blower, an impeller fan, etc.

Also, similar to the embodiments of FIGS. 18A and 18B, remote heat exchanger unit 1900 may optionally include baffles or dampers to block airflow exiting therethrough, and the optional baffles or dampers may be fully opened, fully closed, or partially opened based on the requirements for the specific application. Similarly, one or both of fans 210YA and 210YB may be turned on at a reduced speed, thus resulting in a greater discharge of air drawn by the fan that operates at the higher speed and a lesser discharge of air drawn by the fan that operates at the lower speed. If both of fans 210YA and 210YB are turned on at the reduced speed, the discharge of air drawn by the respective fans is likely to be substantially similar.

FIG. 19B shows a top view of the dual-directional discharge of air in accordance with the example embodiment of FIG. 19A.

Further described and recited herein are systems, apparatuses, programs and methods for controlling airflow volume and/or direction thereof from one or more of the remote evaporators described and/or recited herein.

This control may be executed by first sensing or determining bulkhead location, sensing or determining distribution of cargo, and/or sensing or determining temperature distribution utilizing one or more sensors or feedback devices. An actuator that may be connected to a remote evaporator or corresponding damper, described and/or recited herein, then implements automated control of volume and direction based on information received from the aforementioned sensor or feedback device. Thus, a corresponding process may include, at a high level, (a) sensing, (b) actuation, and (c) direction and volume control.

Embodiments for controlling airflow volume and/or direction obviate manual configuration of the configurable remote heat exchangers or corresponding dampers are described and recited herein. As a result, a customer may be relieved of the organizational burden to remember to manually reconfigure the airflow as well as the physical burden to do so. Further still, the customer would be relieved of the need to train operators to do so, since airflow management would be automated.

Further still, the embodiments described herein for controlling airflow volume and/or direction may be regarded as an advancement in temperature management of a climate controlled space or one or more zones of a climate controlled space. For example, upon sensing or detecting a need to drop temperatures within a given climate controlled space to, for example, preserve cargo, the temperature may be pulled down more quickly as managed by the embodiments described and recited herein.

FIG. 20 shows a diagram of a remote evaporator automation system 2000, in accordance with at least one example embodiment described and recited herein. As depicted, a non-limiting example embodiment of remote evaporator automation system 2000 may include at least a sensor 2005, a controller 2010, and an actuator 2015.

Sensor 2005 may refer to one or multiple sensors that may be affixed to or otherwise disposed on/within a remote evaporator, previously described and recited herein, or to one or more portions of a climate controlled space of a transport unit. Non-limiting examples of sensor 2005 may include, but not be limited to, proximity sensor 2005A (contact-type or non-contact-type), thermal sensor 2005B, or 3-D space mapping sensor 2005C. 3-D space mapping sensor 2005C may sense or determine spatial volume and placement of cargo relative to the remote evaporator to which sensor 2005C is embedded or attached. Further, sensor 2005 may be a resistive, inductive, or encoder type.

Position or proximity sensors 2005A are described as follows.

As referenced herein, a position sensor may be regarded as a potentiometer that has a wiper contact linked to a mechanical shaft that can be either angular (rotational) or linear (slider-type) in its movement. The wiper contact may cause a resistance value between the wiper/slider and two end connections to change, resulting in an electrical signal output that has a proportional relationship between the actual wiper position on the resistive track and its resistance value. That is, resistance is proportional to position.

As referenced herein, an inductive position sensor may be regarded as a linear variable differential transformer. Such a sensor in an inductive-type position sensor to measure movement. A moveable soft iron ferromagnetic core, i.e., armature, may be connected to an object being measured, and may slide or move up and down within a tubular body of the linear variable differential transformer.

As referenced herein, rotary encoders are another type of position sensor that resemble potentiometers but are non-contact optical devices that convert an angular position of a rotating shaft into analog or digital data code, i.e., convert mechanical movement into an electrical signal. Light from an LED or infra-red light source may pass through a rotating high-resolution encoded disk that has required code patterns that may be binary, grey code, or BCD. Photodetectors may scan the disk as it rotates, and an electronic circuit processes information into digital form as a stream of binary output pulses that are fed to counters or controllers that determine an actual angular position of the shaft. Rotary optical encoders may be categorized as incremental encoders or absolute position encoders.

A tachometer is a simple incremental encoder that has one square wave output and is often used in unidirectional applications for which basic position or speed information is required. A quadrature encoder or sine wave encoder are common forms thereof, and have two output square waves commonly called Channel A and Channel B. Such devices use two photodetectors that are slightly offset from each other by 90° to thereby produce two separate sine and cosine output signals.

Absolute position encoders provide a unique output code for every single position of rotation, indicating both position and direction. A corresponding coded disc includes multiple concentric tracks of light and dark segments. Each track is independent from the others, having its own photodetector to simultaneously read a unique coded position value for each angle of movement. A number of tracks on a disk corresponding to a binary bit resolution of the encoded, so that, for example, a 12-bit absolute encoder would have 12 tracks, and the same coded value appears once per revolution.

As referenced herein, an inductive proximity sensor may include an oscillator to produce an electromagnetic field, a coil to generate the magnetic field, a detection circuit to detect change in the magnetic field when an object enters therein, and an output circuit to produce an output signal, either with normally closed or normally open contacts.

As referenced herein, a light sensor generates an output signal to indicate an intensity of light by measuring radiant energy that exists in a narrow range of frequencies, i.e., light, and that ranges in frequency from infrared to visible to ultraviolet. A light sensor is, therefore, a passive device that converts the light energy, whether visible or in the infrared portion of the spectrum, into an electrical signal output. Light sensors are more commonly referred to as photoelectric devices or photo sensors, as they convert light energy, i.e., photons, into electricity, i.e., electrons.

As referenced herein, a non-contact-type linear distance sensor may be installed in or attached to various embodiments of remote heat exchanger 200 or on a side or top wall or floor of transport unit 20 within the climate controlled space so that the linear distance sensor is able to measure a distance to a corresponding bulkhead 25. The measured distance may be transmitted from the sensor 2005A to controller 2010 to control airflow volume and/or direction from the remote heat exchanger 200. Other types of distance sensors include ultrasonic, infrared, laser, etc.

An ultrasonic distance sensor detects a distance to objects by utilizing high-frequency sound waves emitted therefrom. That is, an ultrasonic sensor emits high-frequency sound waves towards a target object, with a time of the emission marked; the sound waves are reflected from the target object back towards the ultrasonic sensor; a receiver corresponding to the ultrasonic sensor receives the sound waves from the target object, with a time of the receipt marked; and the amount of time taken between the emission and receipt is divided by the speed of sound to determine the distance from the ultrasonic sensor and the target object.

An infrared distance sensor detects a distance to objects by exploiting the principle of triangulation, i.e., measuring distance based on an angle of a reflected beam of light. Thus, when infrared light is emitted from an infrared LED emitter corresponding to the sensor towards a target object, the infrared beam of light hits object P1 and is reflected therefrom at a certain angle; the reflected light is received back at the infrared sensor, which then determines the position and/or distance of the target object using the principle of triangulation.

A laser distance sensor detects a distance to objects by utilizing light waves emitted from a laser. Thus, when a laser is emitted from a transmitter corresponding to the laser sensor towards a target object, with a time of emission marked; a pulse of the laser is reflected back from the target object; and the reflected pulse is received back at the laser sensor, with the time of receipt marked, which then determines the position and/or distance of the target object based on a relationship between constant speed of light in air and the time measured between the emission of the laser and the receipt of the reflected pulse.

Unless context requires otherwise, the descriptions of the example environments for a remote evaporator automation system that follow may include reference to a "sensor 2005" without unduly limiting the embodiment to one of a proximity sensor, thermal sensor, or 3-D space mapping sensor.

In some embodiments, the transport unit may have a roll-up door or swinging rear and/or side door. Door type and placement are factors to be considered in the number of zones of the climate controlled space and, therefore, quantity and location for installation of both a remote evaporator and one or more of sensors 2005.

Controller 2010 may refer to one or more processing units that are embedded within the remote evaporator. In accordance with at least one non-limiting embodiment, controller 2010 may be a local processing unit or, alternatively, may be a client device that is communicatively coupled to a host unit that is attached to the remote evaporator. Alternative embodiments may contemplate the host unit being remotely located, external to the transport unit.

Regardless, controller 2010 may receive signals from one or more of sensor 2005 or a host thereof, and then control the volume and/or direction of airflow from the remote evaporator as warranted based on the received signals. The signals may indicate, e.g., a temperature that is insufficient for the cargo proximate to the remote evaporator; and the controlled remote evaporator may be most proximately located to sensor 2005 from which the signals are received.

Actuator 2015 may refer to an electrically activated actuator to, e.g., control a volume of air and/or direction of air flowing from one or more ducts of a remote evaporator by controlling one or more corresponding dampers, in accordance with the embodiments of remote evaporators described and recited herein. The actuation may be executed upon receipt of instruction therefore from controller 2010.

FIG. 21A shows an example environment for a remote evaporator automation system, in accordance with at least one example embodiment described and recited herein.

Within transport unit 20 (see FIG. 1) is a climate controlled space that includes climate controlled zones 20A, 20B, and 20C, configured by walls, barriers, or bulkheads 25A and 25B.

FIG. 21B shows an example bulkhead configuration in accordance with the example environment for the remote evaporator automation system of FIG. 21A.

The non-limiting example embodiment of FIGS. 21A and 21B show an arrangement of proximity sensor 2005A, by which a probe end of proximity sensor 2005A is permanently affixed or temporarily affixed, e.g., magnetically, to bulkhead 25A or 25B, and another end of sensor 2005A is attached, permanently or temporarily, to a side or top of an interior of a zone 20, e.g., 20B or 20C, for example, in insulated slot 251. In accordance with at least one example embodiment, the probe end of sensor 2005 may be installed in the assembly of remote heat exchanger 200 itself.

As bulkhead 25B moves away or towards remote heat exchanger 200C, the extendable portion of sensor 2005A also moves along with, and sensor 2005A transmits a signal to controller 2010 indicating such movement. For example, depending on a location of bulkhead 25B, sensor 2005A may provide pre-calibrated output data; and a volume of discharged airflow and/or direction thereof may be remotely and automatically controlled, depending on the relative location of bulkhead 25B within the climate controlled space.

In the non-limiting example of FIGS. 21A and 21B, as sensor 2005A determines that bulkhead 25B is disposed closely proximate remote heat exchanger 200C, thus reducing space there between, sensor 2005A may transmit data to controller 2010 that results in dampers in remote heat exchanger 200C directing airflow therefrom away from bulkhead 25B.

FIG. 22A shows another example environment for a remote evaporator automation system, in accordance with at least one example embodiment described and recited herein.

FIG. 22B shows an example bulkhead configuration in accordance with the example environment for the remote evaporator automation system of FIG. 22A.

In the non-limiting example embodiments of FIGS. 22A and 22B, as bulkhead 25B is disposed further from remote heat exchanger 200C, thus increasing space there between, sensor 2005A may transmit data to controller 2010 that results in dampers in remote heat exchanger 200C directing airflow to both lateral directions of zone 20C within the climate controlled space of transport unit 20.

FIG. 23A shows another example environment for a remote evaporator automation system, in accordance with at least one example embodiment described and recited herein.

FIG. 23B shows an example bulkhead configuration in accordance with the example environment for the remote evaporator automation system of FIG. 23A.

The non-limiting example embodiments of FIGS. 23A and 23B show an arrangement of proximity sensor 2005A, by which a probe end of proximity sensor 2005A is permanently or temporarily affixed to at least bulkhead 25B; and another end of sensor 2005A is attached, permanently or temporarily, to a top of an interior of a zone 20, e.g., 20B or 20C.

In the example of FIG. 23B, an extendable portion of encoder-type sensor 2005A in zone 20C is a flexible wire 2305 connected in close proximity to bulkhead 25B. Thus, when bulkhead 25B moves, the flexible wire 2305 winds or unwinds using a recoiling spring. A rewinding mechanism may be incorporated into a respective bulkhead, e.g., bulkhead 25B or the remote evaporator 200C; and the flexible wire 2305 is attached to the bulkhead.

In the non-limiting example of FIGS. 23A and 23B, as sensor 2005A determines that bulkhead 25B is disposed closely proximate remote heat exchanger 200C, thus reducing space there between, sensor 2005A may transmit data to controller 2010 that results in dampers in remote heat exchanger 200C directing airflow therefrom away from bulkhead 25B.

FIG. 24A shows another example environment for a remote evaporator automation system, in accordance with at least one example embodiment described and recited herein.

FIG. 24B shows an example bulkhead configuration in accordance with the example environment for the remote evaporator automation system of FIG. 24A.

The non-limiting example embodiments of FIGS. 24A AND 24B show an arrangement of proximity sensor 2005A, by which a probe end of proximity sensor 2005A is permanently or temporarily affixed to at least bulkhead 25B; and another end of sensor 2005A is attached, permanently or temporarily, to a top of an interior of a zone 20, e.g., 20B or 20C.

In the example of FIG. 24B, an extendable portion of encoder-type sensor 2005A in zone 20C is a flexible wire 2305 extended in relative proximity to bulkhead 25B. Thus, when bulkhead 25B moves, the flexible wire 2305 winds or unwinds using a recoiling spring. A rewinding mechanism may be incorporated into a respective bulkhead, e.g., bulkhead 25B or the remote evaporator 200C; and the flexible wire 2305 is attached to the bulkhead.

In the non-limiting example embodiments of FIGS. 24A and 24B, bulkhead 25B is disposed further from remote heat exchanger 200C, thus increasing space there between, sensor 2005A may transmit data to controller 2010 that results in dampers in remote heat exchanger 200C directing airflow to both lateral directions of zone 20C within the climate controlled space of transport unit 20.

FIG. 25A shows another example environment for a remote evaporator automation system, in accordance with at least one example embodiment described and recited herein.

FIG. 25B shows an example bulkhead configuration in accordance with the example environment for the remote evaporator automation system of FIG. 25A.

The non-limiting example embodiments of FIGS. 25A and 25B show an arrangement of proximity sensor 2005A, by a non-contact sensor, e.g., a magnet or reflector or other sensitive material, is fixed in at least bulkhead 25B. A sensor reader may be installed in insulated slot 251. As bulkhead 25B moves, a sensor probe embedded in the bulkhead may send a signal to the corresponding sensor reader installed in the insulated slot 251. For a light sensor, a reflector 254 may be installed in bulkhead 25B, and as bulkhead 25B moves, the reflector reflects light back to a light receiver sensor installed thereat. For an induction-based system, a magnet may be installed in bulkhead 25B, and induction sensors may be installed in slot 251.

In the non-limiting example of FIGS. 25A and 25B, as sensor 2005A determines that bulkhead 25B is disposed closely proximate remote heat exchanger 200C, thus reducing space there between, sensor 2005A may transmit data to controller 2010 that results in dampers in remote heat exchanger 200C directing airflow therefrom away from bulkhead 25B.

FIG. 26A shows another example environment for a remote evaporator automation system, in accordance with at least one example embodiment described and recited herein.

FIG. 26B shows an example bulkhead configuration in accordance with the example environment for the remote evaporator automation system of FIG. 26A.

The non-limiting example embodiments of FIGS. 26A AND 26B show an arrangement of proximity sensor 2005A, by which a probe end of proximity sensor 2005A is permanently or temporarily affixed to at least bulkhead 25B; and another end of sensor 2005A is attached, permanently or temporarily, to a top of an interior of a zone 20, e.g., 20B or 20C.

In the example of FIG. 26B, an extendable portion of encoder-type sensor 2005A in zone 20C is a flexible wire 2305 extended in relative proximity to bulkhead 25B. Thus, when bulkhead 25B moves, the flexible wire 2305 winds or unwinds using a recoiling spring. A rewinding mechanism may be incorporated into a respective bulkhead, e.g., bulkhead 25B or the remote evaporator 200C; and the flexible wire 2305 is attached to the bulkhead.

In the non-limiting example embodiments of FIGS. 26A and 26B, bulkhead 25B is disposed further from remote heat exchanger 200C, thus increasing space there between, sensor 2005A may transmit data to controller 2010 that results in dampers in remote heat exchanger 200C directing airflow to both lateral directions of zone 20C within the climate controlled space of transport unit 20.

Thermal sensors 2005B are described in the context of the non-limiting example embodiments of FIGS. 27 and 28, as follows.

FIG. 27 shows an overhead perspective of an example of thermal imaging in an example environment for a remote evaporator automation system, as described and recited herein.

FIG. 28 shows a side-view perspective of an example of thermal imaging in that example environment of FIG. 27 for a remote evaporator automation system, as described and recited herein.

For all embodiments described and recited herein, remote heat exchanger 200B may be utilized to absorb heat load from surrounding ambient and also to absorb internal heat load, depending on the type of cargo. Further, the surface temperature for the floor, side walls and ceiling of transport unit 20 are typically uniform, though any deviations are likely caused by ambient temperatures.

As referenced herein, thermal image camera or infrared (IR) sensor, both referenced as 2005B, may be installed at a predefined or calibrated location within the climate-controlled space of the transport unit 20 based on space arrangements within zone 10B. The thermal image camera or IR sensor 2005B may then scan data that is read at fixed time intervals, in manners previously described and/or recited herein, and three-dimensional (3-D) surface temperatures may computed based on that data. Because a position of the thermal image camera or IR sensor array and the position of remote heat exchanger 200B are fixed, zone temperature mapping may be implemented using a position of remote heat exchanger 200B as a reference point.

In some embodiments, a surface temperature of remote heat exchanger 200B may be lower than that of a bulkhead 25A or side and/or top wall of zone 20B; and floor space within zone 20B may be differentiated by partial-uniform temperature gradients. Similarly, temperature data may be differentiated near door 2700 of transport unit 20 and wherever heat is detected to enter transport unit 20 from ambient. Therefore, depending on cargo type, cargo temperature may be distinguished. Thus, because the position of remote heat exchanger 200B is fixed within zone 20B, a surface temperature of any object within zone 20B may be determined, and corresponding temperature data sent from a thermal sensor 2005B to controller 2010 may be utilized to control an airflow volume and/or direction from remote heat exchanger 200B.

As described and recited herein, thermal image camera/IR sensor 2005B enables differentiation between respective surface temperatures for the walls and floor within the climate-controlled space of the transport unit 20 and also cargo surfaces therein. Accordingly, differences in temperature between cargo and a wall or the floor may be determined and/or visualized; and also differences in temperature between return air and cargo surfaces and/or floor or wall surfaces.

3-D space mapping sensors 2005C are described in the context of the non-limiting example embodiment of FIG. 29, as follows.

FIG. 29 shows an example of digital imaging in accordance with an example environment for a remote evaporator automation system, as described and recited herein.

FIG. 30 shows an example processing flow for digital imaging processing in accordance with at least the embodiment of FIG. 29 for a remote evaporator automation system, as described and recited herein.

As depicted, processing flow 3000 includes sub-processes executed by various components of at least one digital camera 2900 and controller 2010. However, processing flow 3000 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of 3005, 3010, 3015, 3020, 3025, 3030, and 3035. These various operations, functions, or actions may, for example, correspond to software, program code, or program instructions executable by a processor that causes the functions to be performed. Processing may begin at 3005, referring to the non-limiting example embodiments of digital camera 2900B affixed to a ceiling in zone 20B and digital camera 2900C affixed to a ceiling in zone 20C. The respective digital cameras may be utilized to estimate a difference in volume in the respective zones that may be due to cargo volume changing as cargo is loaded or unloaded therefrom. In accordance with at least some embodiments, a cargo level within each of zones 20A, 20B, and 20C may be measured, as well as the perimeter therefore, in metric or imperial parameters, as a baseline. The cargo level and sectional area for each zone may also be measured in pixels.

At 3005, one or both of digital camera 2900B and digital camera 2900C may capture a digital image of the interior of the respective climate controlled space. The processing flow may proceed to 3010.

Controller 2010 may receive the image from the respective camera 2900 and apply a correlation metric to infer measurements or parameters of cargo within a respective zone 20A, 20B, or 20C of the climate controlled space. Using the inferred measurements or parameters, controller 2010 may estimate a volume difference between actual cargo and available space, as well as location of such empty space, to thereby control airflow volume and direction from a respective one of remote heat exchangers 200.

As part of the estimation process, the controller is to (3010) fetch respective image frames or pixels from the received image; (3015) apply a chrominance filter to the respective frames or pixels; (3020) process the image file in segments so that a temperature of a target area may be determined by processing the segmented portions of the image, using known technologies; (3025) compare the processed image files with stored images of the respective climate controlled space in various states of packing cargo into transport unit 20; and (3030) estimate the current state of cargo distribution within the respective climate controlled space. Accordingly, (3035) controller 2010 is able to control an airflow volume and/or direction from remote heat exchanger 200 to an area or zone of the climate controlled space that has a temperature above a predetermined threshold.

FIG. 31 shows an example processing flow for sonar-based 3D space scanning in accordance with at least some of the embodiments of a remote evaporator automation system, as described and recited herein. Sonar-based 3-D space scanning are described in the context of the non-limiting example data flow of FIG. 31, as follows.

An ultrasonic sensor or transducer 3100 may be disposed in any one of zones 20A, 20B, and/or 20C within the climate controlled space of transport unit 20, in much a same way as cameras 2900. An ultrasonic sensor 3105 may emit an acoustic wave signal, i.e., ultrasonic wave, traveling at a frequency above 18 kHz, when instructed by a trigger signal from controller 2010. When triggered, the ultrasonic sensor generates multiple, e.g., eight acoustic (ultrasonic) wave bursts and initiates a time counter. When a reflected, i.e., echo, signal is received back by a receiver in the sensor, the timer stops. The output of the ultrasonic sensor is a high pulse with the same duration as the time difference between transmitted ultrasonic bursts and the received echo signal. A servomotor 3110 is a closed-loop servomechanism that uses position feedback to control its motion and final position. The input to controller 2010 is a signal (either analogue or digital) representing the position commanded for the output shaft. The motor is paired with a position encoder to provide position and speed feedback.

In an example scenario, only the position is measured. The measured position of the output is compared to the command position, the external input to controller 2010. If the output position differs from that required, an error signal is generated which then causes the motor to rotate in either direction, as needed to bring the output shaft to the appropriate position. As the positions approach, the error signal reduces to zero and the motor stops.

FIGS. 32A and 32B combine to shows an example processing flow for processing sensor data in accordance with various embodiments of a remote evaporator automation system, as described and recited herein.

As depicted, processing flow 3200 includes sub-processes executed by various components of at least one of the sensors described and/or recited herein, as well as controller 2010. However, processing flow 3000 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 300 may include various operations, functions, or actions as illustrated by one or more of 3205-3300. These various operations, functions, or actions may, for example, correspond to software, program code, or program instructions executable by a processor that causes the functions to be performed.

In processing flow 3200, sensor data may be acquired, e.g., at fixed intervals of time or when a door opens. After sensor data is acquired, depending on a type of sensor installed in a respective zone, a control algorithm may be initiated to control airflow from a corresponding remote heat exchanger 200. If the sensor data indicates that a distance from a bulkhead to a corresponding remote heat exchanger 200 exceeds a predetermined threshold value, then controller 2010 may vary airflow (e.g., increase airflow speed by opening or closing damper(s), increasing a fan speed, etc.) depending on the sensed cargo load or temperature within the corresponding zone. If the sensor data indicates that one side of a remote heat exchanger 200 is within the predetermined threshold distance to a corresponding bulkhead, controller 2010 may direct airflow in a direction opposite that of the bulkhead, with the volume of airflow (CFM) depending on the sensed cargo load or temperature within the corresponding zone. Processing may begin at 3205.

At 3205, controller 2010 receives, from a sensor, in accordance with the various embodiments described and/or recited herein, data corresponding to one or more of zones 20A, 20B, or 20C of the climate controlled space. The received data may include a position of a bulkhead relative to a corresponding remote heat exchanger unit 200 and also, in some instances, data pertaining to spacing within the corresponding zone of the climate controlled space. Processing may proceed to 3210.

At 3210, controller 2010 processes the received sensor data, depending on whether (i) the received sensor data includes the position of the bulkhead relative to the remote heat exchanger unit 200 or (ii) if the received sensor data includes the position of the bulkhead relative to the remote heat exchanger unit 200 and data pertaining to a distance between cargo to a corresponding remote heat exchanger 200 within the corresponding zone of the climate controlled space. If (i), processing proceeds to 3215; if (ii), processing proceeds to 3250.

At 3215, controller 2010 determines whether the corresponding bulkhead is within a threshold distance of remote heat exchanger 200. If yes, processing proceeds to 3220; if no, processing proceeds to 3225.

At 3220, controller 2010 transmits instructions to remote heat exchanger 200 to shut down, or at least significantly reduce, air flow in a direction towards the bulkhead. Processing then returns to (B) 3205.

At 3225, controller 2010 determines whether the bulkhead is a threshold percentage distance relative to the remote heat exchanger 200. If yes, processing proceeds to 3230; if no, processing proceeds to 3235.

At 3230, controller 2010 adjusts airflow by the corresponding percentage in a direction towards the bulkhead. Processing returns to (B) 3205.

At 3235, controller 2010 determines whether the corresponding bulkhead exceeds the threshold distance from remote heat exchanger 200. If yes, processing proceeds to 3240; if no, processing returns to (B) 3205.

At 3240, controller 2010 directs a full volume of airflow in the direction towards the bulkhead.

(B) 3245 indicates a return to 3205 for the receipt of data from a corresponding sensor.

At 3250, controller 2010 determines whether the bulkhead is within a threshold distance to the remote heat exchanger 200. If yes, processing proceeds to 3257; if no, processing proceeds to 3255.

At 3258, controller 2010 reduces or even shuts down airflow in direction of the bulkhead.

(A) 3255 in FIG. 32A indicates a continuation of the processing flow to the operations shown in FIG. 32B. Processing proceeds to 3260.

At 3260, controller 2010 estimates the distribution of cargo within the respective zone of the climate controlled space and/or the distribution of temperature on lateral sides of the remote heat exchanger 200. Processing may proceed to 3265.

At 3265, controller 2010 determines, from the received sensor data, whether the corresponding zone of the climate controlled space includes no cargo or if the temperatures on lateral sides of the corresponding remote heat exchanger 200 differ, e.g., if the temperature is lower on one lateral side than the temperature on the other lateral side of the remote heat exchanger 200. If yes, processing proceeds to 3270. If no, processing proceeds to 3270.

At 3270, controller 2010 transmits instructions to remote heat exchanger 200 to shut down, or at least significantly reduce, air flow in a direction to which there is no cargo and/or in the lateral direction having the determined lower temperature. Processing may return to (B) 3245.

At 3275, controller 2010 may determine whether the left side of the remote heat exchanger 200 has more cargo and/or a higher temperature than the right side. If yes, processing may proceed to 3280; if no, processing may proceed to 3285.

At 3280, controller 2010 may transmit instructions to remote heat exchanger 200 to increase airflow volume towards the left side of the remote heat exchanger 200 and reduce airflow volume towards the right side. Processing may return to (B) 3245.

At 3285, controller 2010 may determine whether the right side of the remote heat exchanger 200 has more cargo and/or a higher temperature than the left side. If yes, processing may proceed to 3290; if no, processing may proceed to 3295.

At 3290, controller 2010 may transmit instructions to remote heat exchanger 200 to increase airflow volume towards the right side of the remote heat exchanger 200 and reduce airflow volume towards the left side. Processing may return to (B) 3245.

At 3295, controller 2010 may determine whether both the left side and the right side of the remote heat exchanger 200 has a substantially equal amount of cargo and/or a substantially equal temperature, i.e., within a threshold amount. If yes, processing may proceed to 3300; if no, processing may return to (B) 3245.

At 3300, controller 2010 may transmit instructions to remote heat exchanger 200 to make the airflow volume equal to the left and right side thereof.

FIG. 33A shows an example implementation of airflow in accordance with various embodiments of a remote evaporator automation system, as described and recited herein.

FIG. 33B shows another example implementation of airflow in accordance with various embodiments of a remote evaporator automation system, as described and recited herein.

The non-limiting example embodiments of FIGS. 33A and 33B depict delivery of airflow, i.e., exhaust from the various embodiments of remote heat exchanger 200 described and recited herein, via an electrical actuator that is connected to a damper mechanism. The airflow may be categorized as follows.

A fully closed one of damper 3305 or 3010 may result in unidirectional airflow from remote heat exchanger 200; whereas fully open dampers 3305 and 3310 may result in multi-directional airflow.

Airflow may be variable depending on cargo distribution within a respective zone of the climate controlled space, temperature therein, bulkhead positioning relative to the remote heat exchanger 200 in the zone. The opening or closing of either of damper 3305 and 3310, respectively, may be controlled to control airflow volume. Airflow may also be controlled based on cargo surface temperature distribution within a respective zone of the climate controlled space.

By continuously operating dampers, airflow from remote heat exchanger 200 may swing, which may improve airflow around the respective zone of the climate controlled space.

Angled airflow may be implemented by adjusting damper positioning.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

Aspects

It is to be appreciated that any of the following aspects may be combined:

Aspect 1. A method for controlling airflow volume and flow direction from a remote heat exchanger unit of a transport climate control system, the method comprising:
- a controller receiving data from a sensor within at least a portion of a climate controlled space, wherein the received data from the sensor is indicative of a position of a bulkhead within the climate controlled space relative to a position of the remote heat exchanger unit; and the controller determining an airflow volume and determining a flow direction from the remote heat exchanger unit based on the received data;
- the controller instructing the remote heat exchanger unit to provide the determined airflow volume and the determined flow direction within the climate controlled space; and
- the remote heat exchanger unit receiving instructions from the controller and adjusting operation to provide the determined airflow volume and the determined flow direction based on the instructions.

Aspect 2. The method of Aspect 1, wherein the controller determining the airflow volume and determining the flow direction from the remote heat exchanger unit based on the received data includes determining that the bulkhead is positioned in the climate controlled space within a threshold distance of the remote heat exchanger unit, and
wherein the remote heat exchanger unit receiving the instructions from the controller and adjusting operation to provide the determined airflow volume and the determined flow direction based on the instructions includes the remote heat exchanger unit closing airflow from the remote heat exchanger unit toward a direction of the bulkhead.

Aspect 3. The method of any one of Aspects 1 and 2, wherein the controller determining the airflow volume and determining the flow direction from the remote heat exchanger unit based on the received data includes determining that the bulkhead is positioned within a percentage distance of the remote heat exchanger unit, and
wherein the remote heat exchanger receiving the instructions from the controller and adjusting operation to provide the determined airflow volume and the determined flow direction based on the instructions includes the remote heat exchanger unit directing a percentage airflow from the remote heat exchanger unit in a direction towards the bulkhead, wherein the percentage airflow is proportional to the percentage distance determined by the controller.

Aspect 4. The method of any one of Aspects 1-3, wherein the controller determining the airflow volume and determining the flow direction from the remote heat exchanger unit based on the received data includes determining that the bulkhead is positioned in the climate controlled space such that the bulkhead exceeds a threshold distance from the remote heat exchanger unit, and
wherein the remote heat exchanger receiving the instructions from the controller and adjusting operation to provide the determined airflow volume and the determined flow direction based on the instructions includes the remote heat exchanger unit increasing an airflow speed from the remote heat exchanger unit in a direction towards the bulkhead.

Aspect 5. The method of any one of Aspects 1-4, wherein the received data from the sensor is also indicative of an environmental condition within the portion of the climate controlled space.

Aspect 6. The method of Aspect 5, wherein the controller determining the airflow volume and determining the flow direction from the remote heat exchanger unit based on the received data includes determining that the bulkhead is within a threshold distance of the remote heat exchanger unit, and
wherein the remote heat exchanger receiving the instructions from the controller and adjusting operation to provide the determined airflow volume and the determined flow direction based on the instructions includes the remote heat exchanger unit closing airflow from the remote heat exchanger unit in a direction toward the bulkhead.

Aspect 7. The method of Aspect 5, further comprising:
the controller estimating a volume of cargo distributed on one or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit closing airflow from the remote heat exchanger unit to a side of the remote heat exchanger unit in which the estimated volume of cargo is less than a threshold volume.

Aspect 8. The method of Aspect 5, further comprising:
the controller estimating a volume of cargo distributed on one or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit increasing airflow volume from the remote heat exchanger unit to a side of the remote heat exchanger unit in which the estimated volume of the cargo exceeds a threshold volume.

Aspect 9. The method of Aspect 5, further comprising:
the controller estimating a volume of cargo distributed on two or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit outputting an approximately equal airflow volume from the remote heat exchanger unit to at least two sides of the remote heat exchanger unit.

Aspect 10. The method of Aspect 9,
wherein the estimated volume of the cargo on at least two sides of the remote heat exchanger unit is less than a threshold volume, and wherein the remote heat exchanger unit receiving the instructions from the controller and adjusting operation to provide the determined airflow volume and the determined flow direction based on the instructions includes the remote heat exchanger unit outputting a reduced airflow volume.

Aspect 11. The method of Aspect 9,
wherein the estimated volume of the cargo on at least two sides of the remote heat exchanger unit exceeds a threshold volume, and
wherein the remote heat exchanger unit receiving the instructions from the controller and adjusting operation to provide the determined airflow volume and the determined flow direction based on the instructions includes the remote heat exchanger unit outputting an increased airflow volume.

Aspect 12. The method of Aspect 5, further comprising:
the controller estimating a temperature on one or more sides of the remote heat exchanger unit;
wherein the remote heat exchanger unit receiving the instructions from the controller and adjusting operation to provide the determined airflow volume and the determined flow direction based on the instructions includes the remote heat exchanger unit closing airflow from the remote heat exchanger unit to a side of the remote heat exchanger unit in which the estimated temperature is less than a threshold temperature.

Aspect 13. The method of Aspect 5, further comprising:
the controller estimating a temperature on one or more sides of the remote heat exchanger unit;
wherein the remote heat exchanger unit receiving the instructions from the controller and adjusting operation to provide the determined airflow volume and the determined flow direction based on the instructions includes the remote heat exchanger unit increasing airflow volume from the remote heat exchanger unit to a side of the remote heat exchanger unit in which the estimated temperature of the cargo exceeds a threshold temperature.

Aspect 14. The method of Aspect 5, further comprising:
the controller estimating a temperature on two or more sides of the remote heat exchanger unit;
wherein the remote heat exchanger unit receiving the instructions from the controller and adjusting operation to provide the determined airflow volume and the determined flow direction based on the instructions includes the remote heat exchanger unit outputting an approximately equal airflow volume from the remote heat exchanger unit to at least two sides of the remote heat exchanger unit.

Aspect 15. The method of Aspect 14,
wherein the estimated volume on the at least two sides of the remote heat exchanger unit is less than a threshold volume, and
wherein the remote heat exchanger unit receiving the instructions from the controller and adjusting operation to provide the determined airflow volume and the determined flow direction based on the instructions includes the remote heat exchanger unit outputting a reduced airflow volume.

Aspect 16. The method of Aspect 14,
wherein the estimated volume of the cargo on the at least two sides of the remote heat exchanger unit exceeds a threshold volume, and
wherein the remote heat exchanger unit receiving the instructions from the controller and adjusting operation to provide the determined airflow volume and the determined flow direction based on the instructions includes the remote heat exchanger unit outputting an increased airflow volume.

Aspect 17. The method of any one of Aspects 1-16, wherein the sensor includes one or more of a proximity sensor, a 3-D mapping sensor, a proximity sensor, and a thermal sensor.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method for controlling airflow volume and flow direction from a remote heat exchanger unit of a transport climate control system, the method comprising:
a controller receiving data from a sensor within at least a portion of a climate controlled space,
wherein the received data from the sensor is indicative of a position of a bulkhead within the climate controlled space relative to a position of the remote heat exchanger unit; and
the controller determining an airflow volume and determining a flow direction from the remote heat exchanger unit based on the received data;
the controller instructing the remote heat exchanger unit to provide the determined airflow volume and the determined flow direction within the climate-controlled space; and
the remote heat exchanger unit receiving instructions from the controller and adjusting operation to provide the determined airflow volume and the determined flow direction based on the instructions,
wherein the sensor includes a proximity sensor.

2. The method of claim 1,
wherein the controller determining the airflow volume and determining the flow direction from the remote heat exchanger unit based on the received data includes determining that the bulkhead is positioned in the climate controlled space within a threshold distance of the remote heat exchanger unit, and
wherein the remote heat exchanger unit receiving the instructions from the controller and adjusting operation to provide the determined airflow volume and the determined flow direction based on the instructions includes the remote heat exchanger unit closing airflow from the remote heat exchanger unit toward a direction of the bulkhead.

3. The method of claim 1,
wherein the controller determining the airflow volume and determining the flow direction from the remote heat exchanger unit based on the received data includes determining that the bulkhead is positioned within a percentage distance of the remote heat exchanger unit, and
wherein the remote heat exchanger receiving the instructions from the controller and adjusting operation to provide the determined airflow volume and the determined flow direction based on the instructions includes the remote heat exchanger unit directing a percentage airflow from the remote heat exchanger unit in a direction towards the bulkhead,
wherein the percentage airflow is proportional to the percentage distance determined by the controller.

4. The method of claim 1,
wherein the controller determining the airflow volume and determining the flow direction from the remote heat exchanger unit based on the received data includes determining that the bulkhead is positioned in the climate controlled space such that the bulkhead exceeds a threshold distance from the remote heat exchanger unit, and
wherein the remote heat exchanger receiving the instructions from the controller and adjusting operation to provide the determined airflow volume and the determined flow direction based on the instructions includes the remote heat exchanger unit increasing an airflow speed from the remote heat exchanger unit in a direction towards the bulkhead.

5. The method of claim 1,
wherein the controller determining the airflow volume and determining the flow direction from the remote heat exchanger unit based on the received data includes determining that the bulkhead is within a threshold distance of the remote heat exchanger unit, and
wherein the remote heat exchanger receiving the instructions from the controller and adjusting operation to provide the determined airflow volume and the determined flow direction based on the instructions includes the remote heat exchanger unit closing airflow from the remote heat exchanger unit in a direction toward the bulkhead.

6. The method of claim 1, further comprising:
the controller estimating a volume of cargo distributed on one or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit closing airflow from the remote heat exchanger unit to a side of the remote heat exchanger unit in which the estimated volume of cargo is less than a threshold volume.

7. The method of claim 1, further comprising:
the controller estimating a volume of cargo distributed on one or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit increasing airflow volume from the remote heat exchanger unit to a side of the remote heat exchanger unit in which the estimated volume of the cargo exceeds a threshold volume.

8. The method of claim 1, further comprising:
the controller estimating a volume of cargo distributed on two or more sides of the remote heat exchanger unit within the climate controlled space; and
wherein the remote heat exchanger unit receiving the instructions from the controller and adjusting operation to provide the determined airflow volume and the determined flow direction based on the instructions includes the remote heat exchanger unit outputting an approximately equal airflow volume from the remote heat exchanger unit to at least two sides of the remote heat exchanger unit.

9. The method of claim 8,
wherein the estimated volume of the cargo on at least two sides of the remote heat exchanger unit is less than a threshold volume, and
wherein the remote heat exchanger unit receiving the instructions from the controller and adjusting operation to provide the determined airflow volume and the determined flow direction based on the instructions includes the remote heat exchanger unit outputting a reduced airflow volume.

10. The method of claim 8,
wherein the estimated volume of the cargo on at least two sides of the remote heat exchanger unit exceeds a threshold volume, and
wherein the remote heat exchanger unit receiving the instructions from the controller and adjusting operation to provide the determined airflow volume and the determined flow direction based on the instructions includes the remote heat exchanger unit outputting an increased airflow volume.

11. The method of claim 1,
wherein the estimated volume on the at least two sides of the remote heat exchanger unit is less than a threshold volume, and
wherein the remote heat exchanger unit receiving the instructions from the controller and adjusting operation to provide the determined airflow volume and the determined flow direction based on the instructions includes the remote heat exchanger unit outputting a reduced airflow volume.

12. The method of claim 1, wherein the sensor includes a 3-D mapping sensor.

13. The method of claim 1, wherein the determined flow direction from the remote heat exchanger is two opposite directions within the climate controlled space.

14. A method for controlling airflow volume and flow direction from a remote heat exchanger unit of a transport climate control system, the method comprising:
a controller receiving data from a sensor within at least a portion of a climate controlled space,
wherein the received data from the sensor is indicative of a position of a bulkhead within the climate controlled space relative to a position of the remote heat exchanger unit; and
the controller determining an airflow volume and determining a flow direction from the remote heat exchanger unit based on the received data;
the controller instructing the remote heat exchanger unit to provide the determined airflow volume and the determined flow direction within the climate-controlled space; and the remote heat exchanger unit receiving instructions from the controller and adjusting operation to provide the determined airflow volume and the determined flow direction based on the instructions, wherein the sensor includes a thermal sensor.

15. The method of claim 14, wherein the received data from the sensor is also indicative of an environmental condition within the portion of the climate controlled space.

16. The method of claim 14, further comprising:

the controller estimating a temperature on one or more sides of the remote heat exchanger unit;

wherein the remote heat exchanger unit receiving the instructions from the controller and adjusting operation to provide the determined airflow volume and the determined flow direction based on the instructions includes the remote heat exchanger unit closing airflow from the remote heat exchanger unit to a side of the remote heat exchanger unit in which the estimated temperature is less than a threshold temperature.

17. The method of claim 14, further comprising:

the controller estimating a temperature on one or more sides of the remote heat exchanger unit;

wherein the remote heat exchanger unit receiving the instructions from the controller and adjusting operation to provide the determined airflow volume and the determined flow direction based on the instructions includes the remote heat exchanger unit increasing airflow volume from the remote heat exchanger unit to a side of the remote heat exchanger unit in which the estimated temperature of the cargo exceeds a threshold temperature.

18. The method of claim 14, further comprising:

the controller estimating a temperature on two or more sides of the remote heat exchanger unit;

wherein the remote heat exchanger unit receiving the instructions from the controller and adjusting operation to provide the determined airflow volume and the determined flow direction based on the instructions includes the remote heat exchanger unit outputting an approximately equal airflow volume from the remote heat exchanger unit to at least two sides of the remote heat exchanger unit.

19. The method of claim 18, wherein the estimated volume of the cargo on the at least two sides of the remote heat exchanger unit exceeds a threshold volume, and wherein the remote heat exchanger unit receiving the instructions from the controller and adjusting operation to provide the determined airflow volume and the determined flow direction based on the instructions includes the remote heat exchanger unit outputting an increased airflow volume.

20. A method for controlling airflow volume and flow direction from a remote heat exchanger unit of a transport climate control system, the method comprising:

a controller receiving data from a sensor within at least a portion of a climate controlled space, wherein the received data from the sensor is indicative of a position of a bulkhead within the climate controlled space relative to a position of the remote heat exchanger unit; and the controller determining an airflow volume and determining a flow direction from the remote heat exchanger unit based on the received data;

the controller instructing the remote heat exchanger unit to provide the determined airflow volume and the determined flow direction within the climate controlled space; and the remote heat exchanger unit receiving instructions from the controller and adjusting operation to provide the determined airflow volume and the determined flow direction based on the instructions, wherein the received data from the sensor is also indicative of an environmental condition within the portion of the climate controlled space, wherein the controller determining the airflow volume and determining the flow direction from the remote heat exchanger unit based on the received data includes determining that the bulkhead is within a threshold distance of the remote heat exchanger unit, and wherein the remote heat exchanger receiving the instructions from the controller and adjusting operation to provide the determined airflow volume and the determined flow direction based on the instructions includes the remote heat exchanger unit closing airflow from the remote heat exchanger unit in a direction toward the bulkhead.

* * * * *